US012157869B2

(12) United States Patent
Lindsay

(10) Patent No.: US 12,157,869 B2
(45) Date of Patent: Dec. 3, 2024

(54) METHODS AND COMPOSITIONS FOR REDUCING PERSISTENT ODOR IN CLOTHING AND MITIGATING BIOFILMS ON VARIOUS MATERIALS

(71) Applicant: Jeffrey Dean Lindsay, Appleton, WI (US)

(72) Inventor: Jeffrey Dean Lindsay, Appleton, WI (US)

( * ) Notice: Subject to any disclaimer, the term of this patent is extended or adjusted under 35 U.S.C. 154(b) by 458 days.

(21) Appl. No.: 17/068,806

(22) Filed: Oct. 12, 2020

(65) Prior Publication Data

US 2021/0032570 A1 Feb. 4, 2021

Related U.S. Application Data

(63) Continuation-in-part of application No. 16/926,514, filed on Jul. 10, 2020.

(60) Provisional application No. 62/994,810, filed on Mar. 25, 2020, provisional application No. 62/931,213, filed on Nov. 5, 2019, provisional application No. 62/914,552, filed on Oct. 13, 2019, provisional application No. 62/881,212, filed on Jul. 31, 2019, (Continued)

(51) Int. Cl.

| | |
|---|---|
| ***C11D 3/00*** | (2006.01) |
| ***C11D 3/32*** | (2006.01) |
| ***C11D 3/34*** | (2006.01) |
| ***C11D 3/386*** | (2006.01) |

(52) U.S. Cl.

CPC .......... *C11D 3/0068* (2013.01); *C11D 3/0047* (2013.01); *C11D 3/32* (2013.01); *C11D 3/349* (2013.01); *C11D 3/38618* (2013.01); *C11D 3/38636* (2013.01); *C11D 3/38663* (2013.01); *C11D 2111/12* (2024.01)

(58) Field of Classification Search

CPC ....... C11D 3/0068; C11D 3/0047; C11D 3/32; C11D 3/349; C11D 3/38618; C11D 3/38636; C11D 3/38663; C11D 11/0017; C11D 3/2096; C11D 3/381; C11D 3/38627; C11D 3/38645; C11D 3/48

See application file for complete search history.

(56) References Cited

U.S. PATENT DOCUMENTS

| | | |
|---|---|---|
| 3,519,570 A | 7/1970 | Mccarty |
| 3,553,139 A | 1/1971 | McCarty et al. |
| 3,600,319 A | 8/1971 | Gedge et al. |

(Continued)

FOREIGN PATENT DOCUMENTS

| | | |
|---|---|---|
| EP | 0285123 A3 | 2/1989 |
| EP | 0252666 A3 | 3/1989 |

(Continued)

OTHER PUBLICATIONS https://en.wikipedia.org/wiki/Ultraviolet (Year: 2023).*

(Continued)

*Primary Examiner* — Angela C Brown-Pettigrew
*Assistant Examiner* — Preeti Kumar
(74) *Attorney, Agent, or Firm* — Planet Lindsay, LLC; Jeffrey Dean Lindsay

(57) ABSTRACT

Novel methods and compositions for treating textiles and other materials are disclosed in which persistent odor or other symptoms of biofilm presence can be reduced through the use of compositions comprising N-acetyl cysteine or other agents in combination with certain enzymes.

16 Claims, 29 Drawing Sheets

Related U.S. Application Data provisional application No. 62/872,697, filed on Jul. 10, 2019.

(56) References Cited

U.S. PATENT DOCUMENTS 4,009,254 A 2/1977 Renold
4,101,457 A 7/1978 Place et al.
4,261,868 A 4/1981 Hora et al.
4,507,219 A 3/1985 Hughes
5,093,257 A 3/1992 Gray
5,238,155 A 8/1993 Blake
5,286,480 A 2/1994 Boggs
5,292,581 A 3/1994 Viazmensky et al.
5,443,569 A 8/1995 Uehira et al.
5,445,288 A 8/1995 Banks
5,576,282 A 11/1996 Miracle et al.
5,707,950 A 1/1998 Kasturi et al.
5,728,671 A 3/1998 Rohrbaugh et al.
5,733,535 A * 3/1998 Hollingshead ......... A61Q 15/00 424/68
5,766,578 A 6/1998 Davis
5,813,576 A 9/1998 Lizuka et al.
5,817,495 A 10/1998 Pedersen et al.
5,935,880 A 8/1999 Wang et al.
5,968,883 A 10/1999 Cherry et al.
6,082,586 A 7/2000 Banks
6,315,864 B2 11/2001 Anderson et al.
6,365,734 B1 4/2002 Kim
6,387,874 B1 5/2002 Schalitz et al.
6,416,623 B1 7/2002 Hollmark
6,451,063 B1 9/2002 Clarkson
6,475,434 B1 11/2002 Darouiche
6,489,279 B2 12/2002 Convents et al.
6,498,137 B1 12/2002 Schalitz et al.
6,509,028 B2 1/2003 Williams
6,537,631 B1 3/2003 Rivera et al.
6,601,737 B1 8/2003 Gartenberg
6,727,215 B2 4/2004 Roberts
6,737,068 B2 5/2004 Durden
6,794,350 B2 9/2004 Johansen et al.
6,818,204 B2 11/2004 Lapidus
6,869,466 B2 3/2005 Day et al.
6,881,713 B2 4/2005 Sommerville-roberts
6,995,126 B2 2/2006 Perkis
7,005,168 B2 2/2006 Verrall et al.
7,013,623 B2 3/2006 Fisher
7,125,828 B2 10/2006 Catlin
7,127,874 B2 10/2006 Viltro
7,528,099 B2 5/2009 Wahl
7,563,757 B2 7/2009 Kouvroukoglou
7,754,705 B2 7/2010 Savage et al.
7,964,549 B2 6/2011 Boutoille
8,012,461 B2 * 9/2011 Whiteley ................ C11D 1/62 424/70.28
8,178,119 B2 5/2012 Stutte et al.
8,267,284 B2 9/2012 Ray
8,336,737 B2 12/2012 van der Heijden
8,573,875 B2 11/2013 Gieux et al.
8,579,159 B2 11/2013 Ciavarella
8,591,207 B2 11/2013 Ciavarella
8,952,065 B2 2/2015 Pavliv
8,991,657 B2 3/2015 Ciavarella et al.
8,992,898 B2 3/2015 Klingman
9,227,980 B2 1/2016 Scherman et al.
9,228,284 B2 1/2016 Mchatton et al.
9,248,462 B2 2/2016 Csaszar
9,433,234 B2 9/2016 Kim et al.
9,470,638 B2 10/2016 Khalaf et al.
9,566,223 B2 2/2017 Klingman
9,603,859 B2 3/2017 Genberg et al.
9,668,948 B2 6/2017 Klingman
9,675,736 B2 6/2017 Burgess et al.
9,689,089 B2 6/2017 Ishikawa et al.
9,718,069 B2 8/2017 Creaghan et al.
9,756,862 B2 9/2017 Cooper et al.
9,926,404 B2 3/2018 Cheesman et al.
10,132,029 B2 11/2018 Katzenmeier et al.
10,206,479 B2 2/2019 Gieux et al.
10,308,657 B2 6/2019 Coulston et al.
10,443,024 B2 10/2019 Souter et al.
10,479,981 B2 11/2019 Oestergaard et al.
10,610,490 B2 4/2020 Stegemann et al.
2003/0229141 A1 12/2003 Yu et al.
2004/0136946 A1 7/2004 Fredenburgh et al.
2004/0171512 A1 * 9/2004 Furuta .................... C11D 1/667 510/474
2006/0062742 A1 3/2006 Davis
2006/0251597 A1 11/2006 Yu et al.
2008/0014277 A1 1/2008 Medri
2009/0199877 A1 1/2009 Larson et al.
2009/0057331 A1 3/2009 Fryan et al.
2010/0028070 A1 2/2010 Gieux et al.
2010/0192986 A1 8/2010 Brooker et al.
2011/0038840 A1 2/2011 Chen et al.
2011/0318289 A1 12/2011 Frodyma
2013/0053294 A1 2/2013 Cooper et al.
2013/0200098 A1 8/2013 Li
2014/0054323 A1 2/2014 McNulty
2014/0142019 A1 * 5/2014 Chen ...................... C11D 3/225 510/276
2014/0203047 A1 7/2014 McNulty
2015/0182436 A1 7/2015 Schmit
2015/0297772 A1 10/2015 Kim et al.
2015/0374719 A1 12/2015 Genberg et al.
2016/0279043 A1 9/2016 Danenberg et al.
2017/0157186 A1 6/2017 Shiach
2017/0319637 A1 11/2017 Pouillot et al.
2018/0161267 A1 * 6/2018 Randhawa ............. A61K 8/062
2018/0193236 A1 7/2018 Son et al.
2018/0245259 A1 * 8/2018 Mchatton .................. A61L 9/01
2018/0305658 A1 10/2018 Glimp
2019/0284647 A1 9/2019 Bach
2021/0236403 A1 8/2021 Lindsay

FOREIGN PATENT DOCUMENTS

EP 0368341 A2 10/1989
EP 0525610 A3 3/1993
EP 0905282 B1 1/2000
EP 1 103 597 A2 5/2001
EP 1718724 A1 * 11/2006 ........... C11D 3/0084
EP 2596089 B1 * 12/2014 ............... C11D 1/06
JP 2004-231671 A 8/2004
KR 20170026316 A 3/2017
WO WO/1995/29979 A1 11/1905
WO WO/1989/006270 A1 7/1989
WO WO/1989/008694 A1 9/1989
WO WO1991000353 A2 1/1991
WO WO/1992/019729 A1 11/1992
WO WO/1993/007260 A1 4/1993
WO WO/1993/007263 A2 4/1993
WO WO/1994/001532 A2 7/1993
WO WO/1994/002597 A1 2/1994
WO WO1994018314 A1 8/1994
WO WO/1994/025583 A1 11/1994
WO WO1995010603 A1 4/1995
WO WO/1995/030010 A1 11/1995
WO WO/199530011 A2 11/1995
WO WO1995035382 A2 12/1995
WO WO1996005295 A2 2/1996
WO WO1997030143 A1 2/1996
WO WO/1996/017816 A1 6/1996
WO WO1995026397 A1 10/1996
WO WO/1998/034946 A1 2/1997
WO WO/1998/020116 A1 11/1997
WO WO/1998/020115 A1 5/1998
WO WO 99/00478 A1 1/1999
WO WO-0222102 A1 * 3/2002 ............ A61K 8/345
WO WO/2009/121183 A1 10/2009
WO WO2014/124927 A1 8/2014
WO WO2020126347 A1 6/2020

(56) References Cited

OTHER PUBLICATIONS

J.J Leyden, "The microbiology of the human axilla and its relationship to axillary odor," Journal of Investigative Dermatology, 77/5 (Nov. 1981):413-6. doi: 10.1111/1523-1747.ep12494624.
M. Kanlayavattanakul and N. Lourith, "Body malodours and their topical treatment agents," International Journal of Cosmetic Science, 33 (2011): 298-311; doi: 10.1111/j.1468-2494.2011.00649.x.
"Cathelicidin," Wikipedia.com, https://en.wikipedia.org/wiki/Cathelicidin.
Dinty J. Musk Jr. and Paul J. Hergenrother, "Chemical Countermeasures for the Control of Bacterial Biofilms: Effective Compounds and Promising Targets," Current Medicinal Chemistry (2006) 13, 2163-2177.
T. Suzuki et al., "Comparative study of catechin compositions in five Japanese persimmons (*Diospyros kaki*)," Food Chemistry, vol. 93, Issue 1, Nov. 2005, pp. 149-152.
Itziar Chapartegui-Gonzalez, "Acinetobacter baumannii maintains its virulence after long-time starvation," PLoS ONE 13/8 (2018): e0201961. https://doi.org/10.1371/journal.pone.020196.
"Easy-to-Formulate Laundry Detergents," HAPPI, Jul. 2020, ,pp. 38-39; https://www.happi.com/issues/2020-07-01/view_features/easy-to-formulate-laundry-detergents/.
B. Andualema and A. Gessesse, "Microbial Lipases and their Industrial Applications," Biotechnology, 11/3 (2012): 100-118; DOI: 10.3923/biotech.2012.100.118.
"N-Acetyl Cysteine Reduces Biofilm Formation," https://www.wellnessresources.com/studies/n-acetyl-cysteine-reduces-biofilm-formation.
Isssam Raad et al., "Biofilm Inhibitors N-Acetyl Cysteine, EDTA, and Ethanol Exhibit Synergy with Antibiotics Against Biofilms of C. albicans and S. epidermidis," IDSA Conference 2008, https://idsa.confex.com/idsa/2008/webprogram/Paper25959.html.
"Active Odor Control Function," Sanitized AG (Switzerland), https://www.sanitized.com/wp-content/uploads/2017/08/SAN_FS_Odoractiv10_EN_secure.pdf.
"Technical Bulletin: Swellex™ Silicone Swelling Agent," https://medical.microcare.com/wp-content/uploads/2018/04/SWX0-Medical-Silicone-SwellFluids-US-TDS.pdf, accessed Oct. 7, 2020.
Robin Michael Statham Thorn and John Greenman, "Microbial volatile compounds in health and disease conditions," J. Breath Research, 6 (2012): 024001 (25pp); doi:10.1088/1752-7155/6/2/024001.
Mark Witten, University of Alberta, New Trail, "Tips on how to stink less," May 26, 2018, https://www.ualberta.ca/newtrail/how-to/summers-coming-tips-on-how-to-stink-less.html.
Yangping Pei et al., "Biological Activities and Potential Oral Applications of N-Acetylcysteine: Progress and Prospects," Oxidative Medicine and Cellular Longevity, vol. 2018, Article ID 2835787; https://doi.org/10.1155/2018/2835787 and https://www.hindawi.com/journals/omcl/2018/2835787/.
M. Zanetti, "Cathelicidins, multifunctional peptides of the innate immunity," Journal of Leukocyte Biology, vol. 75, Jan. 2004, pp. 39-47.
Fabíola Costa et al., "N-acetylcysteine-functionalized coating avoids bacterial adhesion and biofilm formation," Scientific Reports vol. 7, Article No. 17374 (2017); https://www.nature.com/articles/s41598-017-17310-4.
D. Kregiel et al., "Antimicrobial and Antibiofilm N-acetyl-L-cysteine Grafted Siloxane Polymers with Potential for Use in Water Systems," International Journal of Molecular Sciences, 20/8 (Apr. 2019): 2011, DOI: 10.3390/ijms20082011 and https://www.researchgate.net/publication/332606145_Antimicrobial_and_Antibiofilm_N-acetyl-L-cysteine_Grafted_Siloxane_Polymers_with_Potential_for_Use_in_Water_Systems.
Maria Nowacka et al., "Poly(silsesquioxanes) and poly(siloxanes) grafted with N-acetylcysteine for eradicating mature bacterial biofilms in water environment," Colloids and Surfaces B: Biointerfaces, vol. 172, Dec. 1, 2018, pp. 627-634. (Abstract only).
S. Kirmusaoğlu, "The effect of N-acetylcysteine on growth and biofilm formation in *Staphylococcus epidermidis* strains," Turkish Journal of Medical Science, 42/4 (2012): 689-694; https://citeseerx.ist.psu.edu/viewdoc/download?doi=10.1.1.475.7439&rep=rep1&type=pdf.
Fabíola Costa et al., "N-acetylcysteine-functionalized coating avoids bacterial adhesion and biofilm formation," Scientific Reports, vol. 7, article No. 17374 (Dec. 12, 2017); https://www.nature.com/articles/s41598-017-17310-4.
American Regent, Inc., "ACETYLCYSTEINE—acetylcysteine inhalant," Daily Med, https://dailymed.nlm.nih.gov/dailymed/fda/fdaDrugXsl.cfm?setid=f56b4087-db48-4fd7-84ec-9c927962b805&type=display, accessed Jan. 21, 2021.
Andrea Giampreti et al., "N-Acetyl-Cysteine as Effective and Safe Chelating Agent in Metal-on-Metal Hip-Implanted Patients: Two Cases," Case Reports in Orthopedics, vol. 2016, Article ID 8682737, 7 pages, 2016. https://doi.org/10.1155/2016/8682737 and https://downloads.hindawi.com/journals/crior/2016/8682737.pdf.
Jerónimo Rodríguez-Beltrán, "N-Acetylcysteine Selectively Antagonizes the Activity of Imipenem inPseudomonas aeruginosaby an OprD-Mediated Mechanism," Antimicrobial Agents and Chemotherapy 59/6 (Jun. 2015): 3246-51, https://aac.asm.org/content/aac/59/6/3246.full.pdf.
Google Patents English translation of JP2004-231671, "Detergent composition and method for evaluating bacteria-removing power and deterging power," by H. Akimoto et al., Aug. 19, 2004.
Google Patents English translation of KR 2017-0026316, "Compositions for fabric-care," by Son Seong-gil et al., Mar. 8, 2017.
Daphne Benderly and Yelena Zolotarsky, "Beyond Thickening—Use of Alkyl Acrylate Crosspolymer in Personal Care Formulations," Conference Paper in ACS Symposium Series, Aug. 2012 DOI: 10.1021/bk-2013-1148.ch013.
Aleksandr B. Stefaniak and Christopher J. Harvey, "Dissolution of materials in artificial skin surface film liquids," Toxicology in Vitro 20 (2006): 1265-1283, doi:10.1016/j.tiv.2006.05.011.
N. Meckelburg, "Antibacterial effect of coffee: calcium concentration in a culture containing teeth/biofilm exposed to Coffea Canephora aqueous extract," Letters in Applied Microbiology, 2014, doi:10.1111/lam.12281.
Andrea Giampreti, "N-Acetyl-Cysteine as Effective and Safe Chelating Agent in Metal-on-Metal Hip-Implanted Patients: Two Cases," Case Reports in Orthopedics, vol. 2016, Article ID 8682737, 2016, http://dx.doi.org/10.1155/2016/8682737.
Giancarlo Aldini, "N-Acetylcysteine as an antioxidant and disulphide breaking agent: the reasons why," Free Radical Research, 52:7 (2018): 751-762, DOI:10.1080/10715762.2018.1468564.
R.S. Lanigan, "Final report on the safety assessment of Sodium Metaphosphate, Sodium Trimetaphosphate, and Sodium Hexametaphosphate," Int J Toxicology, 20 (2001), Suppl 3:75-89. doi: 10.1080/10915810152630756.
"MedTech & Aesthetics: Silk-based solutions to enhance medical device compatibility and performance," AMSilk.com, https://www.amsilk.com/industries/medical-devices/.
Technical BulletinSwellex™ Silicone Swelling Agent, MicroCare.com, https://medical.microcare.com/wp-content/uploads/2018/04/SWX0-Medical-Silicone-SwellFluids-US-TDS.pdf, accessed Oct. 7, 2020.
Ketchum AR, Kappler MP, Wu J, Xi C, Meyerhoff ME. The preparation and characterization of nitric oxide releasing silicone rubber materials impregnated with S-nitroso-tert-dodecyl mercaptan. J Mater Chem B. Jan. 21, 2016;4(3):422-430. doi: 10.1039/C5TB01664A. Epub Dec. 7, 2015. PMID: 27087965; PMCID: PMC4826759. https://www.ncbi.hlm.nih.gov/pmc/articles/PMC4826759/.
S. Kirmusaŏlu, "The effect of N-acetylcysteine on growth and biofilm formation in *Staphylococcus epidermidis* strains," Turkish Journal of Medical Science, 42/4 (2012): 689-694; https://citeseerx.ist.psu.edu/viewdoc/download?doi=10.1.1.475.7439&rep=rep1&type=pdf.
"Puracy Natural Multi-Surface Cleaner," Puracy.com, https://puracy.com/products/natural-multi-surface-cleaner, accessed Aug. 24, 2020.
"Nature's Miracle® Advanced Formula Severe Stain & Odor Eliminator," PetSmart.com, https://www.petsmart.com/featured-brands/

(56) References Cited

OTHER PUBLICATIONS natures-miracle/dog/natures-miracle-advanced-formula-severe-stain-and-odor-eliminator-47028.html?cgid=5000064, accessed Aug. 24, 2020.
"Advanced Stain and Odor Eliminator," Nature's Miracle, http://www.naturesmiracle.com/products/dog/stain-and-odor/advanced-stain-and-odor-eliminator.aspx, accessed Aug. 24, 2020.
Untitled, SCOnline.org, https://www.sconline.org/wp-content/uploads/2014/10/konish.pdf.
"Lactobacillus/□Pumpkin Ferment Extract," https://incidecoder.com/ingredients/lactobacillus-pumpkin-ferment-extract.
Mukesh Kumar Yadav, et al, "Sinefungin, a Natural Nucleoside Analogue of S-Adenosylmethionine, Inhibits *Streptococcus pneumoniae* Biofilm Growth," BioMed Research International, vol. 2014, article ID 156987 (2014); https://www.hindawi.com/journals/bmri/2014/156987/.
Chen Niu et al., "LuxS influences *Escherichia coli* biofilm formation through autoinducer-2-dependent and autoinducer-2-independent modalities," FEMS Microbiology Ecology, 83/3 (Mar. 2013): 778-791; https://onlinelibrary.wiley.com/doi/abs/10.1111/1574-6941.12034 and https://academic.oup.com/femsec/article/83/3/778/597032.
Supeng Yin et al., "NAC and Serum Increases Biofilm Formation," Cellular Physiology and Biochemistry, 45 (2018): 1399-1409; https://www.researchgate.net/publication/323298548_The_Interaction_of_N-Acetylcysteine_and_Serum_Transferrin_Promotes_Bacterial_Biofilm_Formation and https://doi.org/10.1159/000487566.
Alexander G Zhdanko et al. in "One-step synthesis of N-acetylcysteine and glutathione derivatives using the Ugi reaction," Tetrahedron 65/24 (Jun. 2009):4692-4702; https://www.sciencedirect.com/science/article/abs/pii/S0040402009005778.
Karin Rasmussen et al., "N-Acetyl-L-cysteine Effects on Multi-species Oral Biofilm Formation and Bacterial Ecology," Letters in Applied Microbiology, 62/1 (Jan. 2016): 30-38; doi: 10.1111/lam.12513 and https://www.ncbi.nlm.nih.gov/pmc/articles/PMC4715549/pdf/nihms-734574.pdf.
Yangping Pei et al., "Biological Activities and Potential Oral Applications of N-Acetylcysteine: Progress and Prospects," Oxidative Medicine and Cellular Longevity, vol. 2018 (Apr. 22, 20198), Article ID 2835787; https://doi.org/10.1155/2018/2835787 and http://downloads.hindawi.com/journals/omcl/2018/2835787.pdf.
"Active Odor Control Function," Sanitized AG, Switzerland, https://www.sanitized.com/wp-content/uploads/2017/08/SAN_FS_Odoractiv10_EN_secure.pdf, accessed Oct. 1, 2020.
"Clothing," Sanitized AG, Switzerland, https://www.sanitized.com/wp-content/uploads/2018/12/SAN_SegmentFlyer_Clothing_EN_secure.pdf, accessed Oct. 1, 2020.
"Nature's Miracle Carpet Shampoo," http://www.naturesmiracle.com/products/more-products/floor-cleaners/carpet-shampoo.aspx.
"The Complete Guide To Trigger Pump Sprayers," Raepak.con, https://www.raepak.com/complete-guide-trigger-pump-sprayers/, accessed Jul. 10, 2020.
MSDS for SmartShield Antimicrobial Protective Spray, https://www.sylvane.com/media/documents/products/SmartShield_RTU_MSDS.pdf.
C. Candal, "Using Enzymes to Improve Antibiotic Effectiveness on *Staphylococcus epidermidis* Biofilm Removal," NCSSSMST Journal (2012): 34-37; https://files.eric.ed.gov/fulltext/EJ973552.pdf.
"Cavcon Products," http://www.cyclo-dextrin.com/products.asp, Pocono Enterprise LLC, 2019, accessed Nov. 8, 2019.
Iris Schlomski, "Goodbye permastink!," Textile Network, Mar. 26, 2018, https://textile-network.com/en/Technical-Textiles/Textile-Flaechen/Goodbye-Permastink, accessed Nov. 8, 2019.
Maria Daglia, "Polyphenols as antimicrobial agents," Current Opinion in Biotechnology, 23 (2012):174-181.
Mark Witten, "Tips on how to stink less," New Trail, University of Alberta, May 26, 2018, https://www.ualberta.ca/newtrail/featurestories/summers-coming-tips-on-how-to-stink-less, accessed Nov. 8, 2019.
"Innovative Odor Control Function for polyester textiles: Sanitized® Odoractiv 10 with patented, dual-action technology," Sanitized AG, Burgdorf, Switzerland, Jan. 16, 2018, https://www.sanitized.com/sanitized-odoractiv-10/, accessed Nov. 8, 2019.
"Perma-Stink Be Gone!," Productive Mama, Jul. 13, 2016, http://productivemama.com/perma-stink-be-gone/, accessed Nov. 8, 2019.
"Sciessent Lava XL Odor Control," Sciessent.com, Aug. 2018, https://www.sciessent.com/wp-content/uploads/2019/08/Sciessent_LavaXL_Product_Sheet.pdf, also https://www.sciessent.com/product-sheet/lava-xl-product-sheet/, accessed Nov. 8, 2019.
Muhsin Jamal et al., "Bacterial biofilm and associated infections," Journal of the Chinese Medical Association, 81 (2018) 7-11.
Nithyanand Paramasivam et al., "Recent advances in biofilmology and antibiofilm measures," Biomedical Research Int. (2017):5409325.
Bo Fu et al., "Inhibition of Pseudomonas aeruginosa Biofilm Formation by Traditional Chinese Medicinal Herb Herba patriniae," BioMed Research International, vol. 2017, Article ID 9584703, 10 pages, https://doi.org/10.1155/2017/9584703 and https://www.hindawi.com/journals/bmri/2017/9584703/.
Philipp Stiefel, et al., "A simple and rapid method for optical visualization and quantification of bacteria on textiles," Scientific Reports, 6 (2016), paper 39635; doi: 10.1038/srep39635; https://www.ncbi.nlm.nih.gov/pmc/articles/PMC5177907/.
D.P. Bockmühl, et al., "Laundry and textile hygiene in healthcare and beyond," Microbial Cell, 6/7 (Jul. 2019): 299-306. DOI: 10.15698/mic2019.07.682.
M. Brandwein, "Microbial biofilms and the human skin microbiome," npj Biofilms Microbiomes 2, 3 (2016); doi: 10.1038/s41522-016-0004-z and https://www.nature.com/articles/s41522-016-0004-z.
Jennifer M. Nicoloro, "Fabric in Infection and Infection Control in Healthcare," Ph.D. Dissertation, Biomedical Engineering & Biotechnology, University of Massachusetts Lowell, 2018.
Eugenie Fredrich, "Daily battle against body odor: towards the activity of the axillary microbiota," Review Human Microbiome, 21/6 (Jun. 2013):305-312.
Dinty J. Musk Jr. and Paul J. Hergenrother, "Chemical Countermeasures for the Control of Bacterial Biofilms: Effective Compounds and Promising Targets," Current Medicinal Chemistry, vol. 13 , Issue 18 , 2006; DOI : 10.2174/092986706777935212 and https://pubmed.ncbi.nlm.nih.gov/16918346/. (Abstract).
George Denny et al., "Rapid Detection of Fungal Elements using Calcofluor White and Hand-Held Ultraviolet Illumination," Journal of the qAmerican Academy of Dermatology (2019), doi: https://doi.org/10.1016/j.iaad.2019.10.012.
A. Natsch, "Isolation of a bacterial enzyme releasing axillary malodor and its use as a screening target for novel deodorant formulations," Int J Cosmet Sci. Apr. 2005;27(2):115-22. doi: 10.1111/j.1467-2494.2004.00255.x.
M. Hisham El-Masry et al., "Bacterial populations in the biofilm and non-biofilm components of a sand filter used in water treatment," FEMS Microbiology Letters 131(1995) 263-269.
Edgardo Jofré et al, "Monitoring succinoglycan production in single Sinorhizobium meliloti cells by Calcofluor white M2R staining and time-lapse microscopy," Carbohydrate Polymers 181 (2018) 918-922.
E.F. Haney et al., "Critical Assessment of Methods to Quantify Biofilm Growth and Evaluate Antibiofilm Activity of Host Defence Peptides," Biomolecules, 8/29 (2018); doi:10.3390/biom8020029.
Juntao Liu et al., "Metabolic co-dependence gives rise to collective oscillations within biofilms," Nature, 253 Jul. 30, 2015): 550-567.
Susan Hassan et al., "PeIN Is a New Pectate Lyase of Dickeya dadantii with Unusual Characteristics," May 2013 Journal of Bacteriology, 195/10 (May 2013): 2197-2206.
Cynthia B. Whitchurch et al., "Extracellular DNA Required for Bacterial Biofilm Formation," Science, vol. 295, issue 5559 (Feb. 22, 2002): 1487; DOI: 10.1126/science.295.5559.1487 and https://science.sciencemag.org/content/295/5559/1487/tab-pdf.
Hanna Lara da Cruz Dinéas de Oliveira et al., "Influence of papain in biofilm formed by methicillin-resistant *Staphylococcus epidermidis* and methicillin-resistant *Staphylococcus haemolyticus* isolates," Brazilian Journal of Pharmaceutical Sciences, vol. 50, n. 2 ( Apr./Jun. 2014); http://dx.doi.org/10.1590/S1984-82502014000200005 and http://www.scielo.br/pdf/bjps/v50n2/1984-8250-bjps-50-02-00261.pdf.

(56) References Cited

OTHER PUBLICATIONS

Yoshimi Matsumoto et al., "Antibacterial and Antifungal Activities of New Acylated Derivatives of Epigallocatechin Gallate," Frontiers in Microbiology, vol. 3, article 53 (2012): 1-10; doi: 10.3389/fmicb.2012.00053 and https://www.ncbi.nlm.nih.gov/pmc/articles/PMC3280433.
M.T. Nguyen et al., "Staphylococcal (phospho)lipases promote biofilm formation and host cell invasion," International Journal of Medical Microbiology, 308/6 (Aug. 2018): 653-63; doi: 10.1016/j.ijmm.2017.11.013 and https://www.ncbi.nlm.nih.gov/pubmed/29203111.
R.M.Q. Shanks et al., "Catheter lock solutions influence staphylococcal biofilm formation on abiotic surfaces," Nephrology Dialysis Transplantation, 21/8 (Aug. 2006): 2247-2255, https://doi.org/10.1093/ndt/gfl170 and https://academic.oup.com/ndt/article/21/8/2247/1820732.
Sondes Mechri et al., "Identification of a New Serine Alkaline Peptidase from the Moderately Halophilic *Virgibacillus natechei* sp. nov., Strain FarDT and its Application as Bioadditive for Peptide Synthesis and Laundry Detergent Formulations," BioMed Research International (2019), Article ID 6470897; https://doi.org/10.1155/2019/6470897.
Uma Kumari, "Validation of leaf enzymes in the detergent and textile industries: launching of a new platform technology," Plant Biotechnology Journal, 17 (2019): 1167-1182; https://www.ncbi.nlm.nih.gov/pmc/articles/PMC6523609/pdf/PBI-17-1167.pdf.
Erin Williams, "Bacterial Biofilms: Live Chat with Rob Hull," Nappy Science Gang blog, Oct. 8, 2016; https://nappysciencegang.wordpress.com/2016/10/08/bacterial-biofilms-live-chat-with-rob-hull/, accessed Mar. 13, 2020.
"Are X-Ray Garments 'Machine Washable'? Think Again," Radcareservices.com, no date; https://www.radcareservices.com/washing.html, accessed Mar. 13, 2020.
Philipp Stiefel et al., "A simple and rapid method for optical visualization and quantification of bacteria on textiles," Scientific Reports, 6 (Dec. 22, 2016): 39635; https://www.ncbi.nlm.nih.gov/pmc/articles/PMC5177907/ and DOI: 10.1038/srep39635. PDF: https://www.ncbi.nlm.nih.gov/pmc/articles/PMC5177907/pdf/srep39635.pdf.
L. Teufel et al., "Material-dependent growth of human skin bacteria on textiles investigated using challenge tests and DNA genotyping," Journal of Applied Microbiology, 108/2 (Feb. 2010): 450-461; https://doi.org/10.1111/i.1365-2672.2009.04434.x and https://sfamjournals.onlinelibrary.wiley.com/doi/full/10.1111/j.1365-2672.2009.04434.x.
R.H. McQueen, et al., "Odor intensity in apparel fabrics and the link with bacterial populations," Textile Research Journal, 77 (2007): 449-456; http://trj.sagepub.com/cgi/content/abstract/77/7/44 and https://www.researchgate.net/profile/Raechel_Laing/publication/249785647_Odor_Intensity_in_Apparel_Fabrics_and_the_Link_with_Bacterial_Populations/links/5844c66208aeda69681915e9/Odor-Intensity-in-Apparel-Fabrics-and-the-Link-with-Bacterial-Populations.pdf.
Thomas K. Wood et al., "Bacterial Persister Cell Formation and Dormancy," Applied and Environmental Microbiology, 79/23 (Dec. 2013): 7118-7121; https://www.ncbi.nlm.nih.gov/pmc/articles/PMC3837759/.
K. Lewis, "Persister Cells and the Riddle of Biofilm Survival," Biochemistry (Moscow), vol. 70, No. 2, 2005, pp. 267-274. Translated from Biokhimiya, vol. 70, No. 2, 2005, pp. 327-336; http://www.protein.bio.msu.ru/biokhimiya/contents/v70/pdf/bcm_0267.pdf.
A. Almatroudi, "*Staphylococcus aureus* dry-surface biofilms are more resistant to heat treatment than traditional hydrated biofilms," Journal of Hospital Infection, 98/2 (Feb. 2018): 161-167; https://www.journalofhospitalinfection.com/article/S0195-6701(17)30504-2/fulltext.
Tze Hau Lam et al., "Understanding the microbial basis of body odor in pre-pubescent children and teenagers," Microbiome, 6, article No. 213 (2018); https://microbiomejournal.biomedcentral.com/articles/10.1186/s40168-018-0588-z.
C. Callewaert et al., "Artificial sweat composition to grow and sustain a mixed human axillary microbiome," Journal of Microbiological Methods, 103 (2014) 6-8; https://www.researchgate.net/publication/262607922_Artificial_sweat_composition_to_grow_and_sustain_a_mixed_human_axillary_microbiome.
K. VanderWaal, "University of Minnesota Nano Center Standard Operating Procedure [for the Nikon C2 Confocal Microscope]," Univ. of Minnesota Nano Center, Minneapolis, MN, 2016, http://apps.mnc.umn.edu/pub/pdf/equipment/nikon_confocal_sop.pdf.
J. Edward Donnellan, Jr. et al., "Chemically Defined, Synthetic Media for Sporulation and for Germination and Growth of Bacillus Subtilis," J. Bacteriology, 87/2 (Feb. 1964): 332-336; https://www.ncbi.nlm.nih.gov/pmc/articles/PMC277012/.
Emo Chiellini et al., "Biodegradation of poly (vinyl alcohol) based materials," Progress in Polymer Science, 28 (2003) 963-1014; https://www.sciencedirect.com/science/article/pii/S0079670002001491 (abstract).
"Tailor-made sizing agents for your application," Dr. Petry Textile Auxiliaries, Reutlingen, Germany, https://drpetry.de/fileadmin/user_upload/Produkte/Sizing_agents_BROCHURE_en.pdf.
S.A. Yin et al., "The Interaction of N-Acetylcysteine and Serum Transferrin Promotes Bacterial Biofilm Formation," Cell Physiology and Biochemistry, 45 (2018) :1399-1409; https://doi.org/10.1159/000487566 and https://www.karger.com/Article/FullText/487566.
Anjali Sharma et al., "Green tea extract: Possible mechanism and antibacterial activity on skin pathogens," Food Chemistry 135 (2012) 672-675.
Theresa Renee Aponte, "Green Tea Polyphenol EGCG-S as an Antimicrobial Agent" (2018).Theses, Dissertations and Culminating Projects. 118; https://digitalcommons.montclair.edu/etd/118.
X. Zhang et al. in "Synthesis and Biological Testing of Novel Glucosylated Epigallocatechin Gallate (EGCG) Derivatives," Molecules, 21/5 (2016): 620; https://doi.org/10.3390/molecules21050620 and https://www.mdpi.com/1420-3049/21/5/620.
Y. Zhong and F. Shahidi in "Lipophilized epigallocatechin gallate (EGCG) derivatives as novel antioxidants," J Agric Food Chem, 59/12 (Jun. 22, 2011): 6526-33; doi: 10.1021/jf201050j and https://www.ncbi.nlm.nih.gov/pubmed/21526762.
"N-Acetyl-L-cysteine," Millipore Sigma, https://www.sigmaaldrich.com/US/en/product/sigma/a9165, accessed Nov. 7, 2022.
"D-(+)-Glucosamine hydrochloride," Millipore Sigma, https://www.sigmaaldrich.com/US/en/product/sigma/g4875, accessed Nov. 7, 2022.
"Lauroyl methyl glucamide," SAAPedia (surfactant.top), http://www.saapedia.org/en/saa/?type=detail&id=8087, accessed Nov. 7, 2022.
World Health Organization, "Radiation: Ultraviolet (UV) radiation," Mar. 9, 2016, https://www.who.int/news-room/questions-and-answers/item/radiation-ultraviolet-(uv).
"BRENDA, the ELIXIR core data resource in 2021," Nucleic Acids Research 49, D1 [Jan. 8, 2021]: D498-508, https://doi.org/10.1093/nar/gkaa1025.
"Skin Symptoms in Patients with Atopic Dermatitis Using Enzyme-containing Detergents," Acta Dermato Venereologica (Stockholm) 78 (1998): 60-62, https://www.medicaljournals.se/acta/download/10.1080/00015559850135878/.
S. Yin, "The Interaction of N-Acetylcysteine and Serum Transferrin Promotes Bacterial Biofilm Formation," Cellular Physiology and Biochemistry, 45 (2018):1399-1409, DOI:10.1159/000487566.
G. Aldini, "N-Acetylcysteine as an antioxidant and disulphide breaking agent," Free Radical Research 52, No. 7 (2018): 751-762, DOI: 10.1080/10715762.2018.1468564.
Mojtaba Enayati et al., "Granulation and encapsulation of N-Acetylcysteine (NAC) by internal phase separation," Food Hydrocolloids, vol. 130 (2022): 107699, https://doi.org/10.1016/j.foodhyd.2022.107699.
S. Yin, "The Interaction of N-Acetyl cysteine and Serum Transferrin Promotes Bacterial Biofilm Formation," Cellular Physiology and Biochemistry, 45 (2018):1399-1409, DOI:10.1159/000487566. Full article at https://karger.com/cpb/article/45/4/1399/74704/The-Interaction-of-N-Acetylcysteine-and-Serum.
G. Aldini, "N-Acetylcysteine as an antioxidant and disulphide breaking agent," Free Radical Research 52, No. 7 (2018): 751-762,

(56) References Cited

OTHER PUBLICATIONS

DOI: 10.1080/10715762.2018.1468564 and https://www.tandfonline.com/doi/full/10.1080/10715762.2018.1468564.
H.J. Bremmer et al., "Cosmetics Fact Sheet: To assess the risks for the consumer: Updated version for ConsExpo 4 [Internet]," part 3, "Defaults for cosmetics," Bilthoven, NL: National Institute for Public Health and the Environment, 2006; https://www.ncbi.nlm.nih.gov/books/NBK563321/.
Shannon Klingman, "Big Companies Benefit (Not You!) by Selling Multiple Products that Solve the Same Problem," Lume Deodorant Blog, [no date], https://lumedeodorant.com/blog/one-deodorant-many-uses, accessed Jan. 2, 2024.
B.I. Crouch et al., "Effect of dilution with beverages on the smell and taste of oral acetylcysteine," Am J Health Syst Pharm., vol. 64, No. 18 (Sep. 15, 2007): 1965-8, doi: 10.2146/ajhp060568, https://pubmed.ncbi.nlm.nih.gov/17823110/.
J. D. Bos and M. M. Meinardi, "The 500 Dalton rule for the skin penetration of chemical compounds and drugs," Experimental Dermatology, vol. 9, No. 3 (Jun. 2000): 165-69, https://onlinelibrary.wiley.com/doi/epdf/10.1034/j.1600-0625.2000.009003165.x.
Brandán Pedre, et al., "The mechanism of action of N-acetylcysteine (NAC): The emerging role of H2S and sulfane sulfur species," Pharmacology & Therapeutics, vol. 228 (2021): 107916, https://doi.org/10.1016/j.pharmthera.2021.107916.
Google search of "deodorant on clothing", Sep. 4, 2024, saved as a PDF with file name "deodorant on clothing—Google Search.pdf". File created by Jeff Lindsay using a Firefox browser.
Google search of "lotion on clothing", Sep. 4, 2024, saved as a PDF with file name "lotion on clothing—Google Search.pdf". File created by Jeff Lindsay using a Firefox browser.
Google search of "moisturizer on clothing", Sep. 4, 2024, saved as a PDF with file name "moisturizer on clothing—Google Search.pdf". File created by Jeff Lindsay using a Firefox browser.
Google search of "sunblock on clothing", Sep. 4, 2024, saved as a PDF with file name "sunblock on clothing—Google Search.pdf". File created by Jeff Lindsay using a Firefox browser.
Mary Ann Jabra-Rizk et al., "Fungai Biofilms and Drug Resistance," Emerging Infectious Disease, Oct. 1, 2004: 14-19; doi: 10.3201/eid1001.D30119 and https://www.ncbi.nlm.nih.gov/pmc/articles/PMC30311057.
"Breast implants with biotech spider silk," Biooekonomie, Mar. 13, 2018, https://biooekonomie.de/en/nachrichlen/breast-implants-biotech-spider-silk.
"MedTech & Aesthelics: Silk-based solutions to enhance medical device compatibility and performance," AMSilk.com, https://www.amsilk.com/industries/medical-devices/.
Darouiche et al., "In Vivo Efficacy of Antimicrobe-Impregnated Saline Filled Silicone Implants," Plastic and Reconstructive Surgery, 109/4 (Apr. 1, 2002): 1352-1357; https://journals.lww.com/plasreconsurg/Citation/2002/04010/in_Vivo_Efficacy_of_Antimicrobe_Impregnated 22.aspx.
Technical BulletinSwellex™ Silicone Swelling Agent, MicroCare.com, http://medical.microcare.com/wp/content/uploads/2018/04/SWX0-Medical-Silicone-SwellFluids-US-TDS.pdf, accessed Oct. 7, 2020.
"Using Proprietary Solvent Technology to Swell Silicone," Medical Design Briefs, Feb. 1, 2012, https://www.medicaldesignbriefs.com/component/content/article/mdb/tech-briefs/12806.
Keichum AR, Kappler MP. Wu J, Xi C, Meyerhoff ME. The preparation and characterization of nitric oxide releasing silicone rubber materials impregnated with S-nitroso-tert-dodecyl mercaptan. J Mater Chem B. Jan. 21, 2016:4(3):422-430. doi: 10.1039/C5TB01664A. Epub Dec. 7, 2015. PMID: 27087965; PMCID: PMC4826759. https://www.ncbi.nlm.nih.gov/pmc/articles/PMC4826759/.
Mary Ann Jabra-Rizk et al., "Fungal Biofilms and Drug Resistance," Emerging Infectious Disease, 10/1 Oct. 1, 2004; 14-19, doi: 10.3201/eid1001.030119 and https://www.ncbi.nim.nih.gov/pmc/articles/PMC3031105/.
"Breast implants with biotech spider silk," Biooekonomie, Mar. 13, 2018, https://biooekonomie.de/en/nachrichten/breast-implants-blotech-spider-silk.
Areej A Alfaifl et al., "Impact of Caffeine on Metabolic Activity and Biofilm Formation of Candida Albicans on Acrylic Denture Resin in the Presence of Nicoline," Journal of Prosthetic Dentistry, Nov. 5, 2019; DOI: 10.1016/j.prosdent.2019.09.007 and https://pubmedncbi.nlm.nih.gov/31703923/. (Abstract).
"Acetylcysteine," Wikipedia, https://en.wikipedia.org/wiki/Acetylcysteine, accessed Apr. 7, 2020.
Karin Rasmussen, et al., "N-Acetyl-L-cysteine Effe cts on Multi-species Oral Biofilm Formation and Bacterial Ecology." Letters in Applied Microbiology, 62/1 (Jan. 2016): 30-38. https://www.ncbi.nim.nih.gov/pmc/articles/PMC4715549/ and doi: 10.1111/lam.12513.
B.V.G. Nguyen, T. Nagakubo, M. Toyoluku, N. Nomura, and Andrew S. Utada, "Synergy between Sophorolipid Biosurfactant and SOS Increases the Efficiency of P. aeruginosa Biofilm Disruption," Langmuir, 36/23 (Jun. 1, 2020): 6411-6420; https:/doi.org/10.1021/acs.langmuir.0c00643 and https://pubs.acs.org/dot/pdf/10 1021/acs.langmuir.0c00643.
Ivana Aleksic et al.; "Anti-biofilm Properties of Bacterial Di-Rhamnolipids and Their Semi-Synthetic Amide Derivatives," Frontiers in Microbiology, 8 (Dec. 8, 2017): 2454; doi: 10.3389/micb.2017.02454 and https://www.ncbi.nlm.nih.gov/pmc/articles/PMC5727045/.
Cynthia A. Challener, "Excipient Selection for Protein Stabilizalion: The complex task of stabilizing proteins is made more challenging due to the limited number of approved excipients," Pharmaceutical Technology, vol. 2015 Supplement, Issue 3. Aug. 15, 2015, pp. s35-s39; http://www.pharmtech.com/excipient-selection-protein-stabilization.
"SmartShield Antimicrobial Proteclive Spray," https://web.archive.org/web/20170703042200/https://www.sylvane.com/smartshield-antimicrobial-spray.html (formerly at https://www.sylvane.com/smartshield-antimicrobial-spray.htm).
International Journal of Food Properties 20/4 (2017): 769-781; http://dx.doi.org/10.1080/10942912.2016.1180534.
T. Scott Brady et al., "Bystander Phage Therapy; Inducing Host Associated Bacteria to Produce Antimicrobial Toxins against the Pathogen Using Phages," Antibiotics 7/4 (2018): 105; https://doi.org/10.3390/antibiotics7040105 and https://www.mdpi.com/2079-6382/7/4/105/htm.
"Puracy Natural Laundry Detergent." Puracy.com, https://puracy.com/collections/puracy-home-essentials/products/natural-laundry-detergent, accessed Aug. 24, 2020.
Ahlam Al-kamel et al., "Evaluation of N-acetyl cysteine mouth wash as anew treatment approach for gingivitis," ResearchGate.com, Jul.-Sep. 2017, https://www.researchgate net/project/evaluation-of-N-acetyl-cysteine-mouth-wash-as-anew-treatment-approach-for-gingivitis, accessed Sep. 30, 2020.
Mayo Clinic, "Acetylcysteine Rinse in Reducing Saliva Thickness and Mucositis in Patients With Head and Neck Cancer Undergoing Radiation Therapy," ClinicalTrials.gov, 2014-2019, https://clinicaltrials.gov/c12/show/NCT02123511, accessed Sep. 30, 2020.
Ahlam Al-Kamel et al., "N-acetyl cysteine versus chlorhexidine mouthwashes in prevention and treatment of experimental gingivitis: a randomized, triple-blind, placebo-controlled clinical trial." Clinical Oral Investigations vol. 23 (2019): 3833-3842; https://link.springer.com/article/10.1007/s00784-019-02813-3.
Ahlam Al-Kamel, "N-acetyl cysteine versus chlorhexidine mouthwashes in prevention and treatment of experimental gingivitis: a randomized, triple-blind, placebo-controlled clinical trial," Clinical Oral Investigations, 23/10 (Oct. 2019): 3833-3842; doi: 10.1007/600784-019-02813-3.
Sakonwat Kuepethkaew et al., "Laundry detergent stable lipase from Pacific while shrimp (*Litopenaeus vannarnei*) hepatopancreas: Effect of extraction media and biochemical characterization," International Journal of Food Properties 20/4 (2017): 769-781: http://dx.doi.org/10.1080/10942912.2016.1180534 and https://www.tandfonline.com/doi/pdf/10.1080/10942912.2018.1180534.

(56) References Cited

OTHER PUBLICATIONS

K. VanderWaal, "University of Minnesota Nano Center Standard Operating Procedure [for the Nikon C2 Confocal Microscope]," 2016; http:/apps.mnc.umn.edu/pub/pdf/equipment/nikon_confocal_sop.pdf.
Material Safety Data Sheet File No. 200-2, SmartShield RTU Ready To Use Antimicrobial Surface Protectant; https:www.sylvane.com/media/documents/products/SmartShield_RTU_MSDS.pdf.
"SmartShield Antimicrobial Protective Spray," Sylvane.com, https://www.sylvane.com/smartshield-antimicrobial-spray.html, accessed Oct. 1, 2020.
"Odor-Management: A New Dimension with the Sanitized® Odor Control Function," Sanitized AG, Switzerland, https://www.sanitized.com/odor-control-function/.
"Technology Fact Sheet," Sanitized AG, Switzerland, https://www.sanitized.com/wp-content/uploads/2015/09/SAN_FactSheet_Technology_EN_FINAL.pdf.

* cited by examiner

METHODS AND COMPOSITIONS FOR REDUCING PERSISTENT ODOR IN CLOTHING AND MITIGATING BIOFILMS ON VARIOUS MATERIALS

CLAIM TO PRIORITY

This application claims priority to U.S. patent application Ser. No. 16/926,514, filed Jul. 10, 2020, which in turn claims priority to U.S. Patent Appl. Ser. No. 62/881,212, filed Jul. 31, 2019 and U.S. Patent Appl. Ser. No. 62/872,697, filed Jul. 10, 2019. This application further claims priority to U.S. Patent Appl. Ser. No. 62/994,810, filed Mar. 25, 2020; U.S. Patent Appl. Ser. No. 62/931,213, filed Nov. 5, 2019; and U.S. Patent Appl. Ser. No. 62/914,552, filed Oct. 13, 2019; all of which are hereby incorporated by reference in their entireties for all purposes.

BACKGROUND

Field of the Invention

This invention pertains to products and methods for treating clothing, textiles or other surfaces to reduce the presence of malodor or to reduce biofilm.

Background/Description of Related Art

In the laundry, textile, and personal care industries, significant challenges remain in reducing odor, especially human body odor in fabrics including synthetic fabrics such as polyester. Persistent odor in polyester has been reported by many users, especially those who engage in strenuous exercise regularly. Many report that malodor, especially in the axillary regions, returns quickly after thorough laundering, and sometimes may not be thoroughly removed by laundering. Such malodor is sometimes called "perms-odor" or "perms-stink." We have observed, for example, that some sports apparel may continue to have symptoms of perma-odor even after treatment with dilute bleach or other harsh agents that normally might be expected to eliminate microbial sources of odor. Repeated washing is often ineffective, even with advanced commercial laundry detergents. Many users simply feel they have to discard such infected clothing. There is a long-standing need for means to reduce such perma-odor or other forms of persistent odor in clothing.

Without wishing to be bound by theory, we propose that the recalcitrance of perma-odor is akin to the recalcitrance of bacterial infections when a microbial biofilm is present. Biofilms are remarkable adaptations of bacteria and other microbes such as protists and fungi, including yeasts, in which polysaccharides, proteins, DNA, and other materials may be used to create a protective matrix that can prevent antimicrobials or harsh chemical agents from penetrating effectively. In a biofilm, microbes, sometimes from more than one species, share chemical signals and cooperate to create protective materials that help secure them on a solid surface and protect them from external threats, allowing them to reproduce and thrive. However, there has not yet been a widespread recognition of the role of biofilms in athletic clothing and ordinary attire, ranging from sports gear to casual wear, office wear, and formal attire, including socks, shoes, underwear, shirts, pants, bedding, medical attire, and so forth, but especially clothing items in contact with portions of the body such as the underarms where sweat commonly occurs. Indeed, a common view is that conventional washing and drying is likely to prevent biofilms from forming. See, for example, Erin Williams, "Bacterial Biofilms: Live Chat with Rob Hull," *Nappy Science Gang* blog, Oct. 8, 2016; https://nappysciencegang.wordpress.com/2016/10/08/bacterial-biofilms-live-chat-with-rob-hull/. Our explorations, in contrast, suggest that biofilms in clothing can provide a microbial stronghold for generation of perma-odor, but we have discovered approaches that can undermine the biofilm material and help reduce odor in clothing.

Biofilms in fabrics may present problems in a variety of other areas also in need of improved solutions, and the advances disclosed herein may be helpful in those areas. For example, sanitation of clothing, medical apparel, linens, draperies, carpets, upholstery fabrics, protective apparel, towels, rags, wall coverings, and other fabrics used in medical care facilities and by healthcare workers is an increasingly serious problem, as it may be in homes, hotels, senior care facilities, aircraft, automobiles, buses, trains, aquatic vessels such as boats and submarines, laundromats or public or private laundry facilities, airports, prisons, schools, and institutions of many kinds. It is possible some of the recalcitrant microbial challenges faced there may be exacerbated by the formation of biofilms or by other mechanisms similar to those at play with perma-odor in textiles. The materials and methods shown to be useful in reducing perma-odor therefore may also be applied to such environments to mitigate fabric-based biofilms or other biofilms and strengthen the ability to attack such biofilms or related structures during cleaning or laundering of the surfaces (e.g., fabrics) with the methods and materials described herein.

SUMMARY

It has been discovered that perma-odor in a variety of textiles can be significantly mitigated through treatment with the combination of certain enzymes with one or more biofilm attack agents such as N-acetyl cysteine, mixtures of N-acetyl cysteine with other agents such as panthenol, or other agents described herein, applied for an effective period of time, followed by or performed substantially simultaneously with laundering with a laundry detergent, treatment with other soaps and detergents, or simply rinsing with water. Enzymes used in combination with biofilm attack agents in one aspect are provided as an enzymatic blend comprising surfactants and optional bacterial spores or live bacteria. The biofilm attack agents such as N-acetyl cysteine are provided in a solution, either with the enzymes or in a separate container, or provided at least partially in solid form such as a capsule, a powder, a tablet, a stick, etc., to be dissolved in an aqueous solution before, after or during application to the textile item being treated.

In describing the various versions and aspects of the methods and products disclosed herein, it should be understood that the elements, steps, features, etc. of any version or aspect are combinable with any other version or aspect or collection of versions and aspects unless stated otherwise or clearly unsuitable.

Thus, in one aspect, a method is provided for treating a solid material such as fibrous material including textiles, items of clothing, woven and nonwoven materials or combinations thereof, etc., wherein the material is suspected of having microbial biofilm matter in one or more regions that may be associated with persistent odor or other symptoms, or used in an environment or application at risk of developing biofilm and/or persistent odor, the method comprising applying an enzymatic composition to the one or more regions of the solid material, providing suitable time for the enzymatic mixture to attack biofilm, and then washing the textile item, wherein the enzymatic composition comprises: (a) water, (b) from 5% to 60% of a surfactant, (c) from 1% to 20% of an enzyme mixture comprising at least two of lysozyme, proteinase, amylase, mannanase, lipase, pectinase, DNAse and cellulase; and (d) from 0.1% to 10% of N-acetyl cysteine. The enzymatic composition in some aspects is packaged with indicia instructing a user to wait at least 5, 10, 15, or 30 minutes between applying the enzymatic composition and washing the textile, wherein washing generally comprises washing in water with a laundry detergent but may comprise rinsing without use of further detergents. In some aspects, the enzymatic composition further comprises from 0.01% to 8% by weight of bacterial spores adapted to become active in response to the presence of contaminants selected from at least one of proteins, carbohydrates, lipids, and carbohydrates, the spores then producing enzymes that attack a portion of said contaminants. The spore concentration in the enzymatic composition may be from $1\times10^5$ to $5\times10^{10}$ CFU/ml.

The enzymatic composition in some aspects comprises at least two portions, a first portion comprising an enzyme mixture and a second portion comprising N-acetyl cysteine (NAC), further associated with indicia instructing a user to apply both portions to the one or more regions of the textile item associated with persistent odor. The enzyme mixture in this or other aspects is in a liquid or comprises dry granulated enzymes that are combined with liquid prior to application to an item of clothing or other material.

In some aspects, the second portion comprising NAC is in liquid or powder form separate from the enzymes but adapted to be combined with the enzymes on the clothing, such as by adding the powder or a solution to the clothing before, after, or while adding the enzyme mixture and other components of the composition. The second portion of the enzymatic composition may comprise from 1% to 90% N-acetyl cysteine, optionally from 1% to 10% panthenol, and sufficient alkaline agents such that when the second portion of the enzymatic composition is combined with enough water at pH 7.0 to bring the concentration of the N-acetyl cysteine to 1%, that the pH of the resulting aqueous mixture is at least 6.0. Such a composition can be effective in reducing the amount of biofilm matter present or the surface area with biofilm matter present in the textile item, and is also effective in reducing malodor in the textile item, while also being substantially free of non-enzymatic bleaching agents.

Some aspects also comprise visualizing the presence of suspected biofilm matter using UV light. In such cases, the textile item with malodor may have been treated with a suitable dye that fluoresces in UV light to identify one or more regions that show relatively high fluorescence in UV light, wherein the enzymatic composition is applied to at least one of the one or more regions that show relatively high fluorescence. Such a dye may comprise any known optical brightener such as Calcofluour White and other compounds known to preferentially absorb onto cellulose fibers and onto biofilm material.

In some aspects, the enzymatic compositions and/or biofilm attack agents described herein are applied to textile items with malodor, while the wearer is also provided with a deodorant adapted to transform the skin microbiome such that malodorous bacteria, particularly in the region of the body associated with the malodor in clothing with persistent odor, become less prevalent through the application of the deodorant, the deodorant comprising at least 0.1% of an alpha hydroxy acid having and having a pH from 2.8 to 5.5, from 2.8 to 5, or from 2.8 to 4.5, wherein the wearer is instructed to apply the deodorant at least once to the underarms or region on the body associated with malodor detected in the textile item, followed by or preceded by wearing the item of clothing while also using the deodorant applied to the portion of the body associated with malodor in the textile item.

Through extensive experimental work, possible solutions to reduce or eliminate perma-odor have been found using materials that are generally safe and suitable for use in consumer products and in some cases may even be known as edible dietary supplements or components of natural edible products, rather than harsh compounds or restricted pharmaceutical compounds. Application of the pretreatment followed by laundering can be effective in reducing perma-odor in clothing, and the effect is believed to be achieved at least in part by undermining biofilm material that may exist in articles with perma-odor.

The pretreatment can be applied with a liquid medium that is sprayed, poured, wiped, daubed, rolled on, or otherwise transferred to articles of clothing, particularly to regions suspected of having malodor. The liquid medium may be provided to the user in ready-to-use form, or may be provided as a concentrate such as a liquid, slurry, paste, or solid such as a powder that can be prepared by the user through addition of water or through the mixing of two or more components to create the ready-to-use composition. The pretreatment may involve comprise two or more physically distinct compositions, such as first and second sprays or mixtures in any suitable form (powder, paste, etc.) applied before or after the first spray is applied.

In some aspect, evidence for the existence of a biofilm is considered by the user in applying the pretreatment. Thus, in one aspect, a method of detecting and mitigating a microbial infection in an article of clothing comprises: 1) exposing an item of clothing one or more times to a solution comprising at least 0.001% of one or more fluorescent optical brighteners such as Calcofluor White (an optical brightener believed to be present in many common laundry detergents), 2) shining UV light on the item of clothing to determine if there is preferential absorption of optical brighteners in a region of the clothing, 3) treating the region with preferential absorption of optical brighteners with an effective amount of an enzymatic mixture comprising an effective amount of bacterial spores, one or more surfactants, and a mix of at least three laundry enzymes, 4) allowing the enzymatic mixture to reside on the clothing for an effective time, and then 5) washing the clothing to remove the enzymatic mixture, wherein the treatment results in reduction of fluorescence and/or reduced perma-odor characteristics. In a related aspect, the item of clothing is also treated with a biofilm attack agent such as NAC and panthenol.

In one aspect, the enzymatic mixture is provided as a liquid concentrate comprising: (1) surfactant at a concentration of 10% to 55%, more specifically 15% to 45%, and more specifically still from 20% to 35%, such as naturally-derived non-ionic surfactants derived from plant carbohydrates (e.g., from corn or potatoes) and from plant oils such as coconut and palm oil; (2) a mixture of at least 3, 4, 5, or 6 more different classes of enzymes, such as a mix of protease, cellulase, amylase, lipase, mannanase and pectinase (pectin lyase), wherein the enzymes are provided in liquid concentrate form that comprise from 5% to 20% of the mass of the mixture (including water), such as from 8% to 20% or 8% to 15%, wherein the total protein mass can be from 3% to 15% of the concentrate, the protease mass from 1% to 5% of the concentrate, and wherein the lipase comprises between 1% and 25%, or between 1% and 10%, or between 1% and 7% of the total enzyme mass (or, in some versions, the concentrate has less than 0.6% total lipase or is substantially lipase free); (3) from 1% to 10% salts for pH control and enzyme stability, such as from 1% to 4% sodium citrate and 1 to 4% sodium bicarbonate; (4) optionally an effective amount of a mixture of bacterial spores, such as *Bacillus subtilis* marketed by Novozymes Biologicals, Inc., USA or JTech Sales (Baton Rouge, FL), or the spores described in US Patent Application No. 20190284647, "Spore Containing Granule," published Sep. 19, 2019 by P. Bach.

In another aspect, the bioenzymatic mixture ready for application to clothing comprises (1) an effective amount of bacterial spores comprising between $1\times10^5$ and $5\times10^{10}$ CFU/ml (colony forming units per ml) of *bacillus* spores, more specifically from $1\times10^7$ and $5\times10^9$ CFU/ml, such as from $1\times10^7$ to $8\times10^8$, (2) a mix of at least three or at least four or at least five laundry enzymes from at least three different categories of enzymes collectively having a total enzyme concentration from 1% to 20% and optionally no more than 1.5% or 3% lipase, (3) at least one surfactant such as non-ionic surfactants having a concentration from 5% to 40% in the bioenzymatic mixture, (4) at least 15% water such as from 10% to 80% water or from 30% to 80% water; (5) optionally from 1% to 10% of a solvent other than water such as propanediol, 3-phenyl-1-propanol, (2,2-Dimethyl-1,3-dioxolan-4-yl)methanol (also known as Solketal, isopropylidene glycerol, or Augeo Multi Clean), propane diol, propane glycol, propylene glycol, glycerin, isopentyldiol, pentylene glycol (in general, any alkyl diol having from 3 to 9 carbons and a viscosity at 20° C. of at least 5 mPa-s and more specifically any 1,n-alkanediols for n less than 9), 2-methoxy-2-phenylethanol, 2-phenylethanol, methyl chavicol, and myristicin aldehyde. Liquid alkyl triols may be considered such as butanetriol. Esters having up to 7 carbons with carboxylic acids having up to 8 carbons may be considered, including, for example, neopentyl glycol diheptanoate and other mono- and diglicerides.

In one aspect, an item of clothing is treated with a biofilm attack agent in a target region suspected of harboring a biofilm, the method comprising:

1) applying an effective amount of a naturally-derived biofilm attack agent to the target region, the biofilm attack agent being selected from one or more of N-acetyl cysteine, panthenol or a derivative thereof, a catechin, and a biofilm attack enzyme such as DNase, lysozyme, etc.,
2) simultaneously, subsequently, or previously applying a bioenzymatic mixture comprising bacterial spores suitable for attacking typical energy sources for bacteria, one or more surfactants, and an enzyme mixture of three of more categories of laundering enzymes selected from proteases, cellulases, amylases, mannanases, lipases, pectinases, and DNases;
3) providing suitable conditions for the spores to become active (i.e., providing sufficient time such as 1 hour or more or 2 hours or more at a suitable temperature such as 15° C. to 60° C., 18° C. to 45° C., or 20° C. to 40° C. with suitable moisture such as at least 10% moisture in the item of clothing, or from 10% to 80%, 15% to 50%, or 20% to 50% moisture relative to the dry fiber weight);
4) washing the item of clothing in a washing machine with a detergent and then drying the item of clothing, wherein the method is effective in reducing the amount of biofilm matter present relative to what is possible with washing alone.

Applicant has found that "biofilm attack agents" (so termed even though our understanding of the theory behind the success of these agents may be incomplete) useful for undermining perma-odor may comprise one or more of:

1. N-acetyl cysteine (NAC), a relatively non-toxic medication often used to treat overdoses of acetaminophen and to help treat cystic fibrosis in part by reducing phlegm viscosity, and also known as a commercial dietary supplement due to its antioxidant properties. The NAC in some aspects is combined with panthenol or derivatives thereof, optionally various salts or buffering agents, optional surfactants, and other optional agents such as allantoin, cyclodextrin, zeolites, phosphates, chelants, enzymes, antimicrobials, catechins, bacterial phages and the like, wherein, without wishing to be bound by theory, NAC is believed to open up the biofilm at least temporarily in order to allow a second agent to be more effective, often giving strongly synergistic results in the reduction of perma-odor symptoms.
2. Lysozyme, pectinase including fruit pectinases and other pectinases that may optionally have an optimum efficiency under acidic conditions such as from a pH of 4 to 6.5, and other enzymes capable of attacking portions of the biofilm matrix or reducing the ability of the biofilm or bacteria to adhere to a fabric. Such other enzymes may include certain endoglucans or cellulases, proteinases, amylases, mannanases, DNase, alginate lyase, F-actin, and bacterial-produced enzymes for lysing portions of a mature biofilm. Selection of enzymes depends on the textile substrate, the bacteria leading to malodor or biofilm formation, the environment of the textile that contributes to malodor formation, and the nature of the energy sources that are consumed by the odor-causing or biofilm producing bacteria.

In one aspect, a laundering composition comprising a biofilm attack agent is provided for users to apply to an item of clothing suffering from strong odor. The composition may be provided as a powder, a liquid concentrate, or ready-to-use material that may be in the form of a liquid, a foam, a paste or slurry, etc., and may be provided in two or more containers for application in two or more steps, such as rubbing a paste or applying a foam or spraying a solution or sprinkling a powder onto a malodorous region of an article of clothing, followed by further treatment with another material such as spraying a solution, applying a foam, rubbing a paste, sprinkling a powder, etc., followed by rinsing or washing and drying.

Thus, by way of example, in one aspect, a method for removing persistent odor in clothing is provided comprising applying an aqueous composition to clothing prior to washing, comprising from 0.1% to 10% NAC, one or more laundering enzymes at a concentration of from 0.1% to 7% or from 0.5% to 5% or from 0.6% to 3%, and from 0.1% to 25% or from 0.5% to 10% of one or more surfactants, buffered or otherwise at a suitable pH such as from 2 to 6.7, 7 to 10.5, 6 to 8.5, 4.5 to 8, 3 to 6.5, 2.5 to 5, 7 to 11, 8 to 10.5, 7.5 to 10, and so forth. In another aspect, a powder comprising NAC particles may be applied to an item of clothing that is wetted by an enzymatic blend optionally also comprising one or more surfactants, panthenol, etc.

In one aspect, a multi-step method to reduce perma-odor comprises:

a) identifying an article of clothing with persistent odor in one or more odorous regions such as the regions adjacent armpits or other high-odor or high-sweating zone of the human body, or alternatively, displaying evidence of biofilm material when viewed under UV light, b) treating the article of clothing by applying a first solution comprising N-acetyl cysteine (NAC) such that at least 0.1 g, 0.2 g, or 0.3 g of NAC per 50 $cm^2$ area is delivered to the one or more odorous regions; and c) applying a solution comprising one or more laundry-suitable enzymes, and optionally one or more species of bacterial spores selected for the ability to assist in cleaning of textiles by producing one or more laundry-suitable enzymes in response to the presence of suitable contaminants; such that both NAC and the enzymes and/or spores are present simultaneously. (The first and/or second solution may further include surfactants such as polyalkoxy glycosides, sodium laureth/lauryl sulfate, etc., which may be applied in yet another step before or after the steps mentioned above.)

A related product comprises a container comprising NAC particles or solution and one or more compounds selected from panthenol and derivatives thereof; zinc, ammonium, or alkali metal (sodium, potassium, magnesium, calcium, etc.) salts such as chloride salts, carbonate salts, bicarbonate salts, citrate salts, formate sates, sulfate salts, phosphate salts, etc.; buffering agents; fragrance and/or odor reduction compounds that mitigate the odor of NAC. The container may comprise pouches that can be torn or cut open to mix with a laundry preparation or with water or sprinkled directly on clothing that is moist or will be moistened with water and/or laundry preparations such as an enzymatic blend delivered from a spray bottle or other applicator, etc. The product may be associated with indicia that directs users to apply the product to textiles in combination with enzymatic materials. Enzymatic material may be applied first, after NAC application, or simultaneously with NAC.

In one aspect, a laundry pretreatment with a biofilm attack agent is followed by or simultaneous with treatment by a cleaning composition comprising one or more of (1) enzymes effective in stain removal or laundering (e.g., proteinases, lipases, amylases, mannanases, cellulases, etc.), (2) a detergent, (3) optionally an antimicrobial agent such as a chemical antimicrobial agent or bacterial phages including bystander phages that may assist in attacking targeted microbes, particularly once the biofilm has been weakened or undermined to some degree.

In another aspect, the biofilm attack treatment is followed directly by washing such as in a top-loading or front-loading machine in cold, warm, or hot water using known laundry detergents such as Tide®, Gain®, Persil®, Arm and Hammer®, and the like. The laundry detergent may comprise a variety of laundering enzymes and surfactants, chelants, builders, bleaching agents, etc. Complexing or sequestering agents may be employed such as sodium carbonate and sodium bicarbonate, and/or chelants such as Dissolvine® GL-47-S (tetrasodium glutamate diacetate). Other chelants may include tetrasodium dicarboxymethyl glutamate, EDTA, trisodium nitrilotriacetate, ethylenediamine, glutamic acid, histidine, organic diacids such as malates, polypeptides such as phytochelatin, citrates, silicates, polymers of acrylic and maleic acid, PBTC (2-phosphonobutane-1,2,4-tricarboxylic acid), VERSENOL™ (Dow Chemical, Midland, MI), etc. Chelating agents may comprise from about 0.01% to about 5% by weight of the compositions herein.

In one aspect, the method for odor control further comprises providing suitable time for the biofilm attack agent and/or cleaning composition to be effective, such as a dwell time before adding the cleaning composition or a dwell time before washing of at least about 2, 5, 10, 15, 20, 30, or 60, minutes, or 2, 4, 6, or 8 hours, such as from 3 minutes to 1 hour, 5 minutes to 30 minutes, 3 minutes to 3 hours, 30 minutes to 8 hours, 1 minute to 30 minutes, etc. In one aspect, the user is provided with the biofilm attack agent and the cleaning agent, with suitable instructions. In another aspect, the user is provided with the biofilm attack agent, the cleaning agent, and a detergent, with instructions.

DETAILED DESCRIPTION

Definitions

Figure 1:
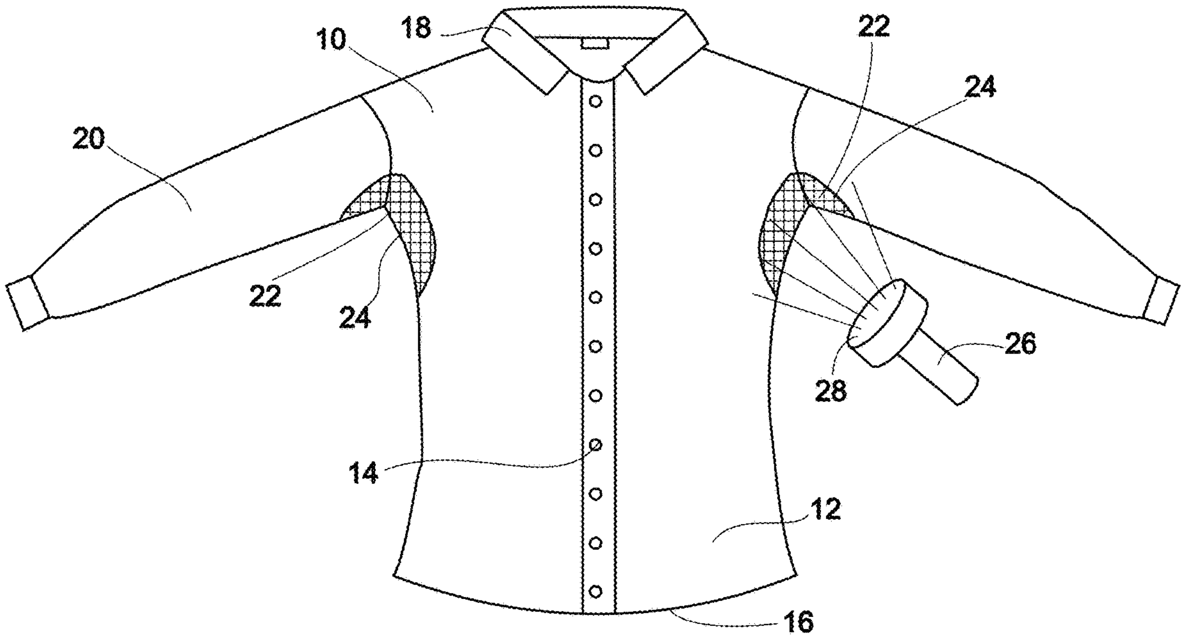
FIG. 1 depicts a shirt with UV-fluorescent biofilm-laden zones in the armpits of a shirt being illuminated with UV light.

As used herein, "N-acetyl cysteine" unless otherwise specified, includes N-acetyl cysteine, N-acetyl-L-cysteine, N-acetyl-D-cysteine, salts thereof such as pharmaceutically acceptable salts, and mixtures thereof. As used herein, derivatives of N-acetyl cysteine include esters, amides, anhydrides, and thio-esters and thio-ethers of the sulfhydryl moiety. Nonlimiting examples include methyl N-acetylcysteine, ethyl N-acetylcysteine, stearyl N-acetylcysteine, N-acetylcysteine methylthioether, N,S-diacetylcysteine, N-acetylcysteine amide, and the mixed anhydride of N-acetylcysteine and acetic acid.

As used herein, "odorants" and "odorous compounds" are the chemical sources of malodor, which are frequently derived from the action of microbes on typically non-odorous compounds in the sweat, sebum, or otherwise on the human body or in other materials that may be present on fabrics. Odorants may include 3-methyl-3-sulfanylhexanol (3M3SH), 3-methyl-2-hexenoic acid (3M2H), and 3-methyl-3-hydroxy-hexanoic acid (HMHA), acetic acid, isovaleric acid, 2-methyl-butanoic acid, 3-methylbutanoic acid, butanoic acid, (E)-3-methyl-3-hexenoic acid, ethylbutanoate, (Z)-4-heptenal, (E)-2-nonenal, 2-methoxyphenol (guaiacol), 4-methyloctanoic acid, sulfanylalkanols and particularly 3M3SH (3-methyl-3-sulfanylhexan-1-ol), and the odoriferous steroids androstenone and androstenol.

As used herein, "synthetic fibers" refer to fibers used in producing textiles that are not obtained from plant or animal sources such as nylon, polyester, acrylic and polyolefin fibers. Further non-limiting examples include modacrylic, Spandex, rayon (e.g., viscose, modal and lyocell), vinyon, saran, vinalon, aramids, PLA, etc.

As used herein, "optical brighteners" include dyes and related materials that fluoresce in UV and/or blue light to enhance the brightness or appearance of colors in various fabrics. Optical brighteners often absorb effectively onto natural fibers, but less on polyester or other synthetic fibers. They also often absorb onto biofilm matter. Typical optical brighteners are frequently stilbene compounds, particularly anionic diamino stilbene (DAS) or distyryl biphenyl (DSBP) derivatives, such as di- and tetra-sulfonated triazole-stilbenes and di-sulfonated stilbene-biphenyl derivatives. Optical brighteners such as those used in laundry detergents may include Calcofluor White (CAS 4404-43-7) or Calcofluor White M2R; C.I. Fluorescent brightener 260; Fluorescent Brightener FWA-1 (CAS 16090-02-1); Disodium 4,4'-bis(2-sulfostyryl)biphenyl (CAS 27344-41-8), also known as Tinopal CBS-X (BASF, Ludwigshafen, Germany); Uvitex 2B, Phorwite MBBH, 4,4'-bis(benzoxazolyl)-cis-stilbene, 2,5-bis(benzoxazol-2-yl)thiophene, 4,4'-diamino-2,2'-stilbenedisulfonic acid (amsonic acid, CAS 81-11-8), and the like. In laundry detergent, optical brighteners may be present at concentrations from about 0.02% to about 1%. Aqueous solutions or other solutions of optical brighteners used to identify the presence of biofilm matter may have any effective concentration, such as from about 50 PPM to 2%, 100 PPM to 1%, 100 PPM to 0.05%, 0.2% to 1%, and the like.

As used herein, the term "textile" means any material made of interlacing fibers, including fabrics, carpeting, etc., whether woven or nonwoven, or comprising including yarns, yarn intermediates, fibers, and fabrics made of these materials and related product (garments and other articles). Items made at least in part from textiles may include shirts, pants, socks, shoes, hats, gloves, underwear, suits, dresses, gowns, face masks, robes, linens, draperies, upholstery materials, etc.

As used herein, a "fabric" is a material made through weaving, knitting, spreading, crocheting, or bonding of fibers and may be used in production of further goods (garments, etc.), and includes both woven and nonwoven materials and may include knits, felts, multilayered materials, composites, denims, yarns, toweling, etc.

As used herein, "detergent composition" refers to compositions for removal of undesired compounds from surfaces such as textile surfaces. Such compositions may be in any suitable product form such as liquid, gel, slurry, dispersion, powder, solid stick, granulate, paste, or spray compositions. It may include liquid and/or solid laundry detergents and fabric detergents and may comprise one or more enzymes such as hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, beta-glucanases, arabinosidases, hyaluronidase, chondroitinase, laccase, DNase, chlorophyllases, amylases, perhydrolases, peroxidases, xanthanase and mixtures thereof. The detergent composition may further comprise ingredients such as surfactants, builders, chelating agents, bleach system or bleach components, polymers, fabric conditioners, foam boosters, suds suppressors, dyes, perfume, tarnish inhibitors, bactericides, fungicides, soil suspending agents, anti-corrosion agents, enzyme inhibitors or stabilizers, enzyme activators, transferase(s), hydrolytic enzymes, oxido reductases, bluing agents and fluorescent dyes, antioxidants, and solubilizers, etc.

As used herein, a "cleaning composition" can include a detergent composition for cleaning laundry or other textile material, but can include cleaning aids of use in cleaning many other surfaces such as bathroom surfaces, kitchen surfaces, walls, floors, machinery, foods, and the like. For example, in one version of a laundry cleaning composition comprising water, NAC at a level of 0.01% to 7%, such as from 0.5% to 2.5%, can be combined with 5-30% of a detergent formulation such 20% of Pilot Chemicals' (Cincinnati, OH) super concentrate blend comprising anionic, nonionic, and zwitterionic surfactants, plus 1-3% each of three or more enzymes, an optional solvent or stabilizer up to roughly 7% such as propylene glycol or propane diol, chelants and builders, various salts and buffering agents such as sodium citrate, sodium formate, calcium chloride, sodium carbonate, etc., to assist in stabilizing enzymes and providing a suitable pH. It may also comprise up to 4% rheology modifiers such as 1%-2% ACULYN™ 22 Rheology Modifier (Dow Chemicals, Midland, MI), or other polyacylates or suitable polymers. Such a cleaning composition can be applied to clothing items or other surfaces.

As used herein, the term "laundering" relates to both household laundering and industrial laundering and means the process of treating textiles with a detergent composition typically comprising surfactants and/or enzymes. The laundering process can for example be carried out using e.g. a household or an industrial washing machine such as front-loading or top-loading washers, or by hand.

As used herein, "derivatives of panthenol" may include pantothenic acid and salts thereof (e.g., the calcium, sodium, potassium salts, etc.), pantethine, pantetheine, and so forth. Panthenol is closely related to its derivative, pantothenic acid, and pantethine (bis-pantethine or co-enzyme pantethine), a dimeric form of pantetheine produced from pantothenic acid (vitamin B5) by addition of cysteamine. Most vitamin B5 supplements are in the form of calcium pantothenate. However, in one aspect, a composition may be substantially free of pantothenic acid while containing panthenol or derivatives thereof. Without wishing to be bound by theory, panthenol's efficacy against perma-odor and biofilms in infected fabrics may relate to the uptake of panthenol by microbes that need pantothenic acid, wherein the similarity to panthenol "fools" microbes into taking up panthenol as if it were a nutrient when it is not. Such a possibility in another context is proposed in G. F. Helaly et al., "Dexpanthenol and propolis extract in combination with local antibiotics for treatment of Staphylococcal and Pseudomonal wound infections," *Archives of Clinical Microbiology* 2/4 (December 2010). If that mechanism is applicable Applicant's results, then panthenol or its derivatives substantially free of panthothenic acid may be especially useful. However, it may also be that panthenol (a.k.a. dexpanthenol) has a softening effect or other secondary effect on the biofilm of an infected fabric.

As used herein, "post-treatment" in the context of the washing of clothing refers to an application of a formulation as described herein to all or a portion of an item of clothing after it has been washed. For washing done in an aqueous system, the post-treatment may be done prior to drying, after drying, or during drying.

As used herein, "washing" of clothing or other items made from fabrics or textiles generally refers to the use of water and a cleaning agent such as a detergent to remove soil, food, or other agents from the clothing, and may comprise the use of an automated washing machine running a programmed washing cycle comprising combinations of soaking, agitation, rinsing, and spinning to remove water. However, "washing" may also refer to dry cleaning, hand cleaning, chemical bleaching, solar or UV bleaching, treatment with disinfecting or cleansing vapors, etc.

As used herein, percentages in a composition should be taken as weight percent values unless otherwise specified. Thus, a suspension said to comprise 2% of, say, cucurbituril is understood to have 2% cucurbituril particles relative to the mass of the suspension itself, including the water or other liquids.

As used herein, ranges such as concentration ranges for a compound may have a lower limit and an upper limit selected from any suitable concentration value mentioned for that compound. In aspects where a compound is to be excluded or kept at a low level, the concentration range may be from zero or substantially zero (e.g., 0.1%, 0.05%, 0.01%, 0.001%, 100 ppm, 10 ppm, or 1 ppm) to an upper limit of any concentration mentioned herein for that compound or salts thereof.

N-Acetyl Cysteine

N-acetyl cysteine (NAC), a derivative of a vital amino acid, cysteine, is used as a medical agent to treat overdoses of acetaminophen and to help in treatment of cystic fibrosis. It is an antioxidant that is also marketed as a dietary supplement. We have found that aqueous solutions of NAC can help reduce perma-odor, either through direct attack or by enhancing the ability of cleaning agents such as enzymes or other compounds to clean the surfaces of infected fibers. NAC has been reported to have success in certain medical environments against several species of bacteria that can create biofilms. However, it can also promote biofilm formation under some circumstances, such as in the presence of other proteins found in the blood (see Supeng Yin et al., "NAC and Serum Increases Biofilm Formation," Cellular Physiology and Biochemistry, 45 (2018): 1399-1409).

The ability of NAC or any other medical agent does not appear to have been considered previously in terms of reducing malodor on clothing or in affecting the hypothesized biofilm formation that may account for some of the more intractable issues of odor control that occur for some users and clothing types. Of course, the usefulness of any compound in one environment against one particular bacterial species does not indicate success in another environment, especially when the target may be different bacteria.

NAC solutions in the range of 0.01% to 15% or more appear to be useful in reducing biofilm on fabrics with persistent odor, especially when combined with or followed by treatment with additional agents such as panthenol or derivatives thereof, laundry enzymes or other enzymes, catechins, detergents, and various solvents. Suitable formulations may have 0.1% to 13%, 0.5% to 13%, 1% to 10%, 0.3% to 8%, and 0.5% to 6% NAC, such as from 0.7% to 3.5% NAC. Without wishing to be bound by theory, it is believed that NAC may help opening up the biofilm (reducing viscosity or thickness, or increasing permeability of the biofilm) to allow the enzymes or other actives to more effectively attack the food source for the odor causing bacteria, or to allow antimicrobial agents or enzymes to more effectively attack the bacteria, or both.

NAC can be found in garlic, onion, etc., or derived from natural materials such as corn, typically through fermentation and extraction. It can be derived from cysteine through acetylation, or produced according to the methods described in EP0905282B1, or by Alexander G Zhdanko et al. in "One-step synthesis of N-acetylcysteine and glutathione derivatives using the Ugi reaction," Tetrahedron 65/24 (June 2009):4692-4702. NAC can be obtained in dietary supplements such as those marketed by Swanson.com, or from a variety of chemical suppliers. For some aspects, low-odor NAC such as Ajipure (Swanson Pharm., Fargo, North Dakota) or Fluimicil (Zambon Italia S.r.I., Milan, Italy) may be useful.

Odor neutralizers can also be included, including soyaethyl morpholinium ethosulfate, Metrazene®, cyclodextrins, etc. In some aspects, enzymes and/or bacteria or spores may be provided in a mixture having high ionic strength such as having at least 2% or higher, 5% or higher, 8% or higher, or 10% or higher, such as from 2% to 20%, 5% to 20%, 8% to 20%, 10% to 25%, etc., of a salt such as sodium citrate, sodium chloride, aluminum sulfate, ammonium sulfate, potassium chloride, etc. Citrate ions may be beneficial in some versions, and thus solutions of sodium citrate, potassium citrate, ammonium citrate, zinc citrate, and the like may be used.

Other agents can also be considered. Without wishing to be bound by theory, it is believed that some liquids may be useful as solvents or "biofilm modification" agents to soften or weaken a biofilm or enhance its permeability so agents may be more effective. Such agents may include 2"-hydroxycinnamic acid, 3-methyl-2(5H)-furanone, phenyl propanol such as 3-phenyl-1-propanol, propane diol, propane glycol, pentylene glycol, DMSO, panthenol, pantothenic acid, glycerin, 3-methoxyphenylacetic acid, 4"-hydroxyphenylacetic acid, 2-methoxy-2-phenylethanol, 2-phenylethanol, methyl chavicol (Basil oil) and other essential oils, myristicin aldehyde, 3,4-dihydroxybenzoic acid, and isopropylidene glycerol, also known as (2,2-dimethyl-1,3-dioxolan-4-yl)methanol or Solketal. They may be present at levels of at least 1%, 3%, or 5%, or from 0.5% to 15%, 1% to 8%, 1.5% to 6%, etc.

EGCG is known as an oral care agent, a probiotic agent for human consumption, and as an agent with various health benefits. Its potential in odor control and especially odor control of fabrics appears to have not yet been recognized. We have found particularly useful odor control systems can be produced using aqueous EGCG solutions. EGCG is most commonly available as an extract of green tea, typically produced in China. Applicant has found EGCG to be particularly useful at a purity of 98% or above, although purity levels of at least 80%, 85%, 90%, 92%, 95%, 97% and the like can also be used in some versions. EGCG may be combined with ascorbic acid, citric acid, mandelic acid, lactic acid, etc., to achieve a suitable pH to prevent color formation from reactions involving EGCG.

In some aspects, the composition may be substantially free of any or all of the following or any subset: ethanol, methanol, propanol, alcohols, alcohols having 3 or fewer carbons, alcohols having 2 or fewer carbons, glycolic acid, acetic acid, critic acid, latex, spermicides, Octoxynol-9, TEA (triethylamine, a compound which may contribute to unwanted odor) or derivatives of TEA, TMA (trimethylamine), ammonia or complexes thereof, amines, polyhydroxy fatty acids, polyhydroxy acids, alpha-hydroxy acids having 14 or greater carbons, fatty acids, polyhydroxy fatty acid esters (or polyhydroxy fatty acid derivatives such as esters, amides, and alcohols), benzoic acid, parabens, preservatives, perfumes, artificial colors, sodium bicarbonate, bicarbonates in solid or ionic form, retinol, or Retin-A. "Substantially free" in this context may mean lacking an effective quantity. For alcohols and acids this may be taken as less than 0.1%. In some cases, the concentration may be less than 0.05%.

Other Products

The laundry composition may comprise an effective amount of at least one of: (1) one or more enzymes selected from a protease, a lipase, an amylase, a mannanase, a pectinase, a lysozyme, a cellulase, and a DNase; (2) one or more quaternary amines such as, by way of example, soyethyl morpholinium ethosulfate, a quat known to be useful in reducing odor; (3) one or more essential oils with odor control and antimicrobial efficacy, such as the mix of essential oils marketed under as Odor Medicine O.F. Concentrate by Odor Medic, LLC (Minneapolis, MN); and (4) a biological agent such as a bio-enzymatic cleaner or deodorizer comprising one or more bacteria strains or one or more microbial phage strains that can be directly or indirectly effective in attacking targeted bacteria species.

Bacterial Spores and Other Microbial Agents

Bacterias spores used herein may be any of those described in U.S. Pat. No. 9,228,284, "Mitigation of odor in cleaning machines and cleaning processes," issued Jan. 5, 2016 to S. C. Mchatton, et al., particularly the strains of *B. subtilis*. See also U.S. Pat. No. 9,756,862, "Proportioner-ready bioenzymatic concentrated cleaning product," issued Sep. 12, 2017 to D. A. Cooper et al.

The spores are obtained from non-pathogenic spore-forming microorganisms that are capable of reacting with and removing various organic substances. Such spores can produce extracellular enzymes that may include protease enzymes, urease enzymes, amylase enzymes, lipase enzymes, cellulase enzymes, and combinations thereof. Commercially available concentrated of spores suspended in liquid may be used. Such spore concentrates may comprise from 1% to 50% of the compositions described herein, or from 5% to 30% or from 10% to 25%. The *bacillus* spores may constitute 0.05% to 60% by weight of the spore concentrate, and after blending with enzymes, surfactants, and other agents to form a concentrate or ready-to-use mixture for treating laundry, the bacterial spore concentration may be from about 0.01% to about 10% or 0.05% to 5%, or from 0.1% to 4%. Alternatively, the number of colony forming units (CFU) per ml in the concentrate or diluted mixture may be $1\times10^5$ to $1\times10^{10}$, $1\times10^5$ to $1\times10^9$, or $1\times10^6$ to $1\times10^8$.

The *bacillus* spores may have an average particle diameter of about 2-50 microns, such as from about 10 to 45 microns. *Bacillus* spores are commercially available in blends in aqueous carriers. Commercially available bacterial spore blends include without limitation Freshen Free™ CAN (10×), from Novozymes Biologicals, Inc.; J-Zyme AB-20XNF of JTech Sales (Baton Rouge, FL), a 20× liquid concentrate comprising spores from *Bacillus subtilis*; Bio-Enzymatic Odor Eliminator from Ecolab (St. Paul, MN); and Evogen® Renew Plus (10×) and Evogen® GT (10×, 20× and 110×), both from Genesis Biosciences, Inc. (Lawrenceville, GA). Here, the parenthetical notations (10×, 20×, and 110×) indicate relative concentrations of *bacillus* spores. Useful spores may include those made according to the methods described in J. Edward Donnellan, Jr. et al., "Chemically Defined, Synthetic Media for Sporulation and for Germination and Growth of *Bacillus Subtilis*," J. Bacteriology, 87/2 (February 1964): 332-336, or the spores described in US Patent Appl. No. 20190284647, "Spore Containing Granule," published Sep. 19, 2019 by P. Bach, which not only describes many spores but also describes how granulated enzymes capsules can be coated with bacterial spores in a single dry product, which may be of use in dry precursors to the liquid-based mixtures described herein.

Examples of commercially available bacteria to consider include Ecolab's Bio-Enzymatic Cleaner, bio-enzymatic "Biologicals" mixes provided by Novozymes Corp. (Bagsvrd, Denmark), bacterial mixes distributed by Maroon Group (Boca Raton, FL) such as J-Zyme™ AB-20X NFC distributed by J Tech Sales (Boca Raton, FL), a variety of Nature's Miracle products from Spectrum Brands (Middleton, WI), as well as the Bio-Enzymatic Stain & Odor Remover of Xion Labs (Kissimmee, FL) and the NATURE'S SOLUTION™ Bio-Enzymatic Deodorizer/Spotter/Digester of National Chemical Laboratories, Inc. (Philadelphia, PA). Also to be considered are bacteria described in US Patent Application 20180305658, "Composition of Bacterial Mixture and Uses Thereof" by M. T. Glimp, published Oct. 25, 2018. Such bacteria may include, for example, species and strains from Nitrospira including Comammox bacteria, Nitrosospira, *Nitrobacter, Nitrosomonas, Nitrosococcus, Lactobacillus; Lactococcus*, etc. The use of bacteria in the systems described herein should also comply with relevant health and safety requirements.

Also see US Patent Publication 20060062742, "Compositions for reduction of human malodor" by C. Davis, Mar. 23, 2006. Such bacteria, said to be useful in reducing human malodor, include bacteria selected from *Lactobacillus iners*, and similar clones. The composition may further comprise *Lactobacillus* variants such as *crispatus, casei, gasseri, fermentum, amylolyticus, acidophilus, jensenii*, coleo-*hominis*, etc. Other species may include *Anaerococcus, Dialister, Finegoldia magna, Bifidobacterium, Bacteroides, thetaiotaomicron, Lachnospiraceae, Leptotrichia, Streptococcus, Comamonas, Aerococcus, Veillonella, Mycoplasma*, and *Micromonas*. Other examples of bacterial compositions for odor control are described in US Patent Application 20110318289, “Methods and Compositions for Reducing Body Odor,” published by M. Frodyma of Novozymes Corp., Dec. 29, 2011.

Bacteria or spores may be provided in an aqueous suspension, a gel, a foam, a wipe, in microspheres, etc. One vehicle for delivery of beneficial bacteria may be microspheres comprised of poly (D.L-lactide-co-glycolide) (PLGA) and poly(D,L-lactide)(PLA) as described in Goodman, et al, “Microsheres Under In Vitro Release Conditions,” *APPS PharmSCiTech,* 2003: 4(4) article 50. Other methods for delivery are described in U.S. Pat. No. 6,509,028 issued to Williams, et. al on Jan. 21, 2003.

In an aqueous suspension, the concentration of bacteria or their spores may be 10 billion or more per liter such as form 10 billion to 200 billion per liter, or can be about 5 billion or more per liter, 500 million or more per liter, or 50 million or more per liter. The bacteria may comprise any number of species such as any integer from 1 to 1000, such as 1 species, 3 or more species, from 3 to 10, etc. Such agents can be present in a cleaning composition or in the biofilm attack agent, if compatible.

In some aspects, the cleaning composition may comprise phages that attack bacteria associated with malodor such as *Micrococcus luteus* or other micrococci. Phages are virus-like agents that attack specific strains of bacteria. Examples of phages for use in products intended for human use are described in United States Patent Application 20170157186, “Phage to Treat Bacteria on Skin,” published Jun. 8, 2017 by Jacob Shiach. See also US Application 20110038840, issued Feb. 17, 2011 to L-kuang Chen and Nien-tsung Lin, and US Application 20170319637, issued Nov. 9, 2017 to F. Pouillot et al. Commercial phage therapy for nutritional purposes to enhance the bacteria in the GI tract is marketed at Flora88.com by Optium, LLC (Provo UT), and similar phages can be considered for use with the compositions described herein. Another source of phages for commercial products is Micreos Food Safety B.V. (Wageningen, The Netherlands).

Phages can be provided in aqueous solution and applied with NAC, enzymes, flavanols and other agents to attack odorous bacteria or their biofilms. A related approach is the use of bystander phage technology, in which a phage attacks a specific microbe but induces the targeted microbe to release defensive antimicrobials in response, which in turn can target a broad spectrum of nearby bacteria. Bystander phage therapy is being offered for commercial use through Brigham Young Univ. from the research of Dr. Sandra Hope, as described by T. Scott Brady et al., “Bystander Phage Therapy,” *Antibiotics* 7/4 (2018): 105.

Enzymes

Enzymes, particularly hydrolases, have been used as a tool for laundering fabrics for decades. Among hydrolases, proteinases, amylases, cellulases and mannanase are also commonly employed in some products. Lysozymes, pectinases, and DNases may also be considered.

Enzymes may be of any suitable origin, such as vegetable, animal, bacterial, fungal and yeast origin, and may be modified in various ways and expressed via host organisms in which the genetic material responsible for the production of the enzyme has been cloned. The enzymes can be added as separate single ingredients (prills, granulates, stabilized liquids, etc. containing one enzyme) or as mixtures of two or more enzymes (e.g. cogranulates or blends in solution).

There are a wide variety of specific enzymes. Numerous powder and liquid detergents for washing machines, including machines for clothes washing as well as dish washing, comprise blends of enzymes to provide detergency effects. Enzymes useful with the formulations described herein may include any combination of lipases, proteases, amylases, cellulases and mannanases, pectinases, hemicellulases, peroxidases, lysozymes, xylanases, phospholipases, esterases, cutinases, pectinases, laccases, keratanases, reductases, oxidases, phenoloxidases, lipoxygenases, ligninases, pullulanases, tannases, pentosanases, malanases, β-glucanases, arabinosidases, hyaluronidases, DNAse, chondroitinases, and hexosaminidases, including those described in U.S. Pat. No. 6,489,279, “Laundry and cleaning compositions containing xyloglucanase enzymes,” issued Dec. 3, 2002 to Convents et al. However, in some aspects the composition may be substantially free of particular enzymes, such as substantially free of any particular class of enzymes such as lipase or laccase (e.g., having less than 0.2%, less than 0.1% or less than 0.05% by weight of the excluded enzyme or enzyme category) or substantially free of the bacteria or bacterial spores that produce the excluded enzyme or enzyme category. Some lipases may be most effective at low moisture levels, such as from 10% to 40% moisture in fabric, acting primarily at air-water interfaces, and thus the peak activity of lipase applied to laundry may occur after washing as the clothing is air dried or tumble dried, resulting in some components that may remain in the clothing until washed again, raising the risk of malodor when lipase concentration is too high. Thus, one may limit lipase to less than 25%, 15%, 10%, or 5% of the enzymes present, with lower limits of, say, 1%, 3%, 5%, or 10%, when feasible. Lipases may include those derived from shrimp and other marine life.

As used herein, “laundering enzymes” refers to enzymes commonly incorporated into laundry detergents, both liquid and granulated detergents, such as lipase, cellulase, mannanase, protease, pectinase, and amylase. These are often engineered to be active at an alkaline pH such as from 7 to 9.5 or 7.5 to 8.5 but may individually or collectively be adapted for optimum performance in other pH ranges such as from 3 to 12, 3 to 6, 4 to 7, 5 to 8, 6 to 8, 4.5 to 8.5, 5 to 7.6, 3.5 to 6.5, etc.

Enzymes may be incorporated in a product at levels from 0.01% to 20% of active enzyme by weight, or from 1% to 15%, 2% to 12%, and the like. Examples of potentially useful enzymes are disclosed in U.S. Pat. Nos. 5,576,282, 5,728,671 and 5,707,950. Proteases are described in WO 95/30010, WO 95/30011, and WO 95/29979. Peroxidase enzymes are discussed in U.S. Pat. Nos. 5,576,282; 5,728,671; 5,707,950; 5,817,495; 5,968,883 and in European Patent application EP No. 96870013.8. A range of enzyme materials for detergent compositions are found in WO 9307263 and WO 9307260 to Genencor International, WO 8908694 to Novo, and U.S. Pat. No. 3,553,139 to McCarty et al. Enzyme materials useful for liquid detergent formulations are discussed in U.S. Pat. No. 4,261,868, Hora et al, Apr. 14, 1981. Enzymes for use in detergents can be stabilized by various techniques discussed in U.S. Pat. No. 3,600,319, EP 199,405 and EP 200,586, and U.S. Pat. No. 3,519,570. Enzymes produced by bacterial phages may also be employed, including polysaccharide depolymerases or EPS depolymerases and phage endolysins.

As used herein, “lysozyme” is a glycoside hydrolase that can be found in egg whites of chickens, in human milk and the milk of some mammals. It catalyzes the hydrolysis can cause lysis of some bacteria. Lysozyme activity generally increases with increasing temperatures, up to about 60° C., with a pH range of 6.0-7.0 for best activity. Suitable concentrations of salts such as sodium chloride or potassium salts can increase lysis by lysozyme (e.g., a salt concentration from 0.01 to 7%, 0.1% to 3%, 0.02% to 1.5%, 0.05% to 1%). Alternatively, the enzyme solution may be substantially salt free, such as having an upper limit in concentration of less than 0.1%, less than 0.05%, less than 0.01%, or less than 0.001% salt; upper limits to be considered may also include 100 ppm, (parts per million), 10 ppm, 1 ppm, 100 ppb (parts per billion), 10 ppb, 1 ppb, and 10 ppt (parts per trillion). These upper limits can also be applied to limit the amount of any optional ingredient or potentially adverse ingredient described herein. These limits can be taken as applicable if desired to any known toxin, pollutant, dye, pharmaceutical compound, and so forth, in order to achieve such objectives as meeting safety guidelines, reducing harm to the environment, or preventing harms to the treated products.

Proteases (sometimes known as peptidases) may include serine proteases, which include a serine group in the catalytic center, or metallo proteases, cysteine proteases (including papain and bromelain), aspartic proteases, threonine proteases, and the like. Examples of alkaline proteases are subtilisins, especially those derived from *Bacillus*, e.g., subtilisin Novo, subtilisin Carlsberg, subtilisin 309, subtilisin 147 and subtilisin 168 (described in WO 89/06279), such as Subtilisin A (Enzyme Commission or EC number 3.4.21.62), marketed by Novozymes, an alkaline non-specific serine protease from *Bacillus subtilis* that catalyzes the hydrolysis of proteins and peptide amides. Variants include subtilisin BPN' (also subtilisin B, subtilopeptidase C, nagarse, nagarse proteinase, subtilisin Novo, bacterial proteinase Novo) and subtilisin Carlsberg (subtilisin A, subtilopeptidase A, alcalase Novo). Examples of trypsin-like proteases are trypsin (e.g. of porcine or bovine origin) and the *Fusarium* protease described in WO 89/06270 and WO 94/25583. Other examples of useful proteases are the variants described in WO 92/19729, WO 98/20115, WO 98/20116, and WO 98/34946. Proteinase K may also be considered, but can pose a threat to keratin and thus to wool.

Other commercial serine proteases from Novozymes include: Alcalase®, an esterase that hydrolyzes amino esters which include heterocyclic amino esters; Savinase®, which can hydrolyse some esters as well as strained amides under alkaline conditions; Esperase®, an endo-peptidase with a broad specificity; Neutrase® (E.C.3.4.24), a neutral, zinc metallo endo-protease from *Bacillus amyloliquefaciens* that randomly hydrolyses internal peptide bonds and also facilitates enzymatic synthesis of oligopeptides, and the related protease thermolysin, a zinc dependent metallo endo-protease; rTrypsin® (EC 3.4.21.4); and nattokinase, a protease with 275 amino acid units made by the bacterium *Bacillus subtilis* var. natto, manufactured by Daiwa Pharmaceutical (Tokyo), Contek Life Science Co., Ltd. (Taibei) and the Japanese Nattokinase Association organized by Japan Bio Science Laboratory (Osaka). Proteases may also include the peptidase known as SAPV from the halophilic Virgibacillus natechei sp. nov., strain FarD$^T$.

Pectinases can include those from any known source such as from bacteria, fungi and nematodes, and can include the XPect® series of pectinase marketed by Novozymes and related Pectinex® products. Pectinase products are often provided as a mixture of enzymes that may include pectintranseliminase, polygalacturonase and pectinesterase and small amounts of hem icellulases and cellulases. Pectinex® and several related enzymes are believed to be produced by a strain of the fungus *Aspergillus niger*, said to exhibit optimum activity around pH 4.5. In some aspects, the pectinase includes one or more pectinases of *Dickeya dadantii.*

Lipases (triacylglycerol acyl-hydrolases, EC 3.1.1.3) are typically classified as serine hydrolases and act to hydrolyze various lipids, typically only when present at an oil-water interface and generally do not hydrolyze dissolved substrates in the bulk fluid. Lipases, when used in the compositions described herein, may be biological or engineered lipases that are extracted from living organisms or combinations thereof. Microbial sources may include *Candida rugosa, Pseudomonas aeruginosa* and other *Pseudomonas* species, *Aeromonas* species, *Acinetobacter* species, *Burkholderia* species, *Aspergillus oryzae, Bacillus cereus, Bacillus coagulans*, and other *Bacillus* species, *Penicillium* roquefort, Geortrichum species, etc. Others include M1 Lipase® and Lipomax® (Gist-Brocades) and Lipolase® and Lipolase Ultra® (Novozymes). Lipase may also be extracted from arthropods, marine animals and mollusks, including lipase from the hepatopancreas of Pacific white shrimp (*Litopenaeus vannamei*), as described by S. Kuepethkaewa et al., *International Journal of Food Properties* 20/4 (2017): 769-781. Cutinases [EC 3.1.1.50] can be considered as a kind of lipase that does not require interfacial activation. See WO 88/09367 (Genencor).

Cellulases may include any combination of known cellulases including those used for laundry detergents or proposed for that purpose, including alkali stable endoglucanase from alkalothermophilic *Thermomonospora* sp. (T-EG); the BioTouch™ cellulases such as BioTouch™ FLX1, DCL, FCL75, Duo 505, and ROC 250 laundering composition of AB Enzymes (Darmstadt, Germany); *Aspergillus niger* cellulase; the acid, neutral, or alkaline cellulases of Creative Enzymes (Shirley, NY); the cellulases of U.S. Pat. No. 6,451,063, issued Sep. 17, 2002 to K. A. Clarkson et al.; and the Celluclast® and Cellic® cellulases of Novozymes, including Cellic® CTec3 HS, a cellulase and hem icellulase complex.

Mannanases may include Mannaway® from Novozymes, Cp-mannanase marketed by PhylloZyme (Philadelphia, PA) and extracted from *Trichoderma reesei*, or mannanase extracted from various leafs as described in Uma Kumari, "Validation of leaf enzymes in the detergent and textile industries: launching of a new platform technology," *Plant Biotechnology Journal,* 17 (2019): 1167-1182.

DNase can include deoxyribonuclease and related peptides or enzymes such as those described in U.S. Pat. No. 10,479,981, "DNase Variants," issued Nov. 19, 2019 to L. H. Oestergaard et al. Also to be considered are the compositions of WO 06/017816 and the Deoxyribonuclease I (bovine DNase I) of WO 2009/121183 and the materials of U.S. Pat. No. 9,675,736, "Compounds and methods for biofilm disruption and prevention," issue Jun. 13, 2017 to J. G. Burgess et al.

Various amylases (a and/or 13) can be included such as Termamyl®, Ban®, Fungamyl® and Duramyl®, from Novo Nordisk A/S Denmark. WO 94/02597 describes cleaning compositions with mutant amylases. See also WO94/18314, WO95/10603, U.S. Pat. No. 5,003,257, EP 252,666, WO 91/00353, EP 525,610, EP 368,341, WO95/26397, WO95/35382, WO 94/18314 and WO96/05295.

In many embodiments, a combination of enzymes is provided, either in solution or in powdered form. The combination may comprise commercial combinations such as Novozymes Leviti® mix of protease, cellulase, mannanase, amylase and pectinase, though such a mix can be assembled from individual sources. A mix can be fortified with additional individual enzymes such as lipase and other forms of protease such as papain, lysozyme, DNAse, and the like.

Antimicrobials

Antimicrobial agents may be present in any of the solutions used in the methods described herein. For example, common preservatives such as banzalkonium chloride, 1,2-benzisothiazolin-3-one or other isothiazolinones, methylchloroisothiazolinone/methylisothiazolinone, phenoxyethanol, potassium sorbate, propylparaben, benzyl alcohol, dehydroacetic acid, or benzoic acid may be present that also attack odor causing bacteria. Alternatively or in addition, nisin, lysozyme, antimicrobial peptides, etc. may be present. However, in some aspects, the composition may be substantially free from certain preservatives such as parabens and/or formaldehyde generators. Antimicrobials may be present in a composition at a level of 0.01% to 15%, 0.01% to 5%, or 0.05% to 2%, etc., and the NAC or salt or derivative thereof may comprises from 0.1% to 20% of the dry or wet mass of the composition. Other agents may include cetylpyridinium chloride, imidazolidinyl urea, propyl benzoate, sodium benzoate, potassium sorbate, biguanide, nisin, chitosan derivatives, silver nanoparticles or other silver-based compositions capable of releasing silver ions, etc.

Antimicrobial agents can include the cationic steroidal antimicrobial (CSA) compounds described by Paul Savage and D. Leung in U.S. Pat. No. 7,754,705, "Cationic steroid antimicrobial compositions and methods of use," issued Jul. 13, 2010; Carl Genberg and Paul Savage, U.S. Pat. No. 9,603,859, "Methods and products for increasing the rate of healing of tissue wounds," issued Mar. 28, 2017; and Carl Genberg, C. S. Beus, and Paul B. Savage, US Patent Application 20150374719, "Methods for Treating Fungal Infections," issued Dec. 31, 2015. Any of the compounds described therein such as CSA-13, CSA-25, CSA-54, CSA-90, CSA-92, CSA-190, CSA 191, and CSA 1921 and the like may be combined with the compositions described herein. Antimicrobials may have a concentration of from 0.01% to 1%, such as from 0.01% to 0.5%, or from 0.02% to 0.4% by weight. CSA compounds are commercially available from Purishield Life Sciences, LLC (Walnut Creek, CA) under the PuriShield®, Purifect® or Ceragyn® brands. The antimicrobial system may be substantially free of any one or more of parabens, formaldehyde donors, halogens, isothiazolinones, and phenoxyethanol.

Surfactants

A surfactant system can comprise nonionic and/or anionic and/or cationic and/or ampholytic and/or zwitterionic and/or semi-polar nonionic surfactants. They may be present at 0.01% to 25% by weight, such as from 0.1% to 5%, 0.5% to 20%, etc., or otherwise at an effective concentration to enable the solution comprising the surfactant to achieve the intended purpose of the surfactant, which may be, for example, enhancing penetration of the solution into a woven or nonwoven fabric or assisting in removing foodstuffs or other contaminants from a fabric. The surfactant can be formulated to be compatible with enzyme components.

Surfactants may be bio-based such as GlucoPure® Sugar Surfactants of Clariant, Spectrapon of Spectrum Chemical (Boca Raton, FL), Glucopon alkyl polyglycoside surfactants from BASF (Ludwigshafen, Germany), Sucranov SF from Jarchem (Newark, NJ) comprising a blend of Sodium cocoamph-oacetate, glycerin, lauryl glucoside, sodium cocoyl glutamate, and sodium lauroyl lactylate, or other systems comprising such components as glycosides of fatty acids and alcohols, polyether glycosidic ionophores and macrocyclic glycosides, carotenoid glycosides and isoprenoid glycolipids, biologically active glycosides of aromatic metabolites, lipopeptides, biologically active marine and terrestrial alkaloid glycosides, fatty acid amide glycosides and their analogs and derivatives, etc.

Biosurfactants may also include rhamnolipids or fungal extracts such as sophorolipids, or combinations of sophorolipids or other biosurfactants with sodium dodecyl sulfate (SDS) or other surfactants. Sophorolipids may weaken the EPS biofilm matrix, assisting in surface-detachment and breakup of the biofilm.

Polysorbate surfactants may be used such as Polysorbate 20 (often known as Tween 20), a nonionic surfactant formed by the ethoxylation of sorbitan before the addition of lauric acid. Polysorbate 40, 60, 65, 80 or other polysorbate surfactants may be used with other surfactants. Examples of nonionic, anionic, cationic, ampholytic, zwitterionic and semi-polar nonionic surfactants are in U.S. Pat. Nos. 5,707,950 and 5,576,282. Another nonionic class of surfactants is the TEGITOL™ series of surfactants of Dow Chemical (Midland, MI). Other known surfactants include alpha olefin sulfonates (AOS), cocamide MEA (CMEA), cocamidopropyl betatine (CAPB), lauryl alcohol ethoxylates, lauryl amine oxide, sodium coco sulfate, sodium lauryl ether sulfate, sodium lauryl sulfate, etc. Examples include are alkylamidopropyl-dimethylamine oxides such as NEOMINOX® CPG and NEOMINOX® LP of Oxtiteno.

Anionic surfactants include alkyl alkoxylated sulfate surfactants that are water soluble salts or acids of the formula $RO(A)_mSO3M$ wherein R is an unsubstituted $C_{10}$-$C_{24}$ alkyl or hydroxyalkyl group having a $C_{10}$-$C_{24}$ alkyl component, A is an ethoxy or propoxy unit, m is greater than zero, typically between about 0.5 and about 6, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates BIO-TERGE® AS-40 of Stepan Co. (Northfield, IL) are also contemplated.

Cationic surfactants include water-soluble quaternary ammonium compounds and various compounds with ethylene oxide moieties. The surfactant may further comprise a co-surfactant selected from the group of primary or tertiary amines such as amines. Other amines to be considered include 1-octylamine, 1-hexylamine, 1-decylamine, 1-dodecylamine, $C_8$-$C_{10}$ oxypropylamine, N coco 1-3diaminopropane, coconutalkyldimethylamine, lauryldimethylamine, lauryl bis(hydroxyethyl)amine, coco bis(hydroxyehtyl)amine, lauryl amine 2 moles propoxylated, octyl amine 2 moles propoxylated, lauryl amidopropyldimethylamine, $C_8$-$C_{10}$ am idopropyldimethylamine and $C_{10}$ amidopropyldimethylamine. Also to be considered are n-alkyl amines. Such amines for use herein may be selected from 1-hexylamine, 1-octylamine, 1-decylamine and laurylamine. Other primary amines include $C_8$-$C_{10}$ oxypropylamine, octyloxypropylamine, 2-ethylhexyl-oxypropylamine, lauryl amido propylamine and amido propylamine.

Regimens for Odor Control, Including Washing Machine Cleaners

The treatments and compositions described herein can be used as part of a regimen for odor control that includes not only applying pre- and post-treatments to laundered clothing, but can also be used in conjunction with personal deodorants, particularly with substantially aluminum-free and zirconium-free deodorants that reduce odor by enhancing the skin microbiome under the arms or on any part of the body where it is applied. Of particular value is use of the compositions described in U.S. Pat. No. 8,992,898, "Antiperspirants and Deodorants," issued Mar. 31, 2015 to Shannon Klingman; U.S. Pat. No. 9,566,223, "Products and methods for reducing malodor from the pudendum," issued Feb. 14, 2017 to Shannon Klingman, and U.S. Pat. No. 9,668,948, "Antiperspirants and Deodorants," issued Jun. 6, 2017 to Shannon Klingman; all of which are hereby incorporated by reference.

Such a regimen can also include periodic sanitizing of a washing machine to reduce the risk of microbes being transferred to clothing. In one embodiment, the laundry treatments are packaged with a washing machine treatment such as a powder, liquid, or tablet that can be placed in a washing machine and run in a washing cycle not to launder clothing but to attack biofilm and/or microbes in the washing machine. Such a washing machine cleaner may comprise from 1% to 80% NAC with suitable excipients (if in solid tablet form), panthenol, detergents, buffering agents, etc., such as a tablet comprising NAC, a binder such as magnesium stearate or a starch compound, sodium carbonate or other salts, catechins such as EGCG, and a detergent. In a related aspect, a solid cleaning table comprises 5-50% NAC, optionally 1-10% panthenol, optionally 3-20% boric acid or borax, 1-10% sodium carbonate peroxyhydrate or other peroxides, 1-10% sodium carbonate or other alkaline salts (sodium bicarbonate, potassium carbonate, sodium hydroxide, and so forth), and suitable excipients. An effective concentration of quaternary amines and other antimicrobials including CSAs can also be employed to attack microbes. Surfactants and other agents may also assist. In another aspect, a composition for the cleaning of biofilm material in washing machines for clothing and/or dish washers or other washers comprises: from 1% to 50% of a biofilm attach agent such as NAC, panthenol, and a catechin, such as 3% to 30% NAC and 1% to 25% panthenol; from 1% to 30% of boric acid, a borate salt such as sodium borate, or a combination thereof; from 5% to 20% sodium carbonate; from 2% to 25% sodium carbonate peroxyhydrate; up to 20% of a laundry enzyme or other enzyme described herein such as an enzyme mix in powder form comprising protease, cellulase, mannanase and lipase; and up to 25% of an anionic, cationic, or nonionic surfactant. In one embodiment, all the ingredients are provided in a single integral product that may comprise solid and liquid portions embedded in a water soluble polymeric film similar to that used in TIDE® pods (Procter & Gamble) or CASCADE® dishwasher pods, with the liquid portion comprising an enzyme solution, for example. A two-step process may also be employed comprising first spraying the interior of a washing machine with an enzymatic composition comprising enzymes and surfactants, optionally also comprising bacterial spores and one or more biofilm attack agents and/or antimicrobials, and after allowing the sprayed-on enzymatic mixture to reside for a predetermined time such as 1, 2, 4, or 6 hours, a wash cycle is then started which uses the solid ingredients that may be in the form of a solid tablet, capsule, or powder that is added to the interior, or which may be in liquid form or both. The water soluble film that may encapsulate all or part of the ingredients may comprise polyvinylalcohol (PVA) or a derivative of PVA, and may contain from 5 to 20% water when encasing dry ingredients or from 10% to 60% water when encasing liquids. MonoSol LLC (Merriville, Indiana) is a producer of such water-soluble films. Exemplary patents for such materials include U.S. Pat. No. 7,005,168, "Starch-loaded polyvinyl alcohol copolymer film for packaging non-liquid product and method for making the same," issued Feb. 28, 2006 to A. P. Verrall et al., and U.S. patent Ser. No. 10/443,024, "Water-soluble unit dose articles made from a combination of different films," issued Oct. 15, 2019 to P. F. Souter et al.

Segregated Materials

In treating surfaces including textiles, segregated materials may be provided. For example, one material may be in the form of a powder or tablet in a first container such as a plastic pouch, blister pack with a foil seal, a foil sealed packet, plastic or glass bottle or tube, a shaker similar to a salt shaker for shaking powder onto a surface, and so forth. A tablet may be an effervescent table that can be added to a quantity of water or other liquid to rapidly dissolve to form a solution. Sealed packets or pouches may be opened by tearing, popping a blister, peeling a peelable layer, and so forth. Packets. pouches, or pods may also be made with a water soluble film such as the films used in detergent "pods" such as TIDE® Pods or other films such as polyvinyl alcohol films, films made from starch, cellulose, or derivatives thereof, etc., including WATERSOL® film made by Arrow Green Technologies (Liverpool, UK) and SOLUBLON® film from Aicello (Toyohashi, Japan). Thus, a pouch or pod containing NAC and/or other biofilm attack agents and a segregated portion comprising enzymes and surfactants could simply be dropped into a container of water such as a spray bottle or other applicator, and upon dissolving, could be applied to a target region of a textile item with both NAC and enzymes.

One material may be in liquid form such as a concentrate in a bottle or pouch or flexible container to be mixed with water. The concentrate may be provided in a container large enough to accommodate the requisite amount of added water to turn the concentrate into a normal strength solution, or the concentrate may be poured or squeezed from a small container such as a tearable pouch or small rigid container into a larger container that can hold the additional water needed for dilution, which may be added before or after the concentrate is placed inside the larger container. The larger container may be a spray bottle or other liquid applicator for spraying, daubing, pouring, dipping, wiping, brushing, or otherwise applying the liquid to an item of clothing, a textile product, or other surface to be treated. In one embodiment, a powder is provided that can be mixed with water in a dispensing container such as a spray battle, sponge applicator, roll-on, a foam applicator, etc.

Separation of two or more components of the treatment may be designed to overcome problems were the components mixed at the time of manufacture. In some aspects, a first component is at a relatively lower pH while a second components is at a higher pH. Each of these components may be applied to the target substrate in separate steps or together. For example, a first component may comprise a formulation that is most effective or most stable at low pH, such as a mixture comprising NAC and/or a and/or a fruit pectinase or other enzyme having best efficacy at a pH below 7. The pH of the first composition may be from 1.5 to 7, from 1.9 to 6.9, from 2 to 6.5, from 2 to 5, and so forth. A second composition may have a higher pH such as from 7 to 12, from 7.2 to 11, from 8 to 11, etc. The difference in pH between the first and second compositions may be at least 0.3, at least 0.5, at least 1.0, or at least 1.5, such as from 0.3 to 5, or from 0.7 to 3.5.

The first or second composition may be applied first, followed by application of the second application, or visa versa. In some embodiments, they may be applied substantially simultaneously (e.g., via dissolution of the water soluble film of a pod having two or more isolated chambers within), or the user may be directed to wait a period of time between application, such as from as at least 1 minute, 3 minutes, 5 minutes, 10 minutes, 20 minutes, 30 minutes, an hour, 2 hours, 4 hours, 8 hours, 12 hours, etc. A time range may be provided in the user instructions (e.g., in the indicia associated with the product providing directions for use) using any of the aforementioned times as a lower limit, with an upper limit exceeding the lower limit by about 20%, 40%, 50%, 100%, 150%, 200%, 300%, 500%, or 1000% or more, such as time ranges of 1 to 10 minutes, 2 to 30 minutes, 5 to 60 minutes, 1 to 24 hours, 10 minutes to 1 hour, etc. A intermediate action may be recommended between the two applications, such as rinsing the area being treated following the first treatment, changing the pH of the treated region by applying a powder or spray of an agent such as a base or acid such as sodium bicarbonate, vinegar, etc.

For removing biofilm in washing machines, biofilm attack agents such as a powder comprising NAC with other solid ingredients and a solution comprising enzymes and detergents may be combined in a unit-dose pouch or "pod" typically held in a water-soluble film. Single or multi-compartment pods may be made as described in U.S. Pat. No. 9,470,638, issued to S. Kalaf, Oct. 18, 2016. Examples are marketed as Tide Pods, All Mighty Pacs, Purex Ultra Packs, etc. Further details are in US Appl. No. 2010/0192986A1, U.S. Pat. Nos. 6,995,126, 7,125,828, 7,127,874, 7,563,757, 7,964,549, US 2009/0199877A1, U.S. Pat. Nos. 6,881,713, 7,013,623, 7,528,099, and 6,727,215. A pod with biofilm attack agents may used in a washing machine cycle is run with or without clothing items to clean the machine.

DETAILED DESCRIPTION OF THE DRAWINGS

Unless otherwise stated, all percentages (%) are percentages by weight.

FIG. 1 depicts a shirt 10 having a main body 12, sleeves 20, a collar 18, a lower hem 16, buttons 14 for fastening, etc., with underarm regions 22. Depicted generally in the underarms region 22 is a malodorous biofilm region 24, present in both underarm regions 22. A handheld UV lamp 22 with multiple LED UV lights forming the illuminating face 28 of the lamp 26 is shown shining UV light toward an underarm region 22 to assist in visualizing the biofilm region 24. If the shirt has been repeatedly washed in a detergent comprising optical brighteners or has had an optical brightener solution applied to it followed by rinsing, the preferential absorption of the optical brightener(s) onto the biofilm may cause the biofilm region 24 to fluoresce (not shown), even under normal lighting conditions but most clearly visible in dim light or darkness as the UV light is applied. When repeated treatments of compositions described herein are needed, periodically inspecting fluorescence can assist in gauging progress as biofilm size and fluorescence intensity is gradually reduced. In some cases, a single treatment may show dramatic change.

Figure 2:
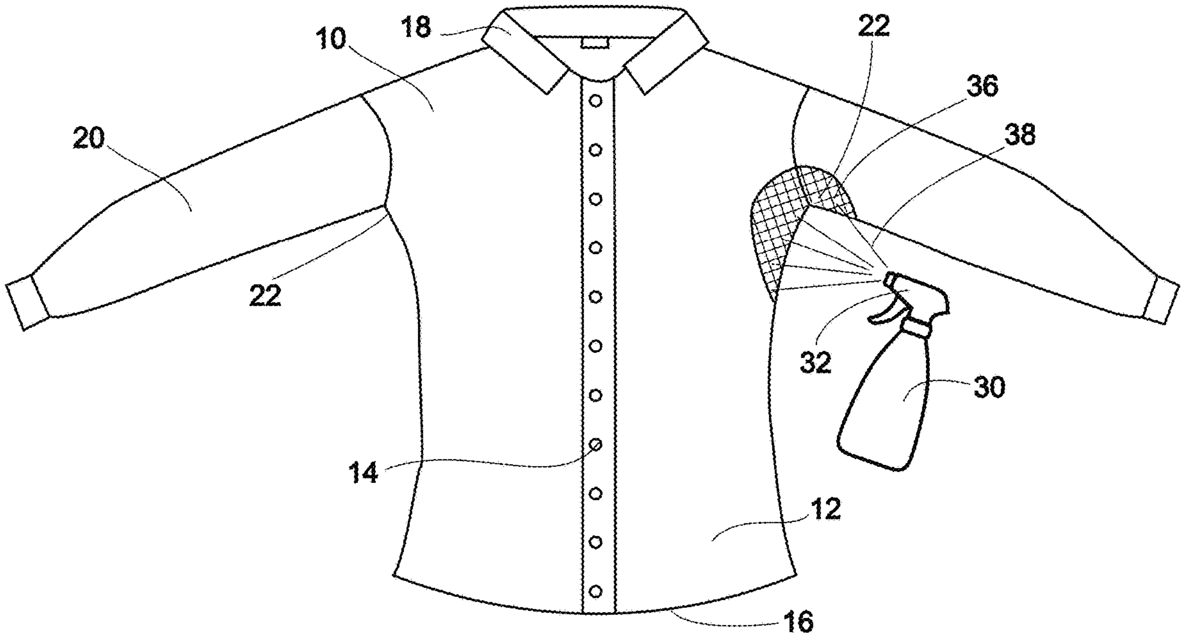
FIG. 2 depicts spraying a cleaning composition on a biofilm region.

FIG. 2 shows the shirt 10 of FIG. 1 but instead of biofilm regions (24 of FIG. 1), a wetted region 36 in an underarm region 22 indicates where the liquid in a spray bottle 30 is being applied as a spray 38 using a trigger spray mechanism 32. The liquid may comprise the enzymatic mix of detergents, enzymes, and optional bacteria or bacterial spores described herein, with or without additional biofilm attack agents such as NAC, panthenol, catechins, and/or biofilm modification agents. After spraying, the user may be instructed to wait about 15 or 30 minutes before washing.

Figure 3:
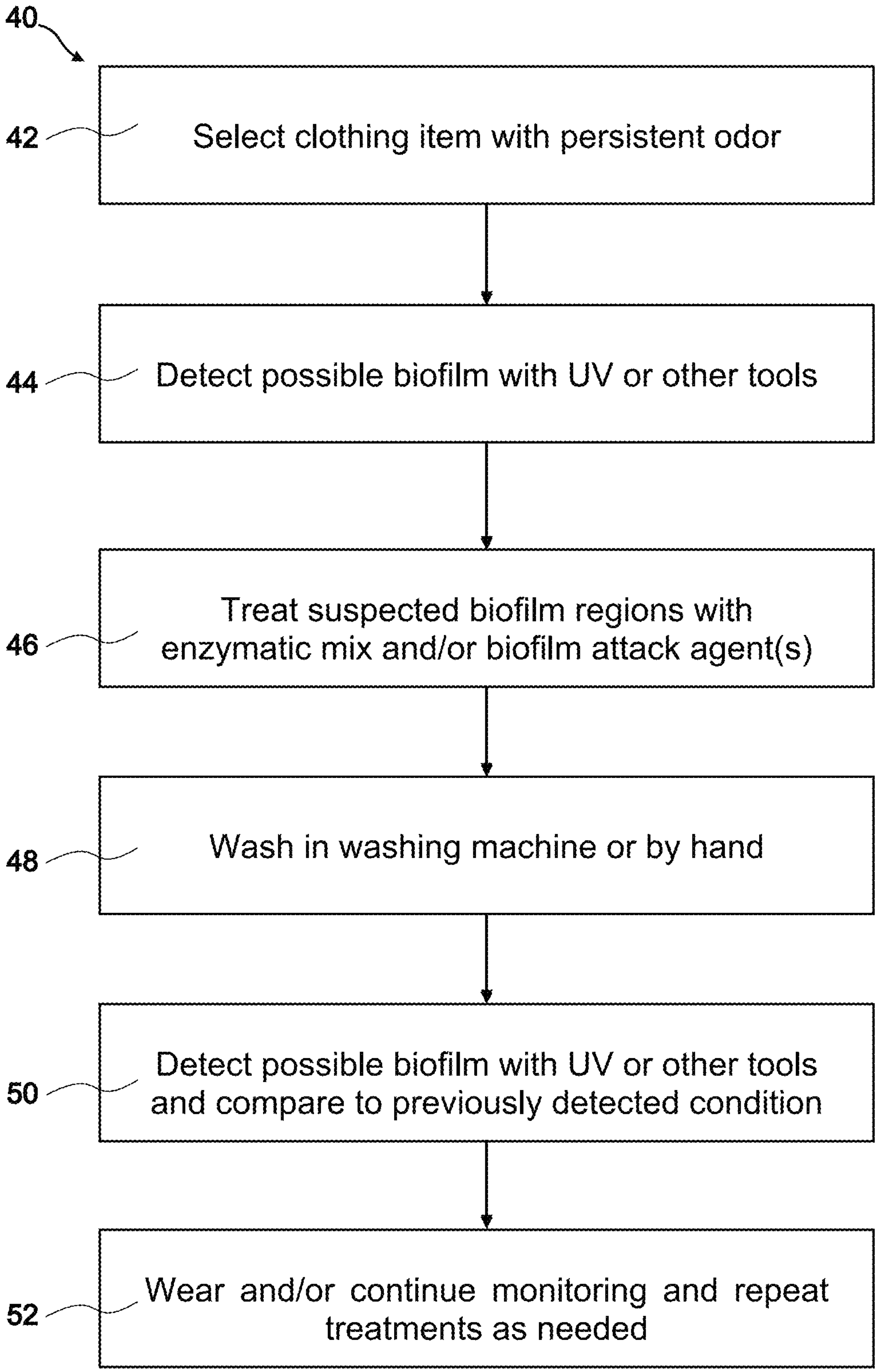
FIG. 3 depicts a flowchart showing a process in which biofilm visualization is used to guide treatment of clothing with persistent odor.

FIG. 3 is a flowchart 40 for one treatment method. In Step 42, a user selects a clothing item suspected of having persistent odor and/or a biofilm. In Step 44, the user may detect evidence of a biofilm using UV visualization or other tools (these may include confocal microscopy, fluorescence microscopy, dye staining with Crustal Violet, Congo Red, or other suitable dyes, inoculation of a sample from the item of clothing, etc.) to guide Step 46, the application of an enzymatic mix and/or biofilm attack agents to the locations likely to have biofilm. Then in Step 48, the item of clothing is washed and afterwards in Step 50, UV or other tools are applied to examine the remaining regions having apparent biofilm for comparison to the previous findings from Step 44, followed by Step 52, wearing or continuing monitoring and treating the item of clothing in additional cycles as needed. The result of the treatments should be not only reduced biofilm presence, but reduced malodor.

Figure 4:
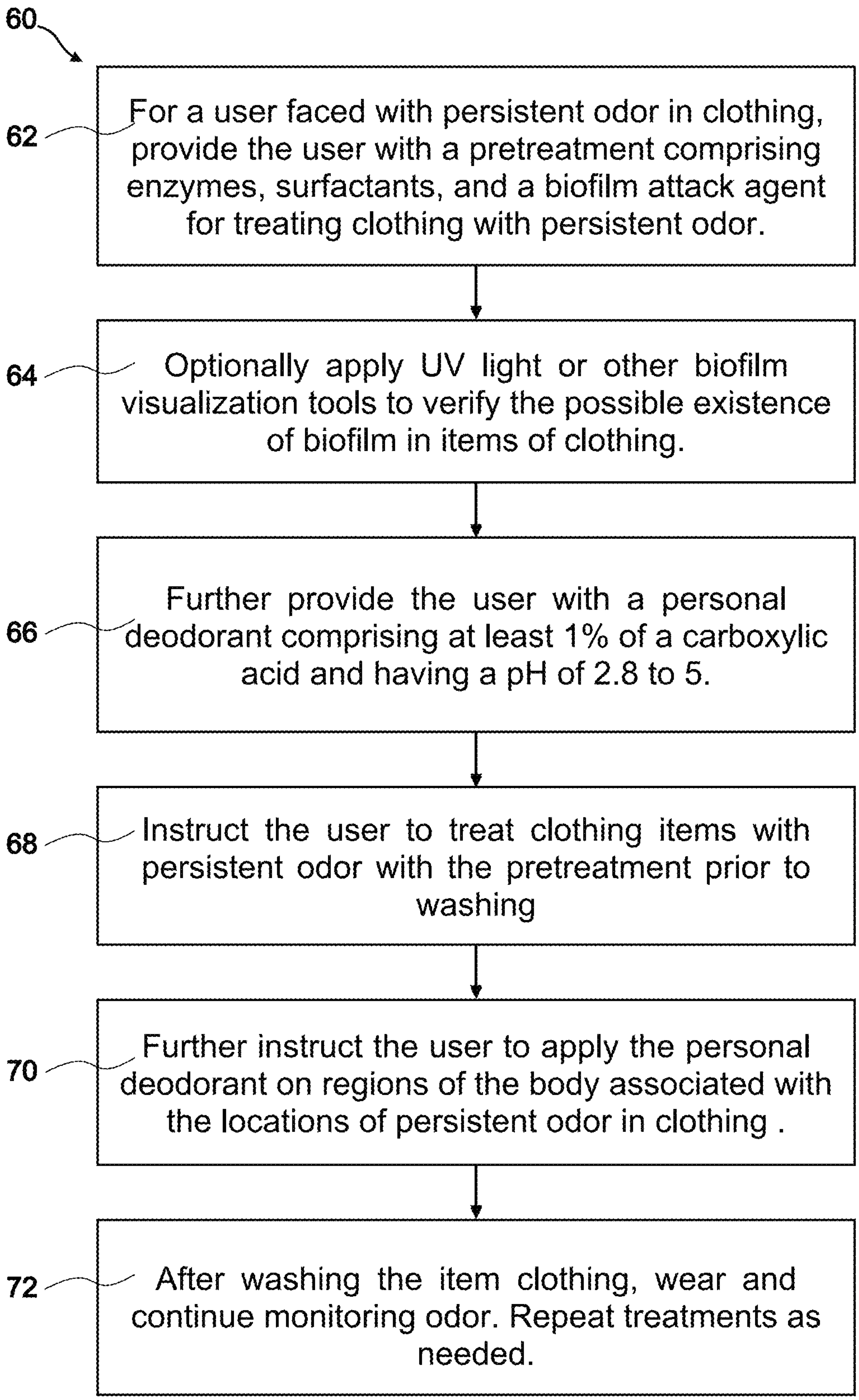
FIG. 4 depicts a flowchart showing steps in a process for treating clothing with persistent odor while also treating odor on the skin of the wearer.

FIG. 4 depicts another flowchart 60 beginning with Step 62, wherein a user faced with persistent odor in clothing is provided with a pretreatment product comprising in one or more parts comprising enzymes, surfactants, and a biofilm attack agent for treating clothing with persistent odor. In Step 64, the user may apply UV light or other biofilm visualization tools to verify the possible existence and location of biofilm in items of clothing. In Step 66, the user may also be further with a personal deodorant comprising at least 1% of a carboxylic acid such as an alpha hydroxy carboxylic acid such as mandelic acid and/or lactic acid, having a pH of 2.8 to 5.5 or from 2.8 to 5. The user in Step 68 is instructed to treat clothing items with persistent odor with the pretreatment product prior to washing, and is further instructed in Step 70 to apply the personal deodorant on regions of the body associated with the locations of persistent odor in clothing. In Step 72, after it is washed, the item of clothing may be worn and further monitored for odor or signs of biofilm, repeating any or all of Steps 62 through 70 as needed.

Figure 5A:
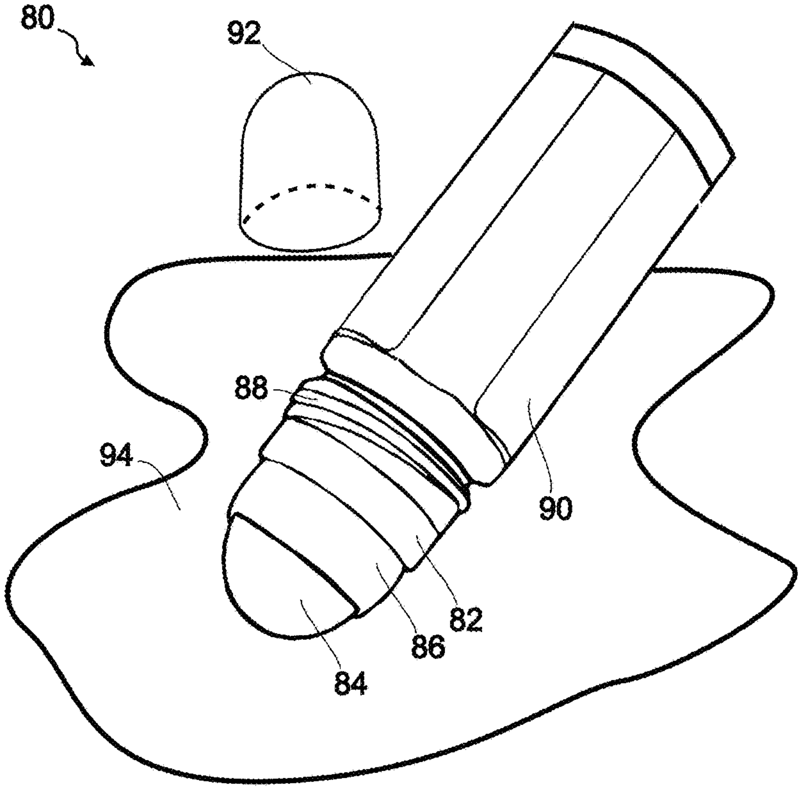
FIGS. 5A and 5B depict dispensing options, such as a roll-on applicator (5A) for applying a composition to portions of clothing or a pod (5B) for a wash cycle.

FIG. 5A depicts a roll-on dispenser 80 comprising a cap 92 and a dispenser body 90 containing either (1) the enzymatic mix described herein, (2) the enzymatic mix coupled with a biofilm attack agent such as at least one of NAC, a flavanol solution, and a lysozyme inside (not shown), (3) a biofilm attack agent without laundering enzymes in a suitable carrier such as a base of water and a glycol, diol, or suitable solvent and surfactants or other agents, or (4) a freshener comprising at leat one of an odor neutralizer such as cyclodextrin or cucurbituril compounds, a soya-based quat, an antibacterial agent, optionally with suitable fragrances, or a combination of any of the above, that can be dispensed using a roll-on ball 84, held in place with a roller body 86 which fits into the upper end of the dispenser body 82. The cap 92 attaches to the dispenser body 90 by engaging threads 88 thereon when it is twisted in the proper direction. The roll-on dispenser 80 can be used to apply a solution to clothing prior to laundering or directly onto clothing after laundering or between washes as a freshener. In some cases, it may be applied to clothing as the clothing is being worn. The contents may be refilled by opening a bottom cap (not shown) or unscrewing the roller body 86 or other portion of the dispenser 80.

Figure 5B:
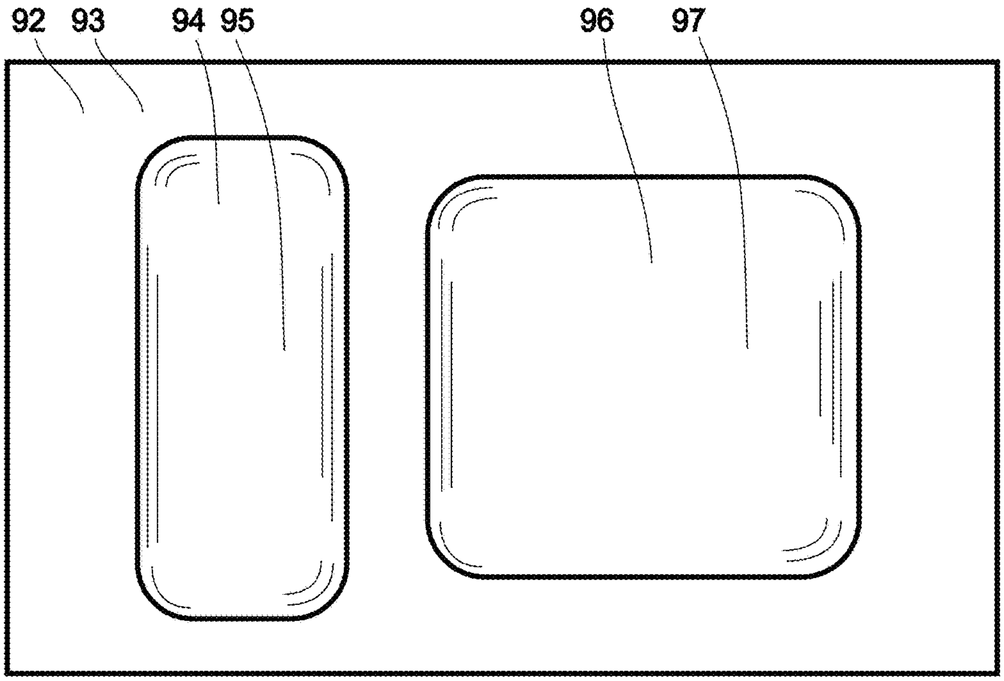

FIG. 5B depicts a unit-dose pouch or "pod" 92 comprising a water soluble film 93 which contains first and second segregated portions, 94 and 96, each of which contain segregated materials, 95 and 97, respectively. First material 95 may be a solid such as a powder or solid capsule comprising NAC and optionally other biofilm attack agents, antimicrobials, buffering agents, cleaning agents such as borax, boric acid, borax, sodium carbonate peroxyhydrate, etc., and second material 97 may comprise enzymes, surfactants, bacterial spores, with suitable chelants, solvents, rheology modifiers, builders, and the like. The mass of each segregated material may range from 3 g to 200 g or greater, as needed. One or more pods may be placed in a washing machine such as a clothes washer, dish washer, or other device and run with or without the normal contents to help reduce sources of biofilm.

Figure 6:
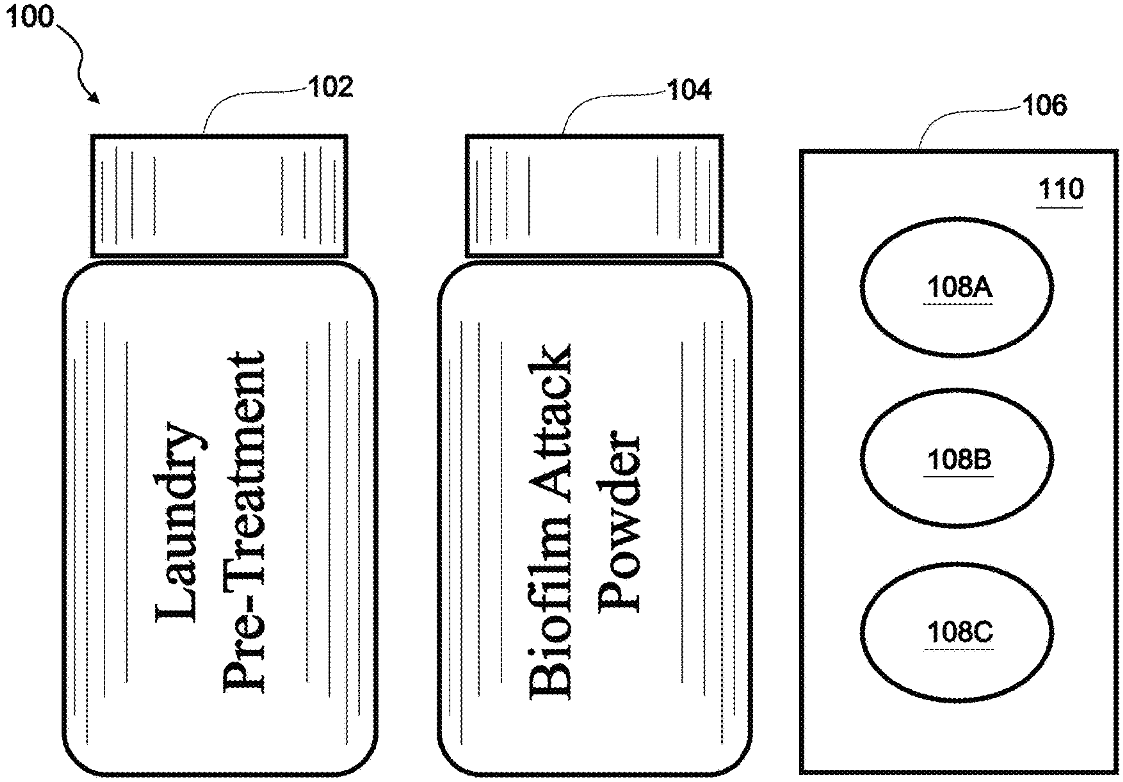
FIG. 6 depicts a packaged product with an assembly of a pre-treatment cleaning composition, a biofilm attack agent, and tablets or capsules to be used in a washing machine to reduce biofilm and odor sources.

FIG. 6 depicts a combined assembly 100 for combination in a single package (not shown) of a first container 102 containing a cleaner composition labeled as a "laundry pretreatment" comprising at least one of NAC, a suspension of bacteria or bacterial spores such as *Bacillus subtilis* spores, two or more laundering enzymes, panthenol, at least 5% surfactant such as from 10% to 70% surfactant, and a second container 104 comprising a biofilm attack agent and/or a biofilm modification agent. The contents of the second container 104 are labeled as a "biofilm attack powder," but in related embodiments may be a liquid, a slurry, a paste, a powder, individual powder capsules, and the like, and may further comprise a desiccant. The assembly 100 also comprises a blister pack 106 or other packaging system (film or paper packets, pouches, or sachets, sprinkle capsules, ordinary capsules, tablets such as effervescent tablets in a tube or foil pack, etc.) for providing solid material such as tablets or units of powder. Three tablets are shown here as 108A, 108B, and 108C with a blister pack backing 110 holding them together. The tablets or units 108A, 108B, 108C can be detached from the blister pack 106 and placed in or emptied into a washing machine to run a sanitizing cycle, in which the antimicrobial ingredients of the tablets 108A, 108B, 108C can be effective in reducing microbes dwelling in the washing machine (not shown). Alternatively, the tablets may be added to a liquid or other mixture such as a spray made from the cleaner composition of the first container 102 or a biofilm attack preparation made from the biofilm attack powder of the second container 104 to enhance their function, or may be added to a washing machine (not shown) for use in a wash cycle in which one or more articles of clothing therein have been pre-treated with the cleaner composition of the first container 102 or the biofilm attack agent of the second container 104.

The assembly 100 may also include a deodorant or antiperspirant product (not shown) designed to enhance the skin microbiome to reduce body odor, particularly one with synergistic benefits with the other components, such as one comprising a mandelic acid composition having at least 0.5% mandelic acid in a cream, stick, roll-on, wipe, spray, or other format, such as LUME® Deodorant.

Figure 7:
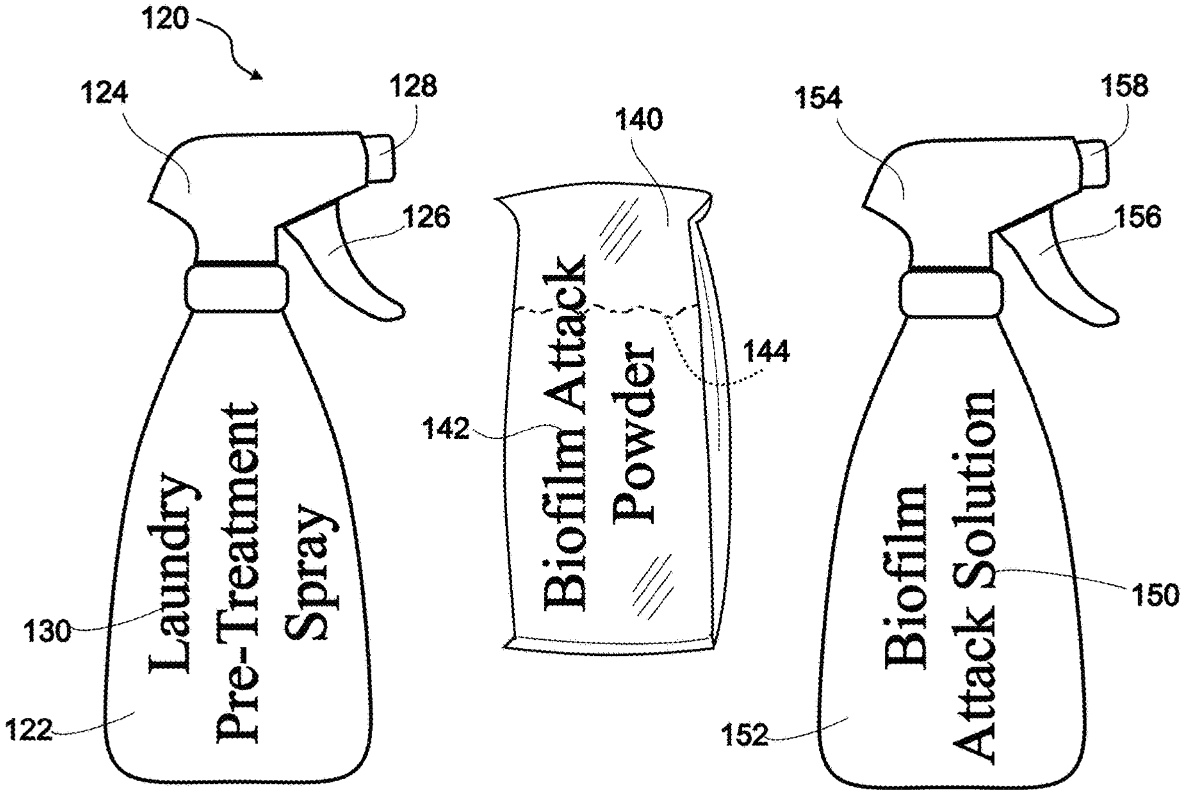
FIG. 7 depicts another assembly comprising a pre-treatment spray and a biofilm attack agent that can be added to water to form a biofilm attack solution, both of which can be used to spray malodorous regions of clothing or suspected biofilms.

FIG. 7 depicts an assembly 120 for a two-part system. A first container 122 labeled as a "laundry pre-treatment spray" holds an enzymatic mix comprising one or more surfactants, optional bacteria or bacterial spores such as *Bacillus subtilis*, and a mixture of three or more classes of enzymes comprising protease and at least two of lipase, amylase, cellulase, mannanase, and pectinase having a total protein content of at least 1% such as from 1% to 15% or from 2% to 10% or from 1% to 8%. The first container 122 is in the form of a trigger spray bottle having a trigger spray mechanism 124 with a trigger 126 operable by one or more fingers and a spray nozzle 128 such as an adjustable nozzle with multiple settings (e.g., jet, spray, on, off) which may have a foaming screen over the nozzle to promote foam formation which in some cases may help reduce the risk of creating minute aerosol droplets of enzymes that might be inhaled. Also shown is a packet 140 labeled "biofilm attack powder" 142 containing a powder 144 that may comprise NAC and/or other biofilm attack agents. The packet 140 may be torn open and emptied into a second container 152 or, when made from a water soluble film or the like, may simply be placed in the second container 152 coupled with water, where it will dissolve and allow the biofilm attack powder to become dissolved and able to be applied via the trigger spray mechanism 154 with its trigger 156 and nozzle 158 in liquid communication with the contents of the second container 152. The biofilm attack powder on a dry basis may comprise at least 10% NAC such as from 10% to 80% NAC or substantially pure NAC only. It may further comprise from 0.1% to 50% panthenol such as from 1% to 35%, 1% to 25%, 1% to 10% or 1% to 5% panthenol or derivatives thereof. It may further comprise agents to adjust pH, ionic strength, viscosity, wetting angle, rheology, aroma, etc., such as metal salts including magnesium hydroxide, magnesium oxide, magnesium sulfate or Epsom salt, magnesium citrate, magnesium acetate, magnesium chloride, and the like, sodium chloride, sodium citrate, sodium bicarbonate, sodium carbonate, etc., potassium chloride, potassium hydroxide, wherein the metal salts may comprise from 0.05% to 20% of the biofilm attack composition. In one embodiment, for example, the composition may comprise from 0.05 to 15% each or from 0.1% to 10% each or from 0.3% to 6% each of one or more magnesium salts and one or more sodium salts. The pH of the biofilm attack solution when diluted according to instructions may be from 2 to 10, such as an acidic formulation with a pH range of from 2.5 to 6.5, from 3 to 5.5, or from 3 to 4.8, or less than 4.5. Other pH ranges contemplated include from 3 to 9, 4 to 9, 5 to 9, 6 to 9 and 7 to 9, or from 3.5 to 8.5 or 4 to 9.

In another embodiment, the biofilm attack composition 144 comprises caffeine, such as from 0.5% to 20%, from 1% to 12%, or from 1% to 5% caffeine. Without wishing to be bound by theory, it is believed that caffeine can have an inhibitory effect on biofilm formation, based on extrapolating studies of caffeine on diverse biofilm situation such as biofilms in dental care and dentures in particular.

For embodiments in which a solid material such as an NAC-containing mixture is combined with water to make a biofilm attack agent, the packaging system may comprise loose powder in a container (not shown) that is scooped or otherwise metered or delivered to be combined with an amount of water in a container or dispenser. Alternatively, the solid particles may be combined in a solid tablet that can be dissolved in water, including an effervescent tablet that may comprise NAC and a carbon-dioxide releasing material such as sodium carbonate. In yet another embodiment, the solid particles may be provided in capsules with water-soluble shells that can be dropped into water to form a biofilm attack solution. In a related embodiment, the capsule shells can be discarded rather than dissolved. In particular, "sprinkle capsules" (not shown) may be used in which relatively large capsules can be readily gripped and twisted to cause them to separate and release their contents. Exemplary sprinkle capsules are described in U.S. patent Ser. No. 10/610,490, "Separable capsule for sprinkling applications," issued Apr. 7, 2020 to S. Stegemann et al. Such capsules may be made of insoluble material such as polypropylene (PP), PET, high density poly ethylene material, metal, aluminum, and glass.

Figure 8:
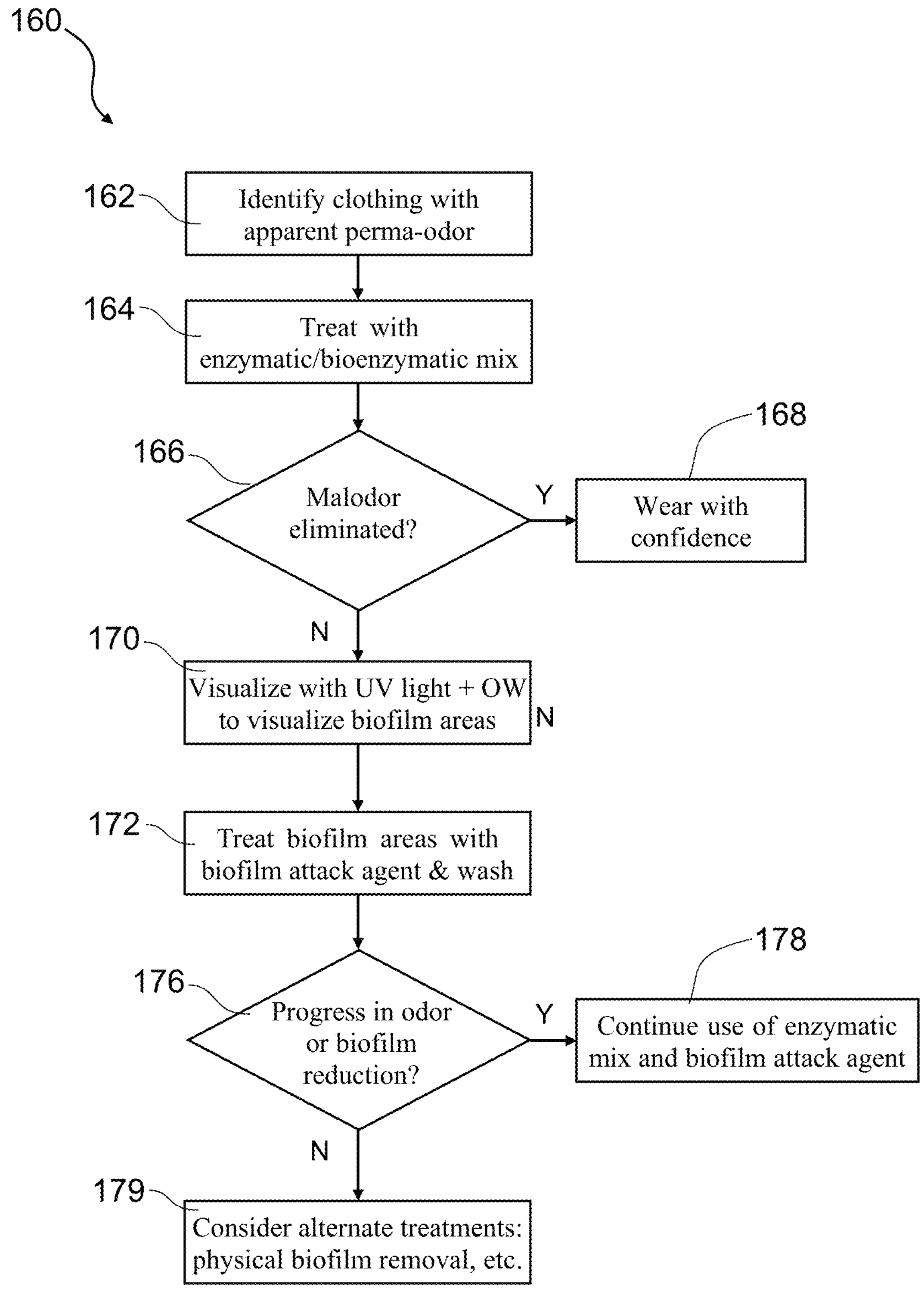
FIG. 8 depicts a flowchart showing steps in a process for treating clothing with persistent odor.

FIG. 8 depicts a flowchart 160 showing steps in a process for treating clothing with persistent odor. In Step 162, a user identifies clothing with apparent perma-odor and then in Step 164, treats the item of clothing with an enzymatic or bioenzymatic cleaning composition. If malodor is eliminated 166, the article can be worn with confidence 168, but if problems remain, in Step 170 the user may visualize potential biofilm areas using UV light or other tools to view fluorescence from absorbed optical whiteners/brighteners ("OW"), and then in Step 172 treat the biofilm candidate areas with a biofilm attack agent and optionally also with an enzymatic cleaning composition. If there is progress in odor or biofilm reduction 176 (biofilm reduction being known by again visualizing the bofilm area, not shown, for comparison to the previous visualization), then the use of the enzymatic cleaning composition and biofilm attack agent may be continued as needed 178, but if progress is lacking, there may be a need to consider alternate treatments 179 such as physical biofilm removal using a scrub brush, tooth brush, or other form of friction, or a water jet, ultrasonic cleaner, very low of high pH treatments, more intense chemical agents such as antimicrobial agents, high temperature, etc.

Figure 9:
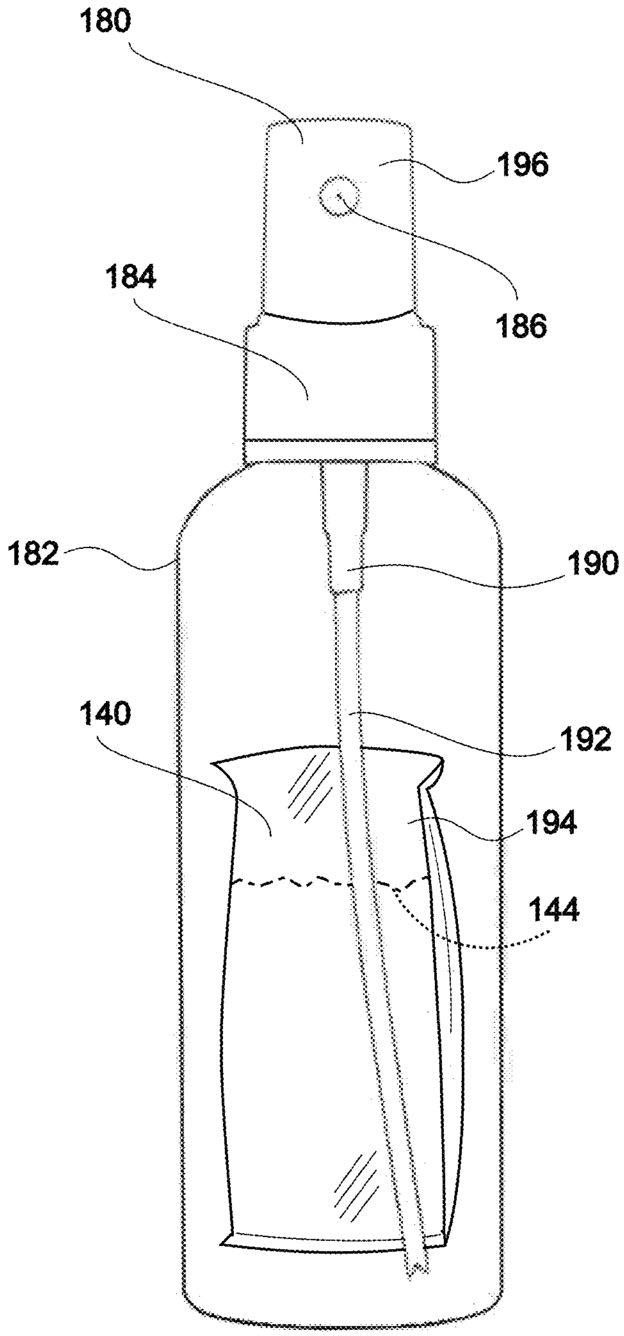
FIG. 9 depicts a spray bottle containing a biofilm attack agent inside.

FIG. 9 depicts a spray bottle 180 containing a biofilm attack agent shown as a powder 144 inside a packet 140. The packet 140 is made from a water soluble film 194 such that when water is added to the spray bottle 180, the film 194 dissolves allowing the internal powder 144 to also dissolve and turn the water into a biofilm attack solution (not shown). The bottle 180 comprises a spray bottle body 182, a cap 184 having a nozzle 186 and a spray button 196, from which descends a dip tube connector 190 joined to a dip tube 192 descending into the interior of the spray bottle body 182, providing fluid communication between any fluid (not shown) inside the spray bottle body 182 with the spray nozzle 186, wherein depressing the spray button 196 causes pumping of the liquid through the dip tube 192 to the nozzle 186.

The remaining figures are described below in the Examples section.

FURTHER DETAILED DESCRIPTION

Sprays and Dispensers

Aqueous solutions described herein can be applied with a variety of spray, including aerosol sprays driven by a propellant such as butane; pump sprays driven by manual spray pumps with levers, squeezable handles, push buttons, or other systems. Micron-sized spray droplets or larger may be useful in reducing the production of aerosols that can increase human inhalation of the spray. Coarse sprays can be useful in this regard. Mesh layers may be placed over a nozzle to induce foaming and reduce the risk of fine aerosol droplets comprising enzymes. Liquid dispensers can also be used to deliver small, controlled quantities of liquid without creating aerosol droplets. Examples include known liquid pumps, airless pumps, soap dispensers, etc., including those described in U.S. Pat. No. 9,248,462, "Airless pump system," issued February 2.

A variety of dispenser forms may be used, such as roller ball (roll-on) type bottles, such as those described in U.S. patent Ser. No. 10/206,479, "Application head for a product, in particular skin care, comprising an applicator ball held by a magnet," issued to G. Gieux et al., Feb. 19, 2019. Bottles with sponge or perforated tops may be used, such as tops with silicone, rubber, neoprene, or various thermoplastic elastomers or thermoset elastomers. These may be used to provide scrubbing action during or after application of a bioenzymatic liquid or slurry composition. Thus, a molded scrubbing unit comprising elastomeric or non-elastomeric elevated nubs, bristles, or other elements may be used, and the scrubbing unit may have one or more holes to allow delivery of the cleaning composition during scrubbing or application of friction. Examples of related scrubbing units include the elastomeric nubs on top of the OxiClean™ MaxForce™ Gel Stick marketed by Church & Dwight Co. (Ewing, New Jersey) and the Cosmogen Maxi Squeeze'n Scrub body and face scrubbing product with elastomeric bristles manufactured by Cosmogen (Paris, France), believed to be related to embodiments shown in US Patent Appl. No. 20100028070 published by G. Gieux et al., Feb. 4, 2010. Containers with applicator heads for dispensing the contents may also be provided with on/off features to seal or open the container, including the use of twist caps or other means to open or close a dispenser, including various forms described in U.S. Pat. No. 8,573,875, "Applicator for a fluid product such as a cosmetic product," issued Nov. 5, 2013 to G. Gieux et al.

An ultraviolet LED or other UV light may be combined with the applicator, integral with or separate from the applicator, to provide UV light (e.g., with a wavelength from 340 to 410 nm) to assist in visualizing biofilm that may be fluorescent due to absorbing optical brighteners from typical laundry detergents.

Other Product Forms

A variety of other product forms can be considered. The compositions described herein can be applied in the form of a manually pumped spray or aerosol spray, a foam, a wipe, a wetted sponge such as a standalone sponge or a sponge applicator attached to a reservoir of material, a cream, a paste, a solid that can be wiped or rubbed onto clothing such as a laundry soap, a tablet such as a tablet for use in a laundry machine used in addition to laundry detergent, as a component in a laundry detergent or stain spray or fabric softener or bleach product, etc.

Single-use sponges in individual wraps can be used, for example, with instructions and indicia similar to those for wipe products. The sponge may be polyurethane, regenerated cellulose, and other known sponge materials. The compositions described herein may be impregnated in the sponge or applied shortly prior to use. The sponges may be attached to a wand or gripper element such as a plastic handle. A pre-wetted sponge may be wrapped in foil or plastic prior to use.

Directions for Use

Indicia placed on or otherwise associated with packaging may inform users of the benefits of the product, call attention to the relationship between odor on clothing, bacteria on the clothing, as well as possible relationships to bacteria on the skin and bacteria that may be present in washing machines or other locations that may affect clothing. Indicia may also provide guidelines for a regimen that can result in long-lasting reduction in odor on clothing and the body, including steps to take to treat clothing before laundering, steps to treat clothing after laundering or between washes, steps to take to treat armpits or other parts of the human body with products such as LUME® Deodorant for Underarms and Private Parts, and steps to take to mitigate bacteria in washing machines or other sources that may influence bacteria and odor on clothing and/or the human body.

Indicia may be placed on the packaging material holding a container of a composition such as an outer cardboard box, or may be placed on the container that directly holds the composition (e.g., a squeezable tube, a plastic or glass jar, a spray bottle, a foam dispenser, a tube of wipes, etc.). Alternatively or in addition, instructions for use may be associated with the product in a variety of ways other that directly printing on a package. The instructions may be provided on printed material that is distributed with the product but physically detached therefrom, or may be on a website or other information source that is associated with the product (e.g., accessible via a QR code, barcode, RFID tag, or URL printed on the package). Information about the product and its use may also be approved in promotional media such as in television commercials promoting the product.

An example of such indicia could be: "Apply the Pre-Treatment Spray to the most odorous parts of clothing (e.g., the armpit area) before tossing into a hamper, leaving at least 30 minutes before laundering for best results. If odor persists, use the Between Washes Freshener Spray to treat the smelly regions and allow to dry for about 5 minutes before wearing. To fight odorous bacteria residing in low-temperature washing machines, run a cycle once a week with the Germ Foe™ Washing Machine Tablet with warm or hot water (if available). Meanwhile, don't forget to use Lume® Deodorant for Underarms and Private Parts on your body regularly to reduce bacterial sources of malodor."

Examples

Enzymatic Sprays

Several enzymatic solutions were made: First was an enzymatic blend labeled E1, comprised a buffered solution of Novozymes enzymes for laundry detergent in a buffered solution with surfactants and bacterial spores from J-Zyme™ AB-20X NFC distributed by J Tech Sales (Boca Raton, FL), said to employ spores from Nozozymes. The solution comprised about 20% J-Zyme which is said to have about $1.1\times10^9$ CFU/ml of bacterial spores. This consisted substantially of water, a probiotic bacteria blend believed to comprise *Bacillus subtilis* spores; enzymes from Novozymes including protease, amylase, pectate lyase, mannanase, 2 types of cellulase, and lipase; alkypolyglucoside from sugar feedstock, sodium citrate, sodium bicarbonate, 1,3 propanediol from natural feedstock, probiotic bacteria blend, and preservative (0.1% of a blend of methylchloroisothiazolinone and methylisothiazolinone). Total enzyme concentration was about 2% by weight. The enzymes here were selected to have optimum activity at a pH of about 7-8.

E2: A blend similar to E1 but without lipase and with the addition of a gentle quat, soyaethyl morpholinium ethosulfate. Ingredients included naturally derived surfactants (from sugar), probiotic bacteria, an enzyme blend containing protease, amylase, pectate lyase, mannanase and cellulases (no lipase); a solvent system made from naturally derived glycerin that also served as an odor control agent, and naturally derived soyethyl morpholinium ethosulfate. The concentration of the quat was about 0.5% and the enzyme concentration was about 2%.

E3: a blend made from a mix of enzymes, with a total of 5% enzymes comprising pectinase, amylase, mannanase, protease, lipase and cellulase. The solution comprised 20% glucopon-like surfactant from 100% biobased alkyl polyglycosides, sodium citrate and sodium bicarbonate for buffering to a pH in the 7-8 range, propanediol, a mix of bacterial spores approved for bio-enzymatic cleaning from a 10× concentrate comprising *Bacillus subtilis* spores, a solvent system derived from naturally derived glycerin and as an odor control agent, and a suitable preservative known to be compatible with the bacterial spore mix.

E4C: This blend is a 4:1 concentrate intended upon dilution to give a solution similar to E3, but with slightly reduced surfactant levels. Upon 4:1 dilution, the concentrated E4C solution was diluted to normal strength and dubbed E4D.

E6C is another 4:1 concentrate intended upon dilution to give a solution similar to E3, but with slightly reduced surfactant levels to facilitate the concentrate form and less lipase. This concentrated enzyme blend has about 15% liquid enzyme mixtures comprising pectinase, amylase, mannanase, protease, lipase and cellulase (the liquid enzyme mixtures themselves are estimated to have roughly 40 to 60% protein), about 30% surfactants comprising biobased alkyl polyglycosides, salts such as sodium citrate and sodium bicarbonate, propanediol, a mix of bacterial spores approved for bio-enzymatic cleaning from a 10× concentrate, a solvent system derived from naturally derived glycerin, and a suitable preservative known to be compatible with the bacterial spore mix. Upon dilution (3 parts water to 1 part E6C) the result is E6D (the "D" indicates dilution has occurred).

EN2: 11.1 ml of KOH 0.1M solution was combined with 11.8 g of 1.8% NAC solution at pH 3.0, giving a pH of 4.85. Then 20.4 g of this solution was combined with 39 g of NIC solution, giving a pH of 7.00

Other enzymes used included:

- Pectinase from Phygene Biotechnology Co (Fuzhou, Chna), product PH1561, activity >500 u/mg, CAS 9032-7501.
- Pectinase in Kitchen Alchemy Pectinex® Ultra SP-L solution from Modernist Pantry, LLC (Eliot, Maine).
- Pectinase powder ("pectic enzyme"), L.D. Carlson Co. (Kent, Ohio).
- Alpha-amylase from BOSF (1,4-alpha-D-glucan glucanohydrolase), 10 kU/g, CAS 9000-90-2, EC 232-565-6, powder form.
- Amylase powder, BSG (Shakopee, Minnesota), product 10019.
- Papain, Phygene Biotechnology Co (Fuzhou, Chna), product PH9028, activity >800 u/mg, CAS 9001-73-4.
- Papain tablets, Beazyme brand, MCM (Malaysia Chemical Company, Kuala Lumpur), 150,000 USP, purchased in Kuala Lumpur, Malaysia.
- Lipase (triacylglycerol acylhydrolase) from *Candida rugosa*, Ekear Co. (Shanghai, China), product P0114, CAS 9001-62-1
- Cellulase, Phygene Biotechnology Co (Fuzhou, Chna), product PH9018, activity >400 u/mg, CAS 9012-54-8.
- Cellulase powder from Heshibi Biotech, China, activity 100,000 u/g.
- Cellulase powder, Henan Wan Bang Industrial Co. (Henan Province, China).
- Cellulase powder, Zhejiang Yiruo Biotech (Zhejiang Province, China).
- Cellulase powder, Shandong Longda Biotech (Shandon Province, China).
- Cellulase powder, Yin brand (China).
- Lysozyme from egg whites, Bomei Biotech, activity >20, 000 u/mg, CAS 12650-88-3.
- Lysozyme chloride, Homecare Noflux® brand, 90 mg per tablet, purchased in Kuala Lumpur, Malaysia.
- E-Zyme® Troche lysozyme chloride tablets, 200 mg each, from AV Manufacturing S/B (Malaysia) purchased in Kota Kinabalu, Malaysia.
- NattoEnzym: nattokinase powder purchased in Hanoi, Vietnam marketed by DHG Pharam (Can Tho City, Vietnam), made from nattokinase from the Japanese Nattokinase Association (Osaka, Japan).

Other Enzyme Solutions

AmylaseA: BSG amylase, 1.137 g and BOST amylase, 0.717 g, were stirred unto 28.0 ml of water.

CellulaseA: 1.1 g of Shandong Longda cellulase powder and 0.45 g of Phygene cellulase powder were mixed into 22 ml of water.

CellulaseB: 1.3 g of Heshibi cellulase powder was mixed into 29 ml water.

CellulaseC: 1.8 g of Wanbang cellulase, 0.38 g of Phygene cellulase, 1.10 g of Yin cellulase, and 1 g of Heshibi cellulase were was mixed into 53.5 ml of water.

CellAmylA: 12.19 g of 2% NAC at pH 6.14 was combined with 5.2 g of 2% NAC at pH 9.17, 17.69 g of CellulaseC, 4 g of 2% NAC at pH 6.4, a few grains of citric acid to bring the pH from 9.5 to 8.82, and then 0.55 g of BOSF amylase powder.

LysoA: 1 tablet of E-Zyme® lysozyme chloride (200 mg) was dissolved into 8.5 ml of water.

LysoPap: Grind one table of Homecare Noflux® lysozyme chloride (90 mg of lysozyme) with one tablet of MCM Beazyme papain dissolved into 12 ml of water.

LysoB: Pulverize 2 tablets of E-zyme Troche lysozyme chloride (200 mg each) and dissolve in 30 ml water.

PAPA: 1.05 g of Phygene papain was combined with 21.7 ml of water.

PAPB: 1.3 tablets of MCM papain were ground and dissolved into 15 ml of water. Some residual solids remained even after heating. The slurry was then passed through a fine cloth to filter out some solids. 13 g of solution were obtained.

PAPC: 5.65 g of papain from Pangbo Enzymes (Nanning Pangbo Biol. Eng. Co.), 10,000 U/g, was combined with 53 ml of water. (p. 52)

PANNAC: 33 ml of 3.6% NAC, pH 4.9, combined with 0.643 g panthenol.

PANNAC2: 3.6 g of NAC and 1.65 g of panthenol powder were combined in 108 ml of water, with 2.1 g of $NaHCO_3$ added to reach a pH of 4.7.

NattoNAC: 0.6 g of commercial nattokinase powder was purchased in Hanoi, Vietnam under the brand name of NattoEnzym marketed by DHG Pharam (Can Tho City, Vietnam), made from nattokinase from the Japanese Nattokinase Association made by Japan Bio Science Laboratory (Osaka, Japan). Capsules with 0.6 g of powder, said to have 670 FU (fibrin units, a measure of activity based on fibrinolytic activity) per capsule, were used.

Biofilm Attack (BA) Agents

Pretreatments to attack biofilm were made as follows:

NAC-AL: To test the interaction of allantoin with NAC, 0.75 g of NAC were combined with 0.24 g allantoin in 46.5 g hot water. The pH was 3.16. The characteristic sulfur odor of NAC appeared to be absent, suggesting that allantoin may be useful in reducing the odor of NAC solution.

EGCD-1: 1.20 g of 98% EGCG powder (N&R Industries, Xian, China) was combined with 0.80 g ascorbic acid, 0.53 g citric acid, 1.51 g of hydroxypropyl beta-cyclodextrin, in 128 ml of water, heated to about 40° C. and stirred. Similar is EGCD-2: 1.72 g of EGCG powder with 1.03 g of ascorbic acid powder, 0.86 g of citric acid, and 0.70 g of hydroxypropyl beta-cyclodextrin in 118 ml of distilled water.

EGCD-A: 27.8 ml of EGCD-1 solution was mixed with 10 ml 70% ethanol. Similar is EGCD-B: 29 ml of EGCD-2 solution are withdrawn and combined with 10 ml of 70 wt % ethanol and put in a spray bottle to give spray EGCD-B. This solution displayed excellent color stability after multiple weeks at room temperature.

NAC Solutions:

NAC powder was dissolved distilled water to give a 2.1% strength solution, a 1% solution, and a 20% solution.

NAC solution at 1.4% concentration was adjusted with citric acid and sodium carbonate to achieve a pH of 3.0.

NAC solution at 2% was made by mixing 3.9 g of NAC in 185 ml of water.

EGCG-NAC solution was made by combining 1.40 g of EGCG powder with 1.69 g of NAC in 50 ml of water, and placed in a 100 ml spray bottle.

1 g of NAC in 50 ml of 0.1M KOH solution was prepared with a pH of 9.17.

1.0 g NAC plus 15 ml of 0.1 M KOH solution was prepared with 35 ml water, with a pH of 3.55. Na2CO3 was then added (0.18 g) to bring the pH to 7.8.

Another 2% NAC solution was prepared with KOH added to give a pH of 8.19 in 51 ml of water, to which another 0.22 g NAC was added to bring the pH down to 4.33. Adding 6 ml of 0.1M KOH solution brought the pH to 6.4.

28.1 ml of NIC (Naturally It's Clean®) enzyme solution was combined with 0.36 g NAC and 0.16 g sodium carbonate to give a pH of 8.37. This was adjusted by adding 0.04 g NAC to give a pH of 8.08. This is labeled 1.4% NAC in NIC.

A 2.1% NAC solution at pH 4.0 was made using 1.51 g of Biotal NAC, 0.648 g $NaHCO_3$, and 71 ml of water.

Pectinase Solutions

PNAC1: 0.2 g of BOSF pectinase powder (believed to be a fruit pectinase best suited for operation around a pH of 4 to 5, unlike typical laundry detergent pectinases which are engineered for higher pH solutions such as from 7 to 9) having an activity of 10 kU/g was combined with 0.41 g NAC powder and 0.13 g sodium bicarbonate. The powder was prepared and mixed, and placed in dry form into a sealed 100 ml spray bottle. After a period of time, distilled water was added, 57 ml. The mix dissolved rapidly at 22° C. The pH was 6.7. To better optimize performance of the pectinase, 0.21 g of NAC was further added to the solution plus 0.32 g ascorbic acid, bringing the pH to 4.6. This was spray PNAC1.

PNAC2: In 55.7 ml of water, 0.22 g of pectinase powder from BOSF was added with 0.44 g of NAC powder to form a pectinase-NAC solution having a pH of 3.2. Then in 12.65 ml of water, 0.26 g sodium bicarbonate was added. 4.5 ml of this solution was added to the pectinase-NAC solution, bringing the pH to 4.71. This was adjusted by adding 0.06 g NAC, giving a pH of 4.08. This was put into a 100 ml spray bottle and labeled PNAC2.

PNAC3: 0.6 g NAC are combined with 0.5 g BOSF pectinase powder with 0.13 g sodium bicarbonate and 0.1 g ascorbic acid. The powder mix was then combined with 60 ml of water (references to water are generally to distilled water unless indicated otherwise). The pH was 4.31, believed to be suitable for the fruit pectinase used, but generally too low for typical laundry enzymes.

PNAC4: 1.14 g NAC powder was combined with 0.88 g of pectinase powder (BOSF polygactouronase, product G0200, CAS 9032-75-1, EC 232-885-6, >10 kU/g), 0.08 g citric acid powder, and 0.5 g $NaHCO_3$ in 106 ml of water, resulting in a solution with a pH of 4.38, believed to be suitable for fruit pectinases.

PNACS: Combine 1.256 g NAC with 1.033 BOSF pectinase (polygalacturonase) into 106 ml g water.

PMIX1: 0.174 g of Phygene pectinase, 0.802 g of Pectinex® solution, and 24.5 ml of water were combined to create PMIX1 solution.

Lysozyme Solutions: Three Malaysian E-Zyme® Troche lysozyme chloride tablets, 200 mg each, from AV Mfg. (Malaysia) bought in Kota Kinabalu, Malaysia, were ground and dissolved in 51 ml of water to form 1.2% lysozyme solution, LYS1.

Steps Toward Perma-Odor

An effort was made to artificially create persistent odor problems in several shirts, including the following shirts purchased at second-hand store in Shanghai:

Shirt RD1: a red 100% polyester sports shirt under the Voit brand

Shirt RW1: a striped shirt made from 75% cotton and 25% polyester.

Shirt Dec1: A 100% polyester men's sports top made by Decathlon of China.

Shirt M1: A maroon shirt with 47.5% Modal, 47.5% cotton, and 5% spandex.

Shirt BS1: a black casual short-sleeved shirt made from 100% polyester (purchased new in Shanghai but worn for four years prior to this work).

Two malodor sprays were created to add malodor and a biological load in an attempt to infect clothing with malodor sources formed from mixtures of odorous French cheeses, meat extracts, soy broth, etc. Several shirts with persistent odor were eventually brewed with such mixtures applied to the shirts for prolonged times. Once persistent odor was detected (odor that remained even after washing with commercial laundry detergents). The primary treatment was application of about 0.5-1.2 g of bacteria-rich Fourme D'Ambert cheese total to the both armpits followed by application of a solution with meat extract, and keeping the moistened shirt in a plastic bag for several hours. After several such treatments, Dec1 developed persistent malodor in both pits after washing. Then the right pit was sprayed with 1.6 g of 1.8% NAC solution (pH about 2) and washed with a standard wash cycle requiring 78 minutes in a Siemens front-loading washer, using Bright Blue Moon liquid laundry detergent, a Chinese enzymatic detergent. Although the detergent had a fragrance, after washing, the left pit appeared to have no malodor nor fragrance, while the right pit manifested fragrance. After air drying, the left pit still had no sign of malodor, while the right pit had some odor. This suggested that NAC can be effective when used in combination with other agents such as enzymes. It is also believed that biofilm material provides a substrate that can more readily retain many fragrances during washing relative to synthetic fibers alone. Thus, a reduction in retained fragrance after washing may be a sign of successful reduction of biofilm matter.

UK Triathlon Shirt (TR1)

A volunteer triathlon runner from the United Kingdom provided a 100% polyester shirt suffering from persistent odor believed to be a prime example of perma-odor and a possible biofilm infection. The shirt, code named TR1, received in a triathlon event in 2013, had been worn periodically for heavy exercise for six years and was about to be discarded because of strong odor, even after washing, that would become strong after relatively short periods of exercising, unlike new shirts. The shirt was received after exercise, with both pits manifesting odor levels of about 5 on a scale of 0 to 5. The left pit was treated with Naturally It's Clean® (NIC) Laundry Spray by Enzyme Solutions (Garrett, IN) alone, with 5.9 g applied. The right pit was treated with a similar amount of blend of NIC with 1% NAC at pH 7.00. After five minutes, the shirt was rinsed in warm water at about 40° C. and then washed in a standard cycle with room-temperature water with Unilever Comfort® brand laundry detergent (Asia).

After drying the washed shirt, the right pit was substantially free of odor and fragrance, while the left pit manifested fragrance, again suggesting that attacking biofilm can reduce fragrance retention clothing made from synthetic fibers. After Applicant exercised vigorously while wearing the shirt, the right pit had very little odor while the left pit had rapidly developed uncharacteristically intense odor. It appeared that the left pit suffered from perma-odor in which odor rapidly develops, while the problem had been mitigated in the right pit with the NAC+enzyme treatment.

The shirt was washed in a full cycle with Bright Blue Moon detergent. The left pit had slight fragrance while the right pit did not have readily detectable fragrance. After air drying, the left pit fragrance level was at about 1, while the right pit remained at a 0 rating. One tester detected both malodor and fragrance in the left pit, estimating the odor level at about 1. After two more hours, the right pit appeared to have some residual odor while the left pit odor was difficult to detect. After an exercise session, the left pit developed strong odor, a level of about 3, while the right pit had mild odor, about 0.5 or 1 (nearly no odor).

The shirt was again washed with Comfort® brand detergent. Both pits smelled acceptable (essentially no malodor). Then, after another exercise session similar to each of the two previous sessions with this shirt, followed by 1 hour of walking, the left pit had strong malodor as it did previously, at a level of about 3.5 or 4, while the right pit had much less malodor, at a level of about 2.

Now to treat the left pit, which appeared to have a perma-odor problem possibly from a biofilm, a combination of pectinase and NAC was tried. 8 g of PNAC2 spray was applied to the left pit and allowed to sit for 15 minutes at about 22° C. The shirt was then washed with Comfort® detergent in a fast cycle.

After drying, the shirt was worn for exercise similar to previous sessions and the pits were wetted with sweat, as usual. However, this time, there was relatively low odor in both pits. The high odor levels created previously in the left pit prior to treatment with biofilm-attack agents did not occur this time, and the two pits were substantially similar in odor levels (around 1). This suggests that the NAC-pectinase treatment was successful in reducing the source of the perma-odor.

Neon Orange Champion Shirt

A neon orange sports top for women made under the Champion® brand, code named CH1, a semi-fitted L/G, 100% polyester shirt had been in regular use for exercise for 5 years and had symptoms of perma-odor. Slight odor would still generally be present after washing, would become strong after one exercise session. Treatments with EGCD-1 solution at low pH (added citric and acetic acid) followed by treatment with E2 showed some reduction of odor in the left pit, but odor still returned after exercise. Further trials were conducted in Borneo, Malaysia, after first finding NAC at a pharmacy in Kuala Lumpur and hypothesizing that NAC might assist in removing biofilm in clothing. Nova® brand N-Acetyl cysteine powder in 300 mg capsules (Nova Laboratories, Sepang, Selangor, Malaysia) was purchased from Sunlight Pharmacy in Kota Kinabalu, Malaysia. Each capsule contained 300 mg of acetyl cysteine and 70 mg of other materials, believed to primarily be gelatin. 1.97 g of NAC powder removed from the Nova® brand capsules was stirred into 52 ml of water to form a 3.2% NAC solution, slightly cloudy, which was applied to the right pit area of the neon orange shirt, with 2 g of NAC solution being applied to both the outside and inside surfaces of the right side over a roughly circular area about 12 cm in diameter. After two minutes of dwell time, the right pit was sprayed with NIC (Naturally It's Clean®) enzyme solution, with 2.33 g applied to the exterior surface and 2.5 g applied to the interior surface.

The left pit of the neon orange shirt was treated with NIC solution only, with 3.4 g applied to the outer surface and 4 g applied to the inner surface, for a total of 7.4 g on the pit. After five minutes, the entire shirt was handwashed in warm, soapy water using a clear shampoo provided by a local hotel. After air drying, the right pit, which previously smelled worse than the left, now smelled better than the left. Both smelled better than before washing, but there was residual malodor in the left pit.

A second biofilm-attack treatment was then applied to the right pit. A solution of NAC from an effervescent NAC tablet with 600 mg of NAC, also purchased in a Malaysian pharmacy, was made by dissolving the tablet in 100 ml of water. 8 ml of this solution was then applied to the right pit to substantially saturate it. Then 5.3 ml of solution EGCD-A was applied to the right pit and allowed to sit for 20 minutes before handwashing and air drying.

After an exercise session, it was observed that the right pit continued to smell better than the left pit. The same tendency applied to the shirt after being stored for 48 hours at room temperature, even though the odor intensity had increased over this time period, with the left pit exhibiting an odor intensity of about 4 to 5 (0 to 5 scale), while the right pit was rated at about 2 to 3.

The right pit was then treated again. First the right pit and sleeve were moistened with 21 g of 2% NAC solution made from 100 ml of water and 2 g of NAC powder extracted from Swanson's 600 mg capsules of N-acetyl cysteine (Swanson Health Products, Fargo, ND) which also contain gelatin (capsule shell) and magnesium stearate. Then 5.94 g of EGCD-A solution was applied to the moistened right pit area. After 10 minutes, the wetted region was sprayed with 7 g of NIC solution and rinsed after about 10 minutes and handwashed with laundry detergent and warm water. After drying, the right pit had no odor, neither malodor nor fragrance from the laundry detergent, while the left pit exhibited both malodor and fragrance.

After further washing and two exercise sessions, the right pit still smelled better than the left, but both have made progress in terms of decreased odor levels previously experienced after one session of exercise. It may be that both the EGCG treatment and the NAC treatment (and possibly the NAC plus EGCG treatment) have helped reduce the impact of a biofilm in this shirt. As odor developed, it was observed that the treatments (NAC+EGCG) appeared to make the shirt display longer lasting odor reduction when treated with a freshener after exercising such as Oderase™ from AqDot (Cambridge, UK). After further exercising and washing, the right pit of the shirt could still develop odor after exercise, but not as intensely as before, while the left pit had strong odor, even after being treated with fresheners comprising cucurbituril and also Febreze Free (Procter & Gamble).

Now the left pit was treated with a biofilm attack protocol. 10 g of a 2% NAC solution was applied to the pit and allowed to sit for 10 minutes, after which 9 g of NIC was sprayed on, sitting for 15 minutes, whereupon the shirt was rinsed by hand and then washed with commercial laundry detergent (Bright Blue Moon).

After further exercise, the right pit was still superior to the left pit (odor rating of about 1 in the right and 2 to 3 in the left). To further treat the left pit, the lysozyme solution LYS1 was applied, with 7.3 g of solution applied over an area of about 10 cm×8 cm around the left pit. This sat for 20 minutes, then 5 g of NIC was applied. After a 5-minute wait, the shirt was placed in a washing machine and washed. Following subsequent exercise, the left pit still had mild odor, though reduced in comparison with previous states while the right pit had very little odor. After several more hours of sitting, the two pits seems roughly equivalent when tested again, both rated at about 2 on a scale of 0 to 5.

The right pit was then treated with 3.11 g of EGCD-B spray, immediately followed by 3.46 g of 1% NAC spray at a PH of 6.4. The left pit was treated with 2% NAC at a pH of 9.17, 3.6 g applied, followed by treatment with 1% NAC at a pH of 7.8, 2.68 g applied. Then NIC was applied to the right pit, 2.0 g, and 1.76 g NIC to the left pit. The shirt was hand washed in warm water with laundry soap and air dried. After an exercise session (a jog of 3 to 5 km is typical for the exercise sessions here), the right pit smelled better than the left. Perhaps the elevated pH NAC solutions are less effective than the low pH solutions in opening or attacking the biofilm. The left pit was then treated with EGCD-B spray, about 3 gm. After a 3-hour wait, both the right and left pits were sprayed with 2% NAC solution, 6 g on the left and 7.5 g on the right. After a five minute wait, the shirt was rinsed in warm water and air dried. After two exercise sessions, the pits were at an odor level of about 5. The left pit was treated with NIC, 1.48 g, while the right pit was treated with EN2, 1.44 g, and air dried. The odor in the right pit was estimated at 3 on a scale of 0 to 5, while the left pit had a level of about 3.5. A second evaluator gave scores of about 2 for each pit.

The pH 3.0 NAC solution was then applied to the right pit, 2.4 g, and after 5 minutes, the shirt was washed in a short cycle with Bright Blue Moon brand detergent. After washing, both pits had slight odor, about 0.5 on a scale of 0 to 5. After another exercise session, both pits had an odor level of about 4. The right pit was then treated with PNAC3 comprising pectinase. 7.3 g of PNAC3 was applied to the pit and surrounding region, saturating the pit area. After washing, the shirt was again evaluated following exercise. Both pits had low odor. But where odor existed, it appeared to be correlated with slightly darkened zones in the pits, believed to be staining associated with a prior biofilm where deposits of polysachharides, proteins, and other biofilm matter may have provided a platform for absorption of dyes or dyed particles. The darkened areas remained following the treatments with enzymes that the shirt has received, though the intensity of the darkened regions has declined.

After further exercise, with the odor level at 2 in the left pit and 2.5 in the right, solution 1.57 g of Aq14 freshener was applied to the right. After air drying, about 30 minutes later, the right pit odor level was about 1.

Steps were then taken to reduce the darkened color regions in the pits. The inner right pit was treated with 3.6 g of PNAC4 and allowed to sit for 5 minutes. Then 0.9 g of E2 was applied to that spot. After 2 more minutes, 1.4 g of NIC was applied, and finally 1.4 g of 2.1% NAC was applied. The shirt was then washed with Comfort® detergent (1.5 ounces of detergent used in a full cycle at 40° C. requiring slightly over one hour), and then air dried. After further exercise sessions, the shirt had odor levels of 1-2 in the right pit and 0.2-1 in the left. The left was then treated with 4.65 g of PNAC4, seeking to further eliminate the residual staining in the pit. The shirt was then washed using Comfort® brand detergent. After further exercise, the dark stain region on the inner right put was treated with PNAC4, saturating with 3.6 g of spray. After 5 minutes, 0.9 g of spray E2 was applied. After two more minutes, 1.4 g of NIC spray was applied to the pit and finally 1.4 g of 2.1% NAC were applied. The shirt was then washed with 1.5 oz of Comfort® detergent in a full cycle at 40° C. After 5 more exercise sessions without washing, the pits now had strong malodor with an odor level of about 5. The right pit was treated with 2% NAC solution and washed. After exercise, the odor in the right pit was significantly reduced relative to the left pit.

Additional Shirts: Series K

A blue Decathlon sports top, KB1, 100% polyester and essentially the same as the neon orange shirt above except for color, had also developed strong odor through repeated exercise and was a possible perma-odor candidate which still had malodor after washing. The left pit was treated with EGCD-1, with 6.3 g applied. It sat for 10 minutes, then the shirt was rinsed and washed. After air drying, the treated pit smelled much better.

Additional Shirts, Series AA-AC

Several shirts from an athletic female volunteer were obtained, including:

- Shirt AA, a pink Forever 21 shirt believed to be made from cotton and polyester with relatively stronger odor in the right pit after prior washing.
- Shirt AB, a Downeast Basics "Wonder Tee" made from 95% cotton and 5% spandex, a brand said by some customers to have pronounced odor issues, perhaps due to surface sizing chemistry. After washing, both the right and left pits had malodor.

Treatments of 2.1% NAC solution were applied. For shirt AA, 12.7 g total was applied across both pits and adjoining shoulder area. For shirt AB, 8.2 g was applied to the right pit and shoulder area, leaving the left pit untreated. For shirt AC, 8.5 g was applied to the right pit. After about 10 minutes, each shirt was then treated with Naturally It's Clean (NIC) enzyme spray for laundry. For shirt AA, a total of 11 g of spray was applied to the previously wetted areas. Further, for the right pit only, 2 g of E2 bio-enzymatic spray was applied. For shirt AB, 3.3. g of NIC was applied to the right pit followed by 5.4 g of LPS1 also to the right pit. After about 15 minutes of dwell time, the shirts were washed with a standard cycle using Bright Blue Moon laundry detergent. In each case, treated pits smelled better than before and smelled better than the untreated pits or the pits treated without NAC. Following exercise, the results were mixed. Shirt AB was reported to smell better in general. Perhaps the enzymes in the detergent and the added enzymes and NAC present in the wash from the 3 treated shirts being washed contributed to effective odor reduction for both pits on shirt AB. But for shirt AA, after one work day the right pit was reported to smell again, while the left pit remained smelling fresh. For this shirt, additional treatment with NAC may be needed to achieve more complete odor reduction in the right pit.

Perma-Odor Candidates: Series L

Exercise clothes from a heavy exerciser (male) were provided for further testing. Several items of clothing appeared to have perma-odor, for even after washing some residual odor remained, and the user had noted that malodor returns swiftly during or after exercise unlike the way the clothing behaved when it was relatively new. The clothing appeared to be suitable candidates for a perma-odor problems that may be due to a biofilm. Several approaches were tried.

Three items were involved: a red polyester shirt (shirt RL), a white polyester Lintrel shirt (shirt WL), and a blue polyester sports shirt (shirt BL). There were also three pairs of washable children's shoes that had serious odor issues that had not been removed with previous washing, including soaking in a solution made from Oxi-Clean® detergent with bleaching agents.

Initial treatments includes the use of E2 spray (about 3 g) on the right pit of RL, and a similar amount of E2 spray on the right pit of the white shirt WL. After sitting overnight to allow bacterial spores to activate and then being laundered with a washing machine and laundry detergent, the treated pit of the white shirt smelled significantly better than the other pit, while the pits on shirt RL both smelled about the same with some persistent odor still present. The blue shirt, BL, had both pits smelling acceptable after the treatment and wash.

An antimicrobial agent, PureShield® wound care spray, was applied to each of the right shoes among two of the pairs, followed later by washing. After drying, it was observed that this treatment by itself did not appear to have any effect.

Treatments with EGCG and NAC

Recognizing that biofilm may be present in some of the shirts, a new round was conducted aimed at reducing the impact of potential biofilm. A three-step program was implemented in some cases involving treatment with NAC, then acidic EGCG solution, followed by treatment with enzymes. The hypothesis was that the biofilm might be weakened or opened by the NAC and EGCG, allowing the enzyme solution to more effectively remove materials that may have been previously deposited or protected by the biofilm and perhaps help reduce the foothold of bacteria in the clothing. Testing showed reduction in odor after washing and reduced odor once the washed shirt was exposed to further sweating during exercise.

In the first trial following the initial treatments described above, 2.1% NAC solution was applied to the right pit of each of the shirts RL, BL, and WL, bringing the pits to saturation. 12 g were applied to RL, 12 g to WL, and 13.5 g to BL. Then RL was further treated with 5.5 g of EGCD-B solution on the right pit. BL was treated with 6.6 g of EGCD-2 solution on the right pit, and WL was treated with 8.7 g of EGCD-B on the right pit. After about 5 more minutes, shirt RL had 5.0 g of NIC applied to the right pit. Shirt WL received 6.3 g of NIC applied to the right pit. Shirt RL was then washed in a regular wash cycle, while shirts WL and BL were hand rinsed in warm water. The shirts were then air dried and later worn. When the owner later reported the results, it was determined that shirts treated with NAC solution had significantly reduced odor after washing, and after exercise, the odor in the treated pit would generally be less than in the untreated pit.

In a subsequent trial, after washing and exercise, shirt RL was reported to have an odor level of about 2 (scale of 0 to 5) in both pits, while shirt BL had an odor level of about 2 in the left and 1 in the right pit. Shirt WL had very little odor and was reported as being significantly better than it was prior to treatment. Shirt RL was treated in the right pit with 9.1 g of 2% NAC at a pH of 7.8. (Prior to treatment, odor level was estimated to be about 0.5 in the right pit and 1 in the left.) After about 11 minutes, NIC enzyme spray was applied with 5.8 g on the right pit and 10 g on the left and the shirt was washed. While the residual odor in the shirt appeared to have been eliminated, after heavy exercise, shirt RD was reported to have developed strong odor on both sides. It was speculated that a different enzyme treatment might be helpful. Thus, the right pit and surrounding area was treated with 15 g of PNAC3 and after about one hour was washed using liquid Tide® detergent. The owner reported substantial improvement in the shirt.

Shirt WL, manifesting odor levels of about 2 in the left pit and 0 in the right (following exercise) before treatment was treated with 4.8 g of 2% NAC (pH 7.8) in the left pit, then after 2 minutes, 6.5 g of NIC enzyme spray was applied. After 10 minutes, another 5 g of NIC spray was applied. After washing as usual with liquid Tide® detergent and exercising with the shirt, the owner reported substantial improvement in both pits. After exercising, however, the right pit had slightly more odor than the left, so an additional treatment was conducted aimed at the right pit, which was treated with PNAC3 (2.2 g) applied to the center of the pit, and then PNAC1 (7 g) applied more broadly to the pit and sleeve. The left pit was treated with NIC only, 4 g. The shirt was then washed. The owner noted that the odor problems of the past had been essentially overcome, and the shirt could now be used for exercise without the residual odor that had previously been present after washing.

For shirt BL, the left pit was treated with 1.4% NAC in NIC solution, with 9.67 g applied, and after about 30 minutes the shirt was washed using liquid Tide® laundry detergent. Following further use during exercise, the owner reported substantial improvement. However, the left pit had slightly stronger malodor. The left pit was then treated with PNAC1, with 11 g applied to a broad area around the pit followed by 1.9 g of PNAC3 in the pit area itself. The shirt was them washed after about an hour. After exercise, the owner reported significant improvement with no residual odor. Odor no longer rapidly returned during exercise, more like a new shirt.

Other Shirts: Series XH

A 100% cotton blue "Superman" T-shirt, codenamed NS, was reported to have perma-odor by an athletic adult male. The shirt was treated in the left pit only with 5.6 g of PNAC4 sprayed onto the pit area, followed by washing with Purex Free® detergent in a fast wash cycle. The owner, not knowing that only the left pit had been treated, later reported that there was substantial improvement in the left pit.

Fluorescence and Dye Testing

In the photographs discussed in this section, the following numbering system is used: 200 represents an item of clothing, 202 represents a stain or darkened spot on a fabric or other visible biofilm candidate, 204 represents a fluorescing region, 206 represents a region having diminished fluorescence following a treatment, 208 denotes a boundary marker for the a treatment zone (e.g., a rubber band or other object denoting the area to be treated or a circle drawn on the figure), and 210 denotes a treatment zone where particular compounds will be applied to reduce a biofilm or for other objectives. Initial tests with dyes explored the use of crystal violet to detect biofilms in textiles. Unfortunately, even with polyester, the dye was too strongly absorbed to readily distinguish biofilm from fibers themselves.

Three UV lamps were used in testing fluorescence in potential biofilms. These included a Lightfe® UV301D lamp providing a beam at 365 nm, a UVBeast V3 lamp operating at 395 nm, and a UV Nova 108-LED UV lamp operating at 395 nm.

In one approach, biofilm candidates were stained using Calcofluor White M2R dye, a fluorescent brightener purchased from Phyto Technology Laboratories (Shawnee Mission, Kansas), CAS No. 4404-43-7. A solution was prepared of 0.074% Calcofluor white in water, and given the name CF1.

Two 100% polyester sports tops, the above-mentioned orange shirt CH1, and a blue top from Danskin, BD1, both with similar design and material, were examined. Both had been used for exercise for several years with persistent odor issues, although CH1 now showed substantial improvement in both pits following the previously described treatments. At this time, the orange top CH1 had been used in multiple exercise sessions since the previously discussed treatments with very little washing to create odor trouble and possible to promote biofilm growth again.

In examining fluorescence, it was eventually noted that both an SLR camera and an iPhone camera could not easily capture the fine details of fluorescence when using any of the UV lamps available for this study, probably because the fluorescence, including some background fluorescence, may have interfered with the camera's visible light operations. Such images often required enhancement (increasing contrast to around 30% and decreasing brightness to around −15%, for example) to show the fluorescent regions clearly visible to the naked eye, though sometimes the enhancement resulted in non-fluorescent zones also appearing as bright as the fluorescent zones in black and white images. However, it was found that better images could be obtained by placing a yellow UV-absorbing lens form UV safety glasses over the eye of the camera. A rubber band was sufficient for holding it in place.

Shirt CH1 (Orange Champion Shirt)

For shirt CH1, following the previously described treatments, 8.5 g of Tide® (Procter and Gamble, Cincinnati, Ohio) liquid laundry detergent in 15 ml of water was applied to the left pit of the wet shirt, while 6.8 g of CF1 was applied to the right pit and arm area and it was then rinsed in warm water for about 1 minute. Tide® liquid laundry detergent is believed to contain Calcofluor White, and its fluorescence under UV is consistent with that of Calcofluor White.

Figure 10A:
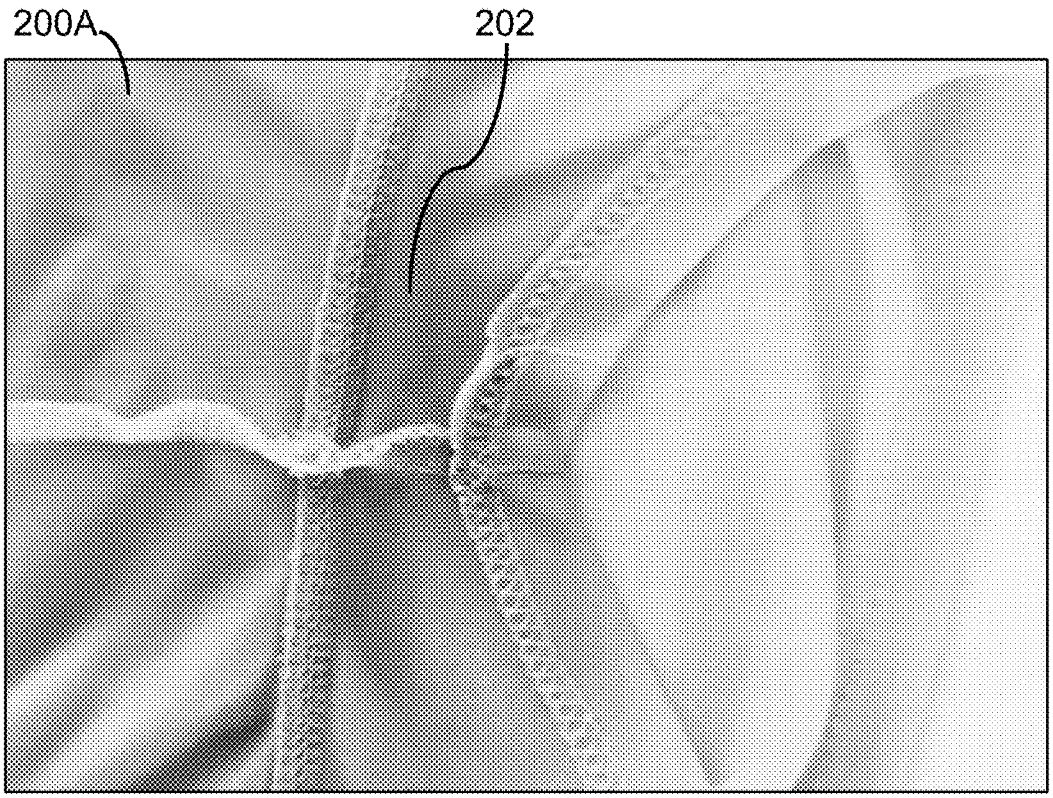
FIGS. 10A to 10J depict photos of portions an orange 100% polyester shirt, Champion brand, that was believed to afflicted with perma-odor, showing remnants of a possible biofilm visible as a dark region in visible light and with blue fluorescence in UV light, especially after treatment with an optical brightener, Calcofluor White. Treatments with various biofilm attack agents were applied resulting in reduction but not complete elimination of the darkened matter and the associated fluorescence. Details for these and following photos of clothing items are given in the Examples section below.
Figure 10B:
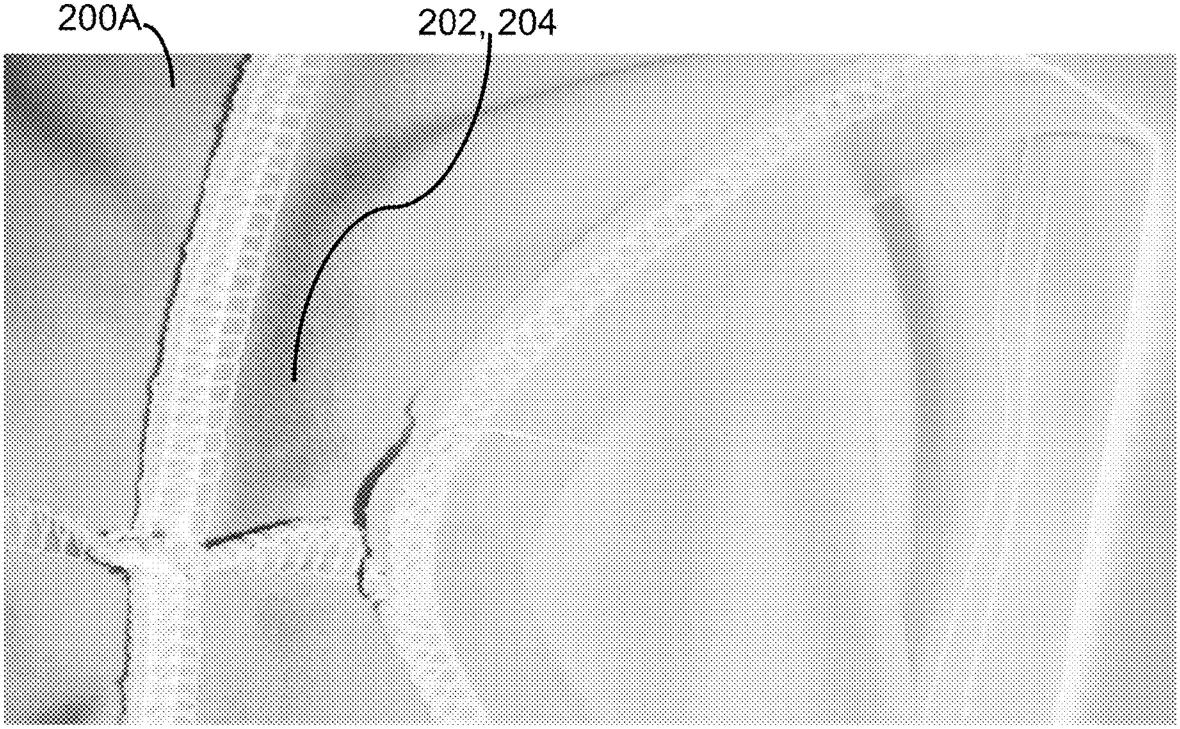

FIG. 10A depicts the left pit of shirt CH1 in visible light after the treatments described previously (as well as the treatment with optical brighter). A dark region 202 is still present that appears to come from within the fabric rather than resting on its surface. It is believed to come from biofilm material such as polysaccharides, proteins, and genetic material, that is capable of adhering to optical brighteners such as CF1 solution. FIG. 10B depicts the same region in UV light using the UVBeast V3 lamp. The dark region 202 of FIG. 10A is now a fluorescent region 204 with the appearance of a purple color, believed to result from Calcofluor White fluorescence couple with the dark matter's blocking of the fluorescence of the shirt material itself. UV light revealed regions in both pits of CH1 where the optical brightener was apparently adhering. The fluorescence in CH1 was bright enough to be detected even with the orange dye of the shirt brightly fluorescing at the same time.

Figure 10C:
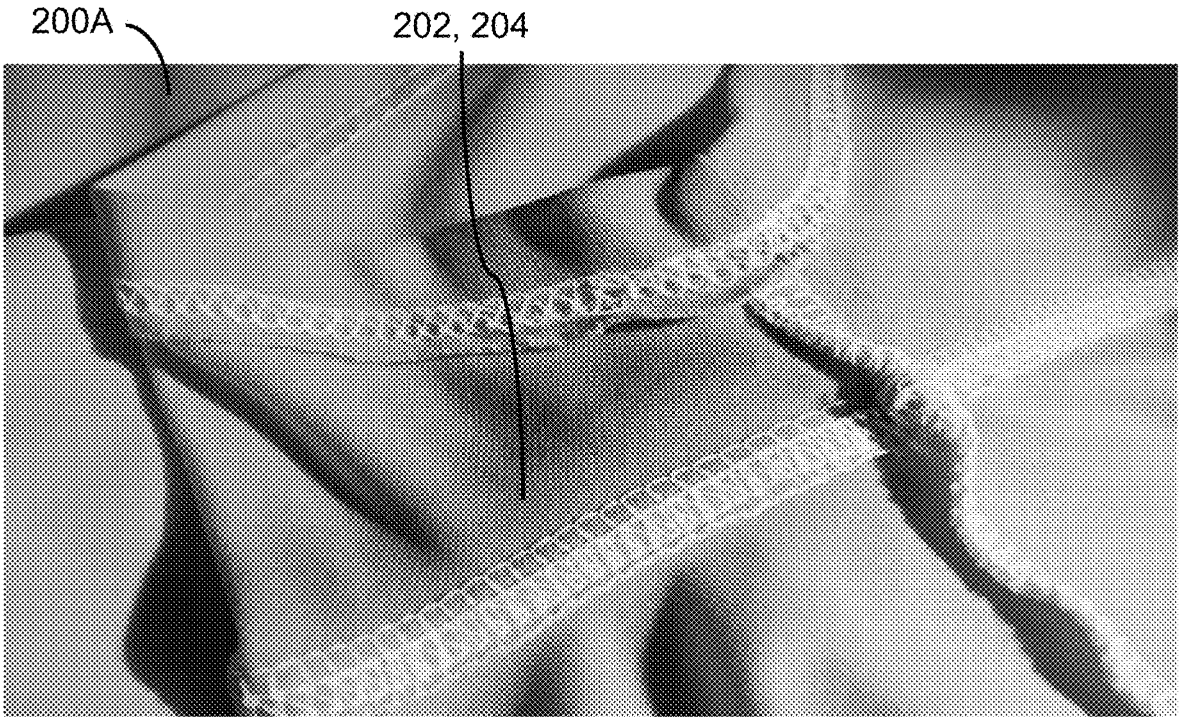
Figure 10D:
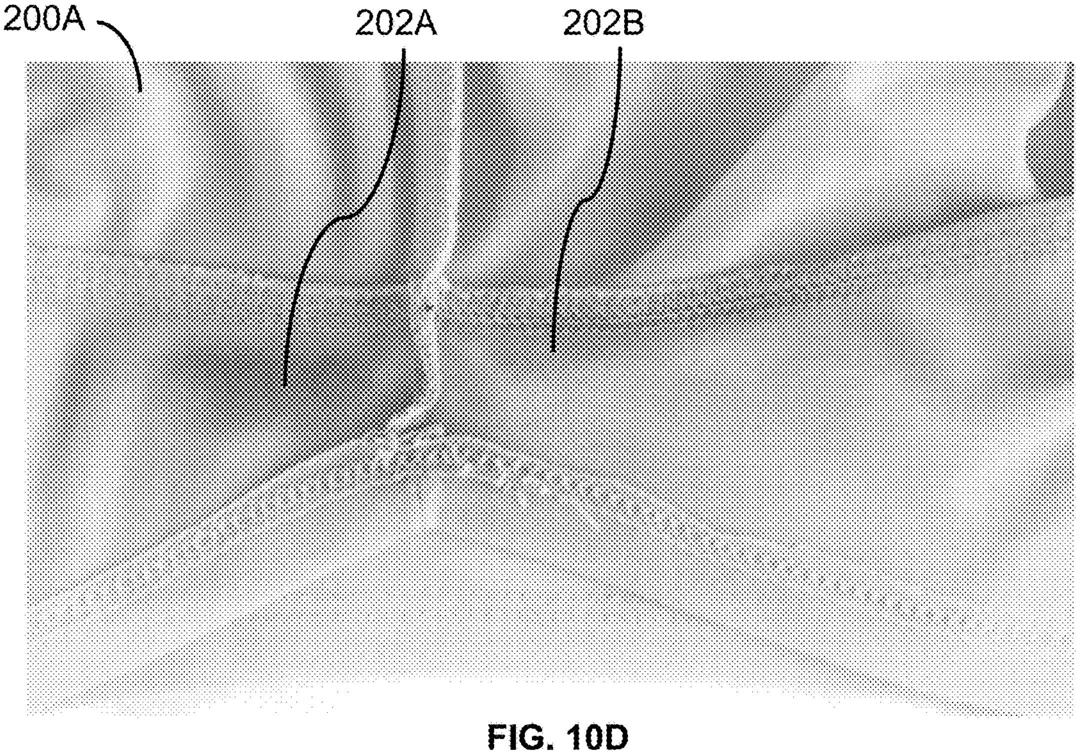
Figure 10E:
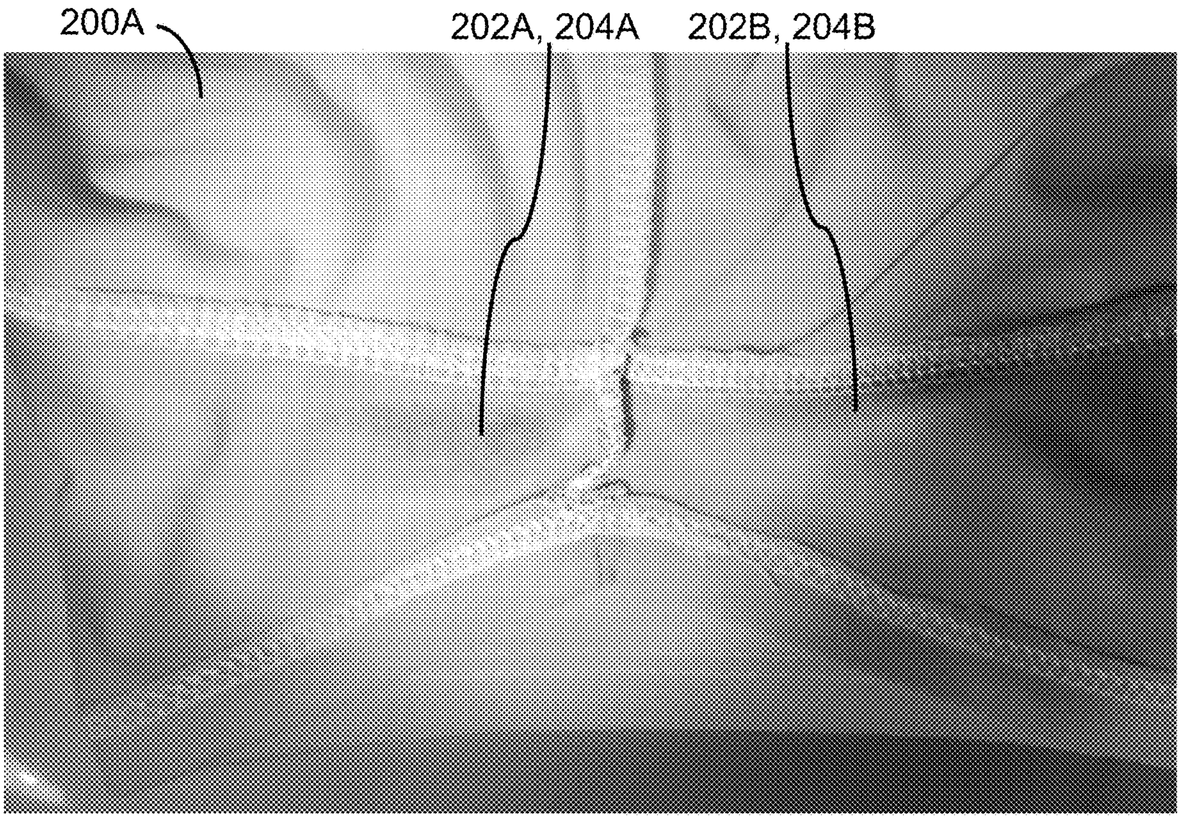

FIG. 10C offers another view of fluorescence in the left pit. FIG. 10D shows the right pit in visible light, where dark regions 202A and 202B are manifest. FIG. 10E shows the right pit in UV light, where the dark regions 202A and 202B now fluoresce as fluorescent regions 204A and 204B, respectively.

Figure 10F:
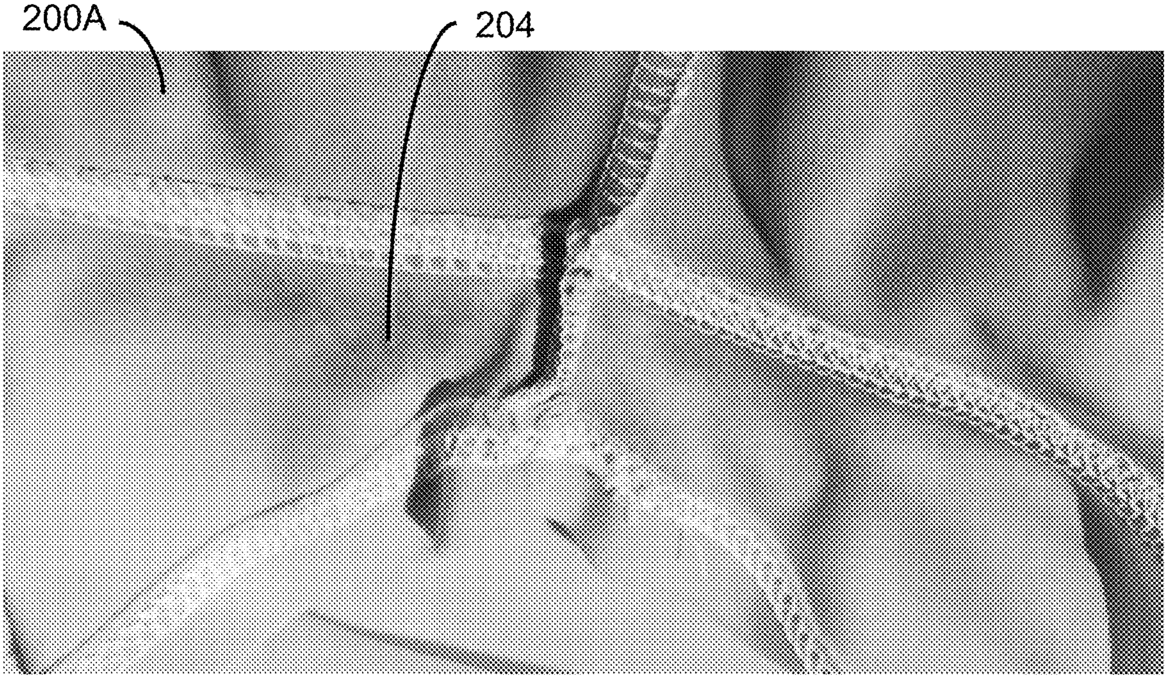

On the possibility that biofilm was being visualized with the optical brightener, a biofilm treatment was attempted. The left pit of CH1 was treated with 6 g of 2.1% NAC. Then 1.95 g of E3 was applied to the same region. For the right pit, 2.1 g of E3 was applied without NAC. After about 20 minutes, the shirt was washed in a short cycle at 30° C. with Purex® detergent. Darkened regions remained, though perhaps slightly lighter. For example, FIG. 10F shows the treated right pit, which still has a darkened region that becomes fluorescent region 204 in UV light.

Figure 10G:
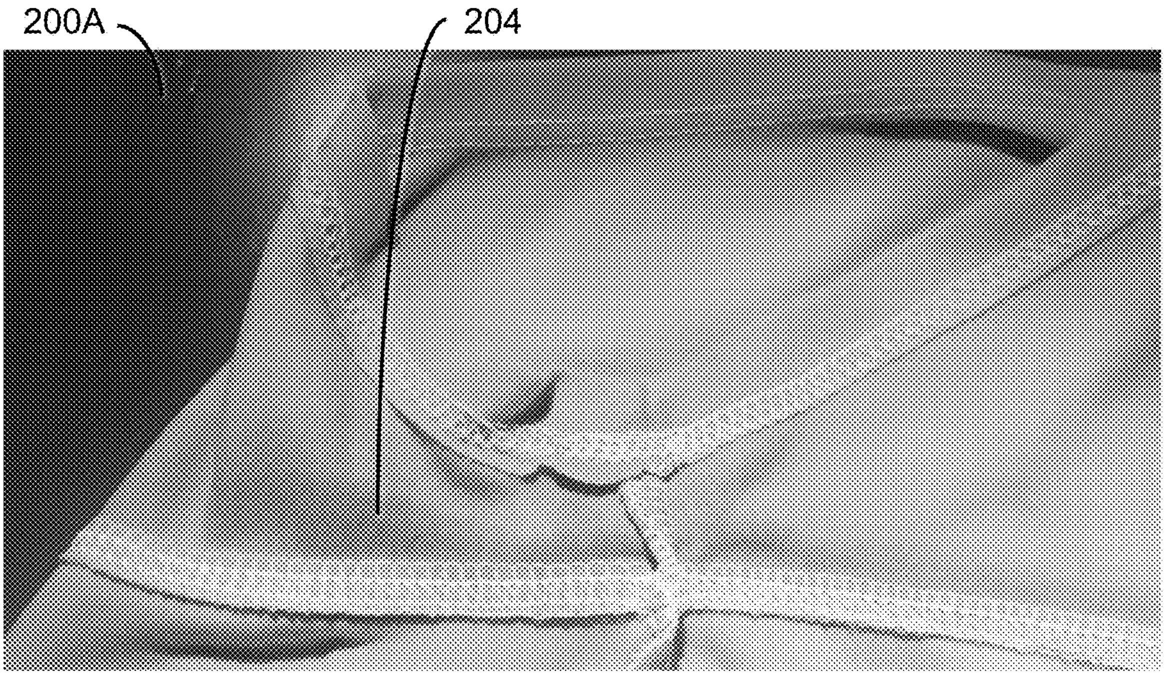
Figure 10H:
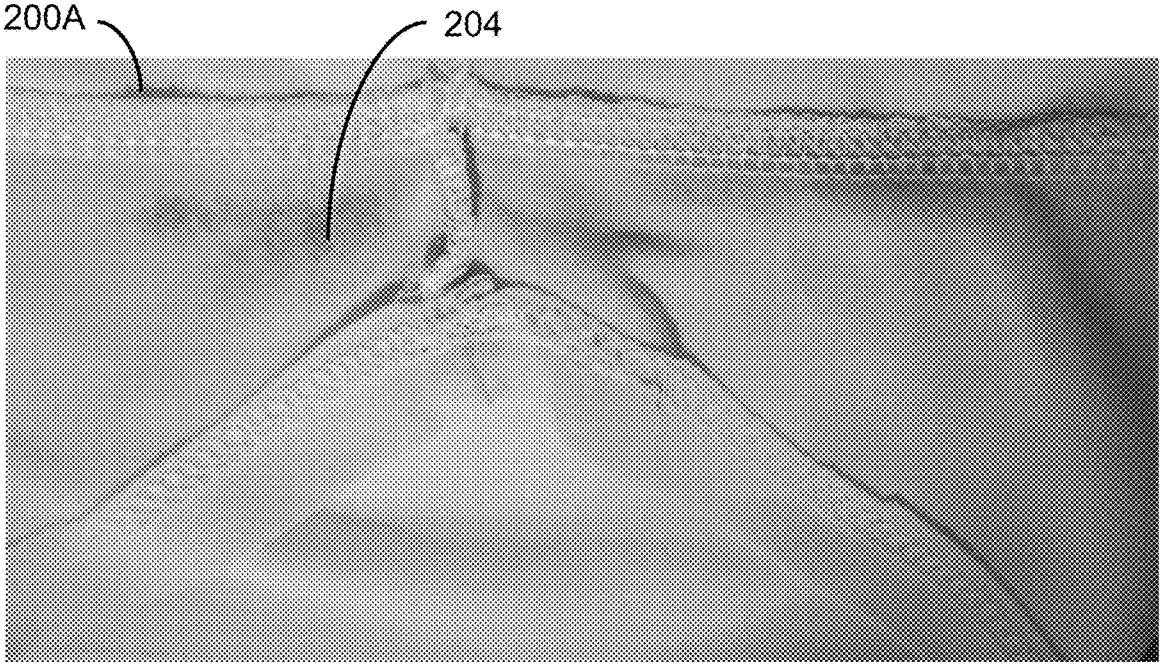
Figure 10I:
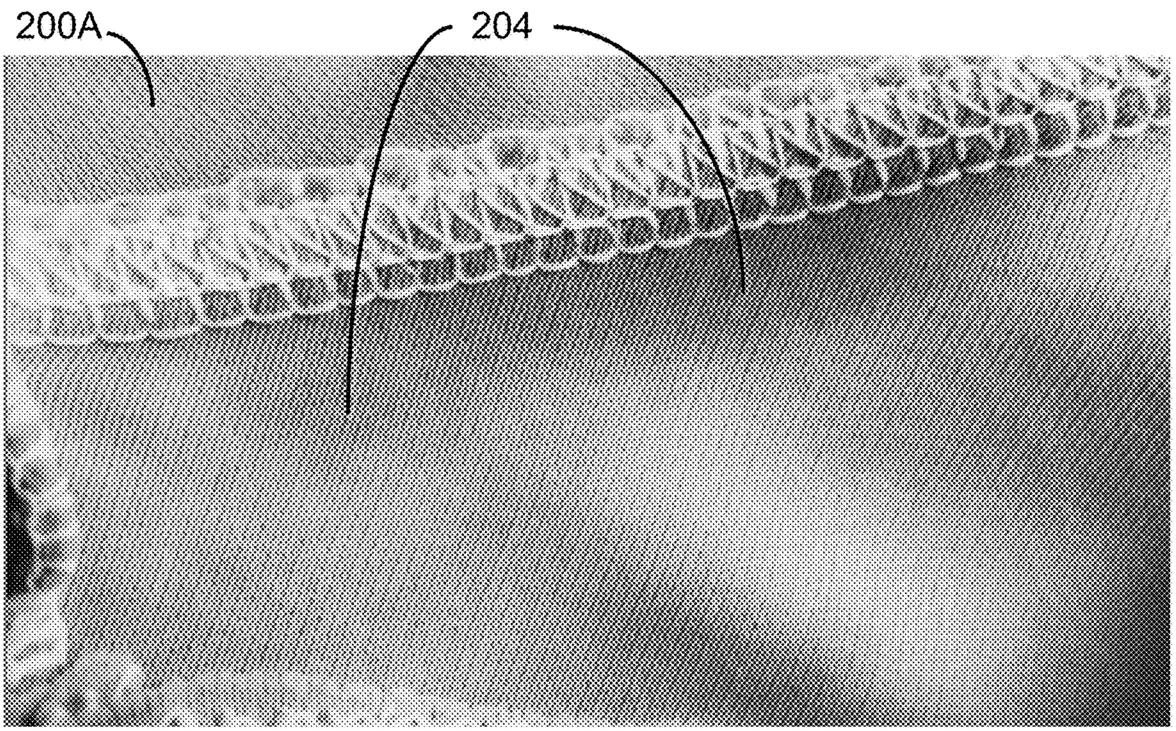

The right pit was treated with 7.6 g of CF1 and the left with 7.2 g of CF1. FIG. 10G shows the left pit under the light of the Lightfe® UV301D at 365 nm, showing fluorescence remains, though perhaps weaker than initially seen. FIG. 10H shows fluorescent region 204 of the right pit also with the Lightfe® UV301D lamp. After washing, 2 exercise sessions, and treatment with 3.44 g of CF1, the right pit shows fluorescence, as in FIG. 10I, but seems less than initially present in FIG. 10D.

In CH1, one of the dark patches was treated with a needle jet from a Waterpik® Water Flosser for dental hygiene, delivering about 1 liter of water to roughly a 1 cm×1 cm patch, resulting in significant lightening of the patch, but still with remaining darkened matter that appeared to be deep in the textile material. This is believed to be a remnant of a biofilm that has left material possibly comprising polysaccharides and proteins that can adhere to colorants in wash and may form a platform allowing bacteria to more easily attach to the clothing. In general, mechanical means such as a needle jet, brushing, friction, and so forth may be helpful in freeing biofilm remnants from fabric. The treated area was them sprayed with 6.7 g of CF1, rinsed in about 2 liters of warm water for 1 minute, and then examined in UV light showing improvement in the treated spot.

Figure 10J:
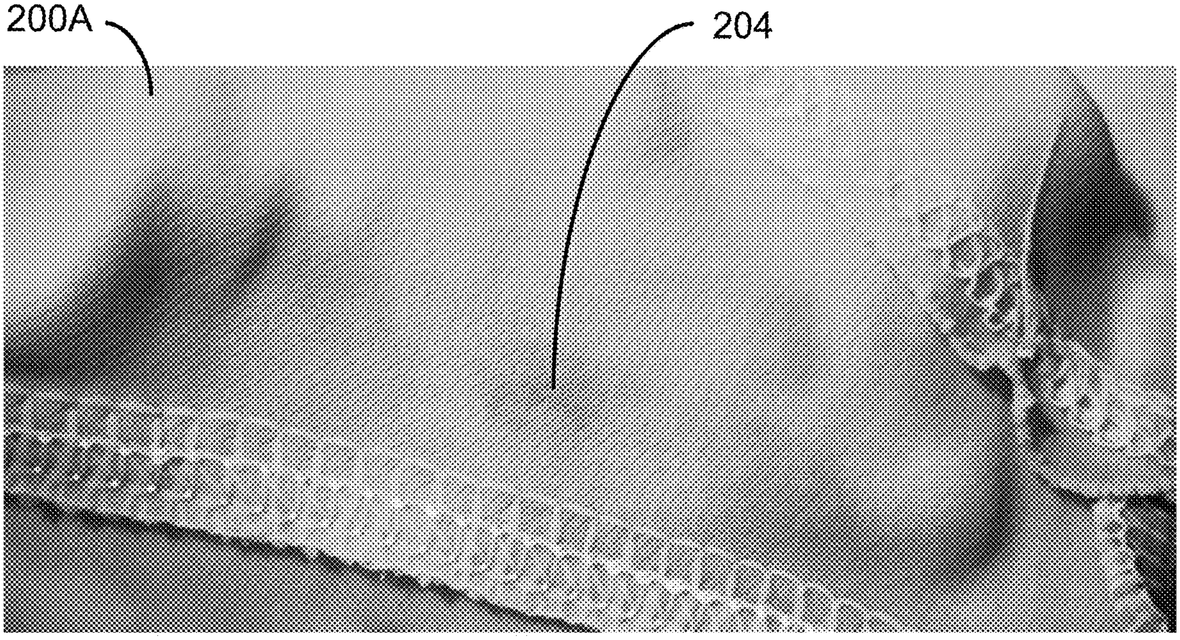

3.76 g of spray E3D was applied to CH1's left pit and rubbed into the slightly moist shirt (about 50% moisture). The shirt was put into a plastic bag and rolled up and kept at about 29° C. for over 4 hours, then washed in a fast cycle at 30° C. with Purex® detergent. After washing, the shirt was again sprayed with CF1 and viewed in UV light, as shown in FIG. 10J. The fluorescent spots 204 were still present but the intensity of the fluorescence had noticeably but slightly decreased.

Shirt BD1 (Blue Danskin Shirt)

Figure 11A:
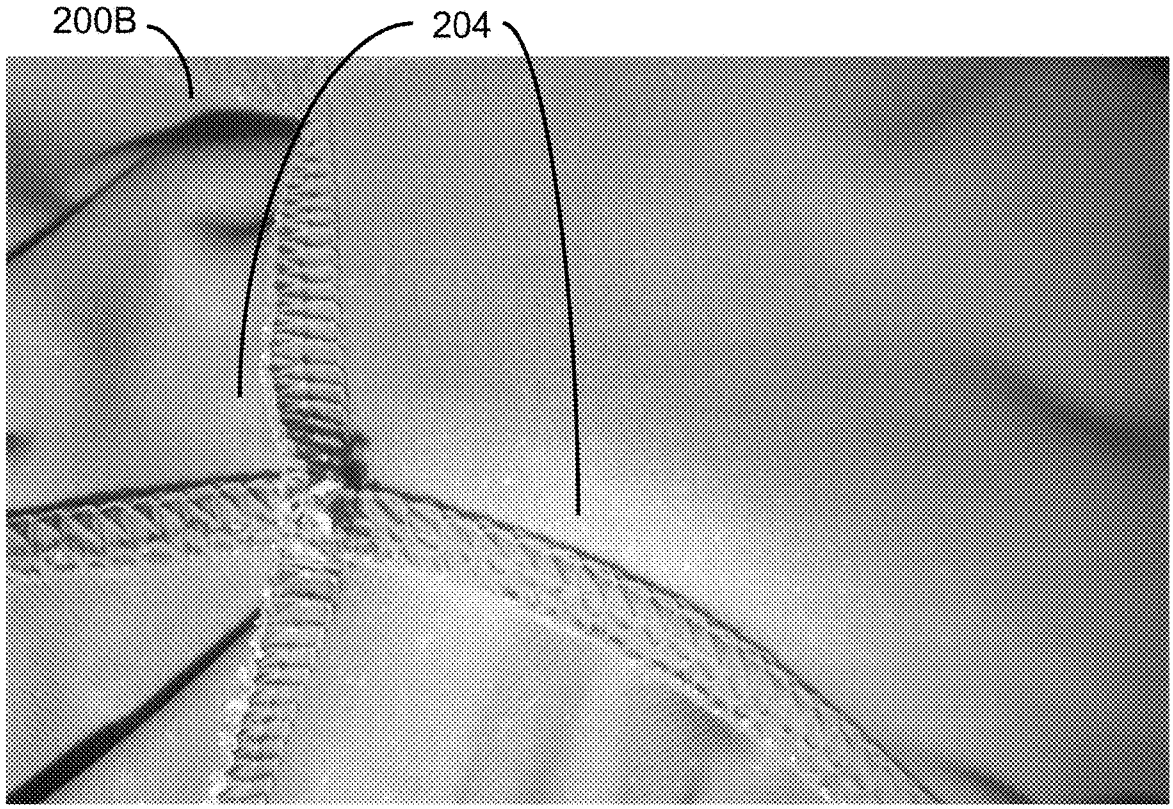
FIGS. 11A to 11F present photos of a blue polyester sports shirt showing evidence of fluorescence from biofilm matter in the shirt that can absorb optical brighteners.
Figure 11B:
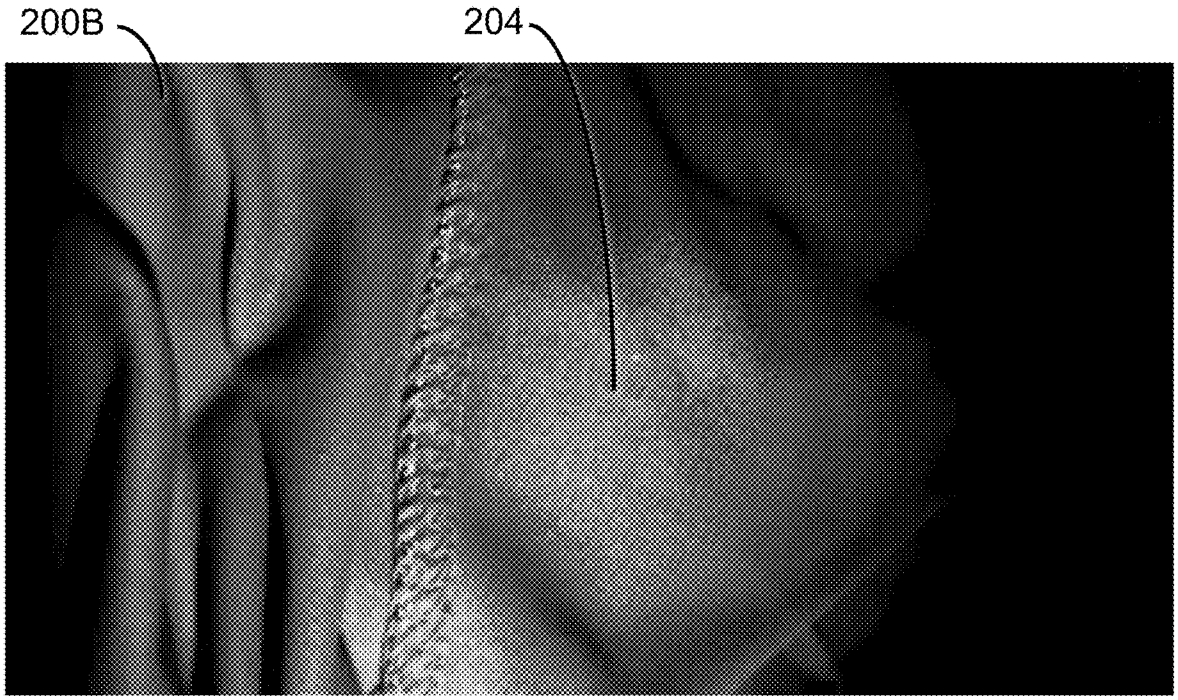
Figure 11C:
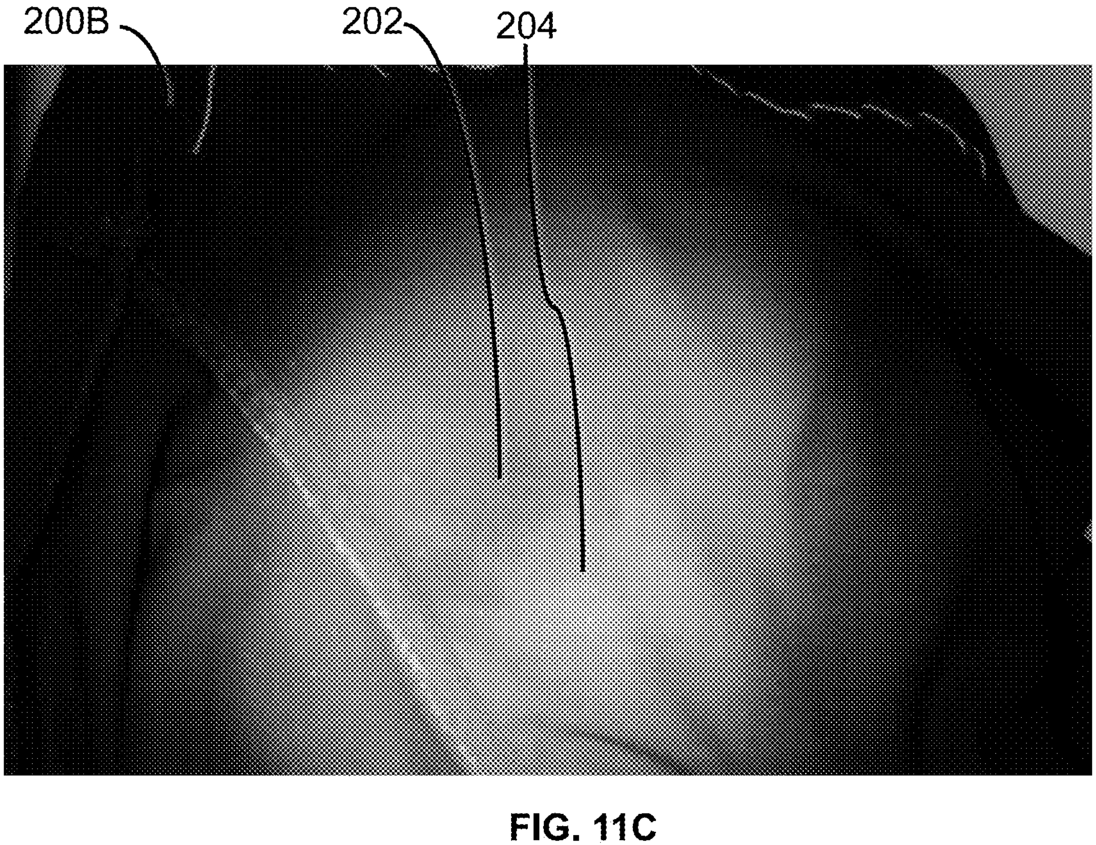
Figure 11D:
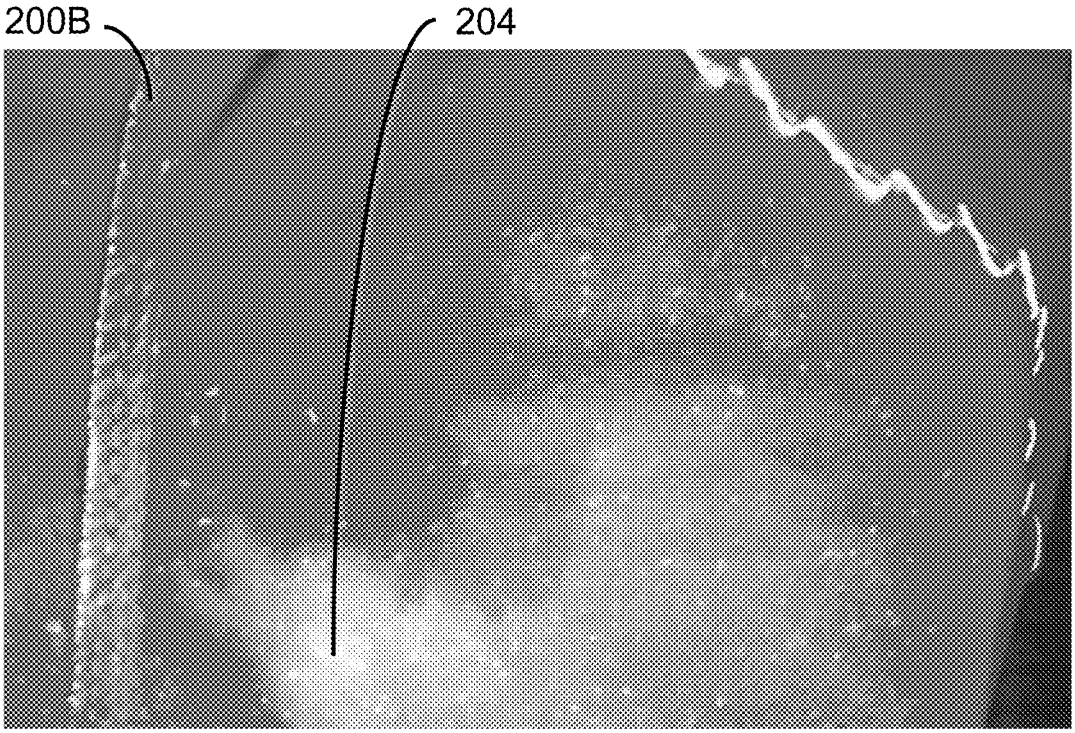

A blue Danskin shirt, BD1, was sprayed with CF1 on both pits, about 4.8 g each, then immersed in warm water for 1 minute. UV examination revealed little fluorescence after rinsing. After removing from immersion, the still wet shirt was further treated with 7.5 g CF1 to the right pit and 11.6 g to the left pit. The shirt was rinsed again. Fluorescence was still present in portions of the pits. For example, FIG. 11A shows fluorescent regions 204 in the right pit where the optical brightener adhered, photographed with an iPhone 6 Plus camera using a UV-absorbing yellow filer over the lens to block out some of the purple fluorescence of the shirt itself, while FIG. 11B, which shows a fluorescent region 204 in the left pit, was photographed without a filter, making it more difficult to get a meaningful image. FIG. 11C shows the fluorescent zone 204 also present in FIG. 11B, but with better clarity. BD1 had oblong patches of fluorescence about 2 cm wide and 6 cm long in the left pit and less in the right pit, apart from the above-mentioned fluorescent region 204 of FIGS. 11B and 11C on the sleeve about 9 cm from the center of the pit. FIG. 11D is another view of the left pit taken without the UV filter and requiring increased contrast to make the fluorescent region 204 more visible (it was plainly visible to the naked eye).

After further exercise in shirt BD1, bringing both puts to an odor level of about 3, shirt BD1 was treated with 5.2 g of 2.1% NAC (pH 4) in the right pit, followed by 2.9 g of E3C. The left pit was untreated. The shirt was washed with Purex® detergent. After washing and drying, the right pit appeared to have an odor level of 0 while some residual odor remained in the left pit at a level of about 1 (scale of 1 to 5). The fluorescent zones were slightly decreased in intensity.

Further treatments were conducted in BD1. 5.2 g of 2.1% NAC at pH 6.4 was applied to the right pit followed by 3.0 g of E3D. The left pit was wetted 3.9 g of water followed by 3.28 g of E3D. The shirt was put in a plastic bag and kept at a temperature of about 33° C. for 2 hours, then washed in a full cycle at 40° C. (78 minutes) with liquid Tide® detergent. Fluorescent zones remained as revealed through use of a UV Beast V3 lamp (the default lamp used herein; exceptions with a different lamp will be noted), though again the intensity may have decreased slightly.

Shirt BD1 was then treated in the right pit only with multiple agents in this order, all applied via spray: 2.51 g of 2% NAC at pH 9, 1.54 g of LysoB, 1.26 g of CellulaseC, 1.305 g of AmylaseA, 2.38 g of PAPA, 1.06 g of PNACS, 1.37 g of PMIX1, and 1.21 g of E3D. The short was kept at about 35° C. for about one hour, then further treated with about 0.5 ml of Melaluca brand Lite Brite detergent that was rubbed in with warm water as the shirt was then rubbed and immersed into a tub of warm water, followed by washing with liquid Tide® detergent in a short cycle at 30° C. Fluorescent zones were somewhat visible after the rinse, but following the wash cycle, the treated fluorescent zones were largely removed in the right pit.

The untreated left pit still retained a fluorescent spot at the outside of a yellowish region in the blue shirt that did not fluoresce. The left pit was now treated. Focused on the yellow zone and the adjacent fluorescent patch, 2.89 g of PAPA and 2.11 g of E3D were applied and rubbed into the treated area. The shirt was then rolled up and outer layers were wetted with about 50 ml of water. The shirt was placed in a bowl set in a metal pan with about 5 cm deep of hot water in the bottom, intended to help heat the environment and keep the shirt at a relatively stable temperature with a lid over the contents. The shirt in this environment was initially at a temperature of about 48° C. to 40° C. for the initial hour or so, followed by reheating about 2 hours later. The shirt stayed in the container overnight, with heating again in the morning bringing the temperature to about 40° C. Shirt BD1 was then washed with Tide® liquid detergent in a short cycle and then the left pit area was visualized in UV light. The fluorescent region was still present, though perhaps slightly weaker. In visible light, it was apparent that the previously noted yellow region (about 7 cm wide and 3 cm tall) was substantially reduced in size and intensity.

Figure 11E:
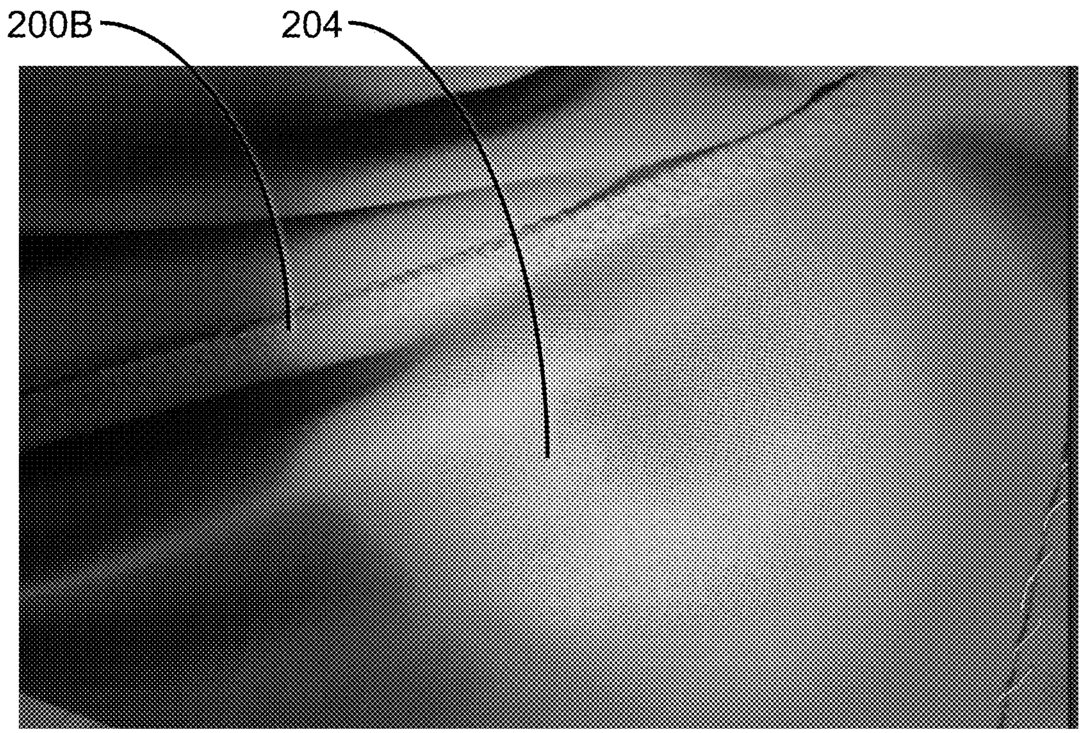
Figure 11F:
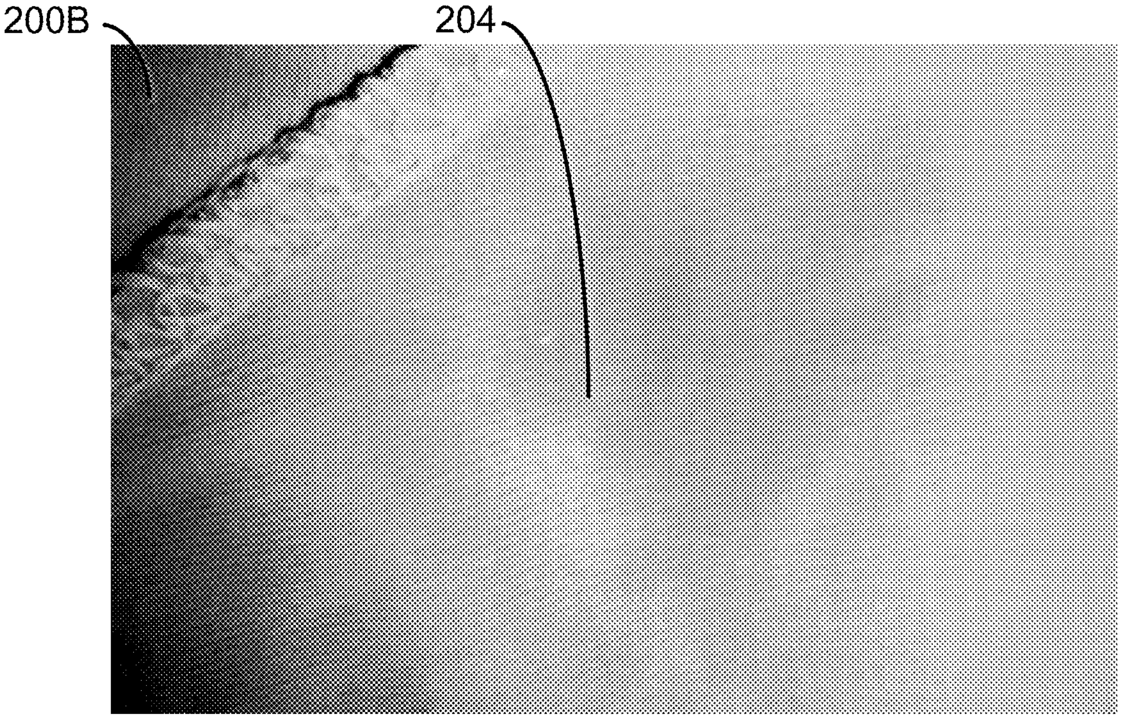

In hopes of repeating the removal of the white fluorescence that was seen in the right pit, the left pit was then further treated with a similar mix to the previous mix given to the right pit. In this order, the applied compounds were 3.5 g of NAC 2.1% at pH 9, 1.32 g of LysoB and 0.50 g of LysoB2, 1.3 g of CellulaseC, 1.18 g of AmylaseA, 1.58 g of PAPA, 1.0 g of PNACS, 1.16 g of PMIX1, and 1.6 g of E3D rubbed into the fabric. This was stored in a covered pan with a bowl with some hot water inside the pan to keep the temperature at about 47° C. to 40° C. for about 70 minutes. About 0.5 g of Lemon Brite dish detergent was then applied to the treated region and rubbed into the shirt, then rinsed out in warm water. The targeted fluorescent zone was still present, though apparently slightly weaker, while the yellowish zone had been largely removed. The result for the treated left pit is shown in FIG. 11E showing the fluorescent region 204. The shirt was then washed in a full cycle with Tide® liquid detergent at 40° C. FIG. 11F shows the result for the treated left pit. These results in FIGS. 11E and 11F still show the fluorescent patch 204, but its intensity to the naked eye was significantly reduced through these treatments.

Fluorescent Testing with a Gray Perma-Odor Sports Shirt

Figure 12A:
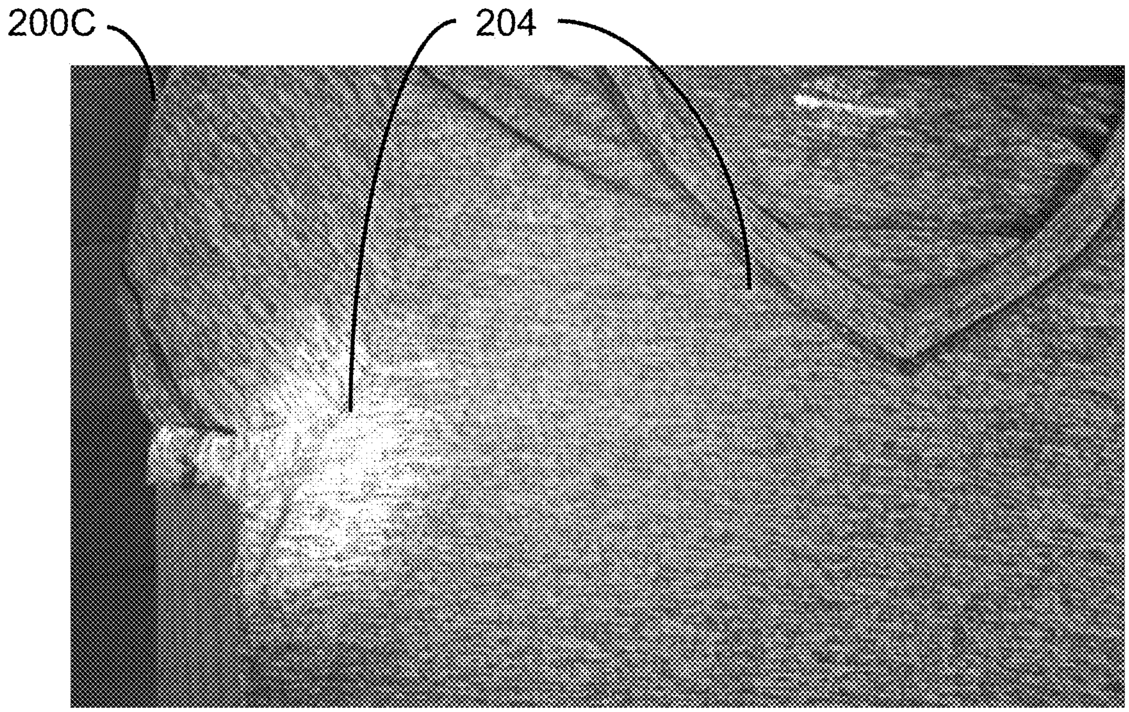
FIGS. 12A to 12S show photos of a gray polyester sports shirt previously afflicted with perma-odor, showing remnants of a possible biofilm visible via Calcofluor White fluorescence in UV light.
Figure 12B:
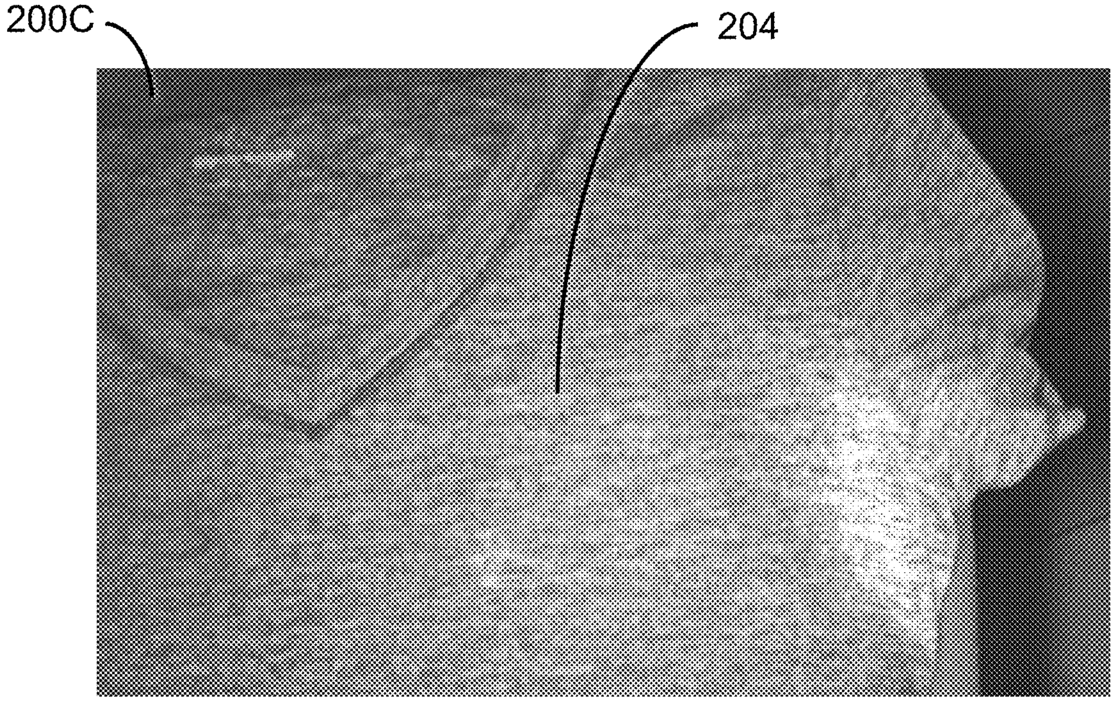
Figure 12C:
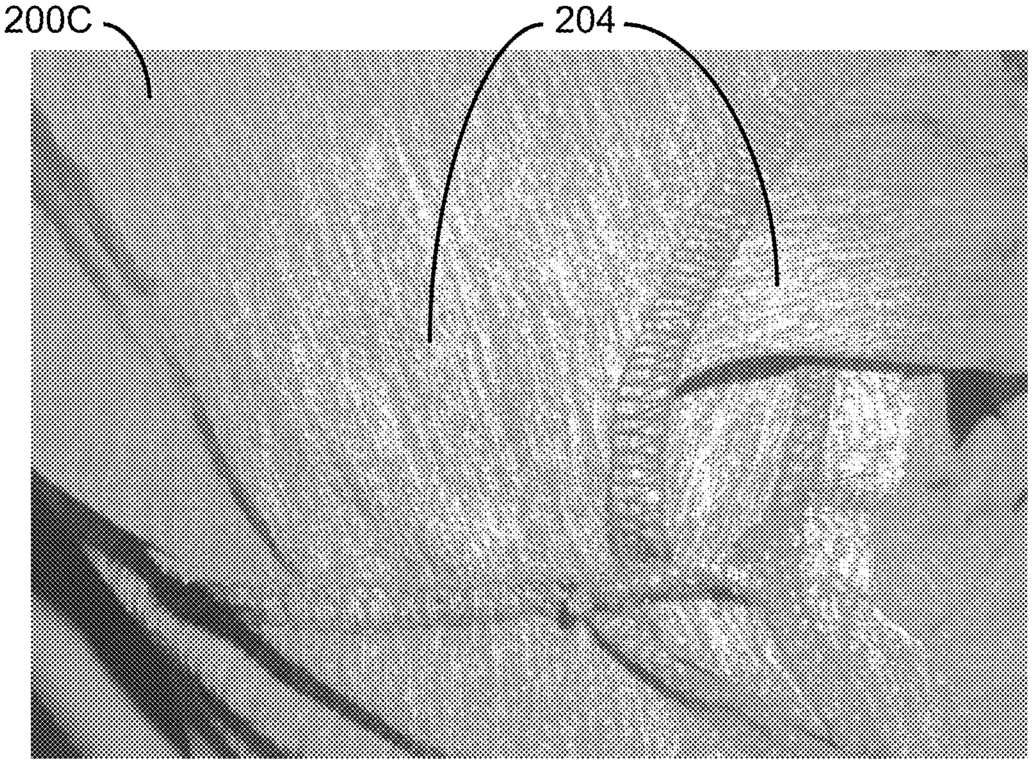
Figure 12D:
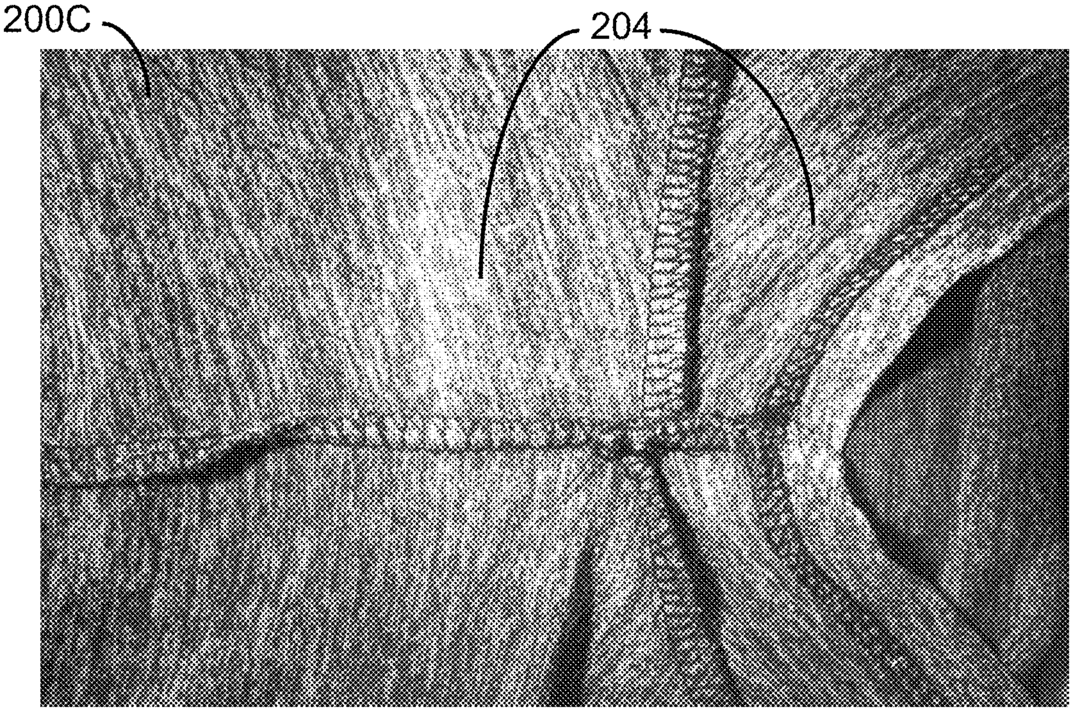
Figure 12E:
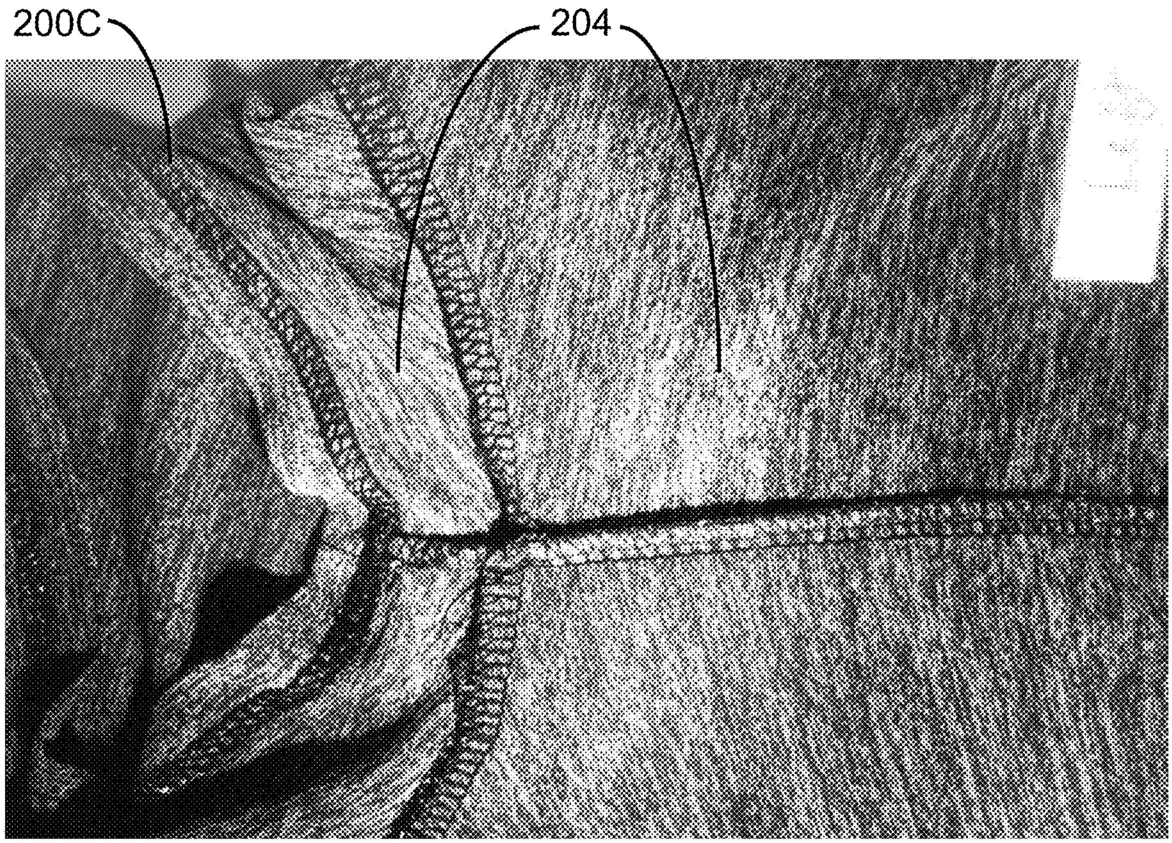
Figure 12F:
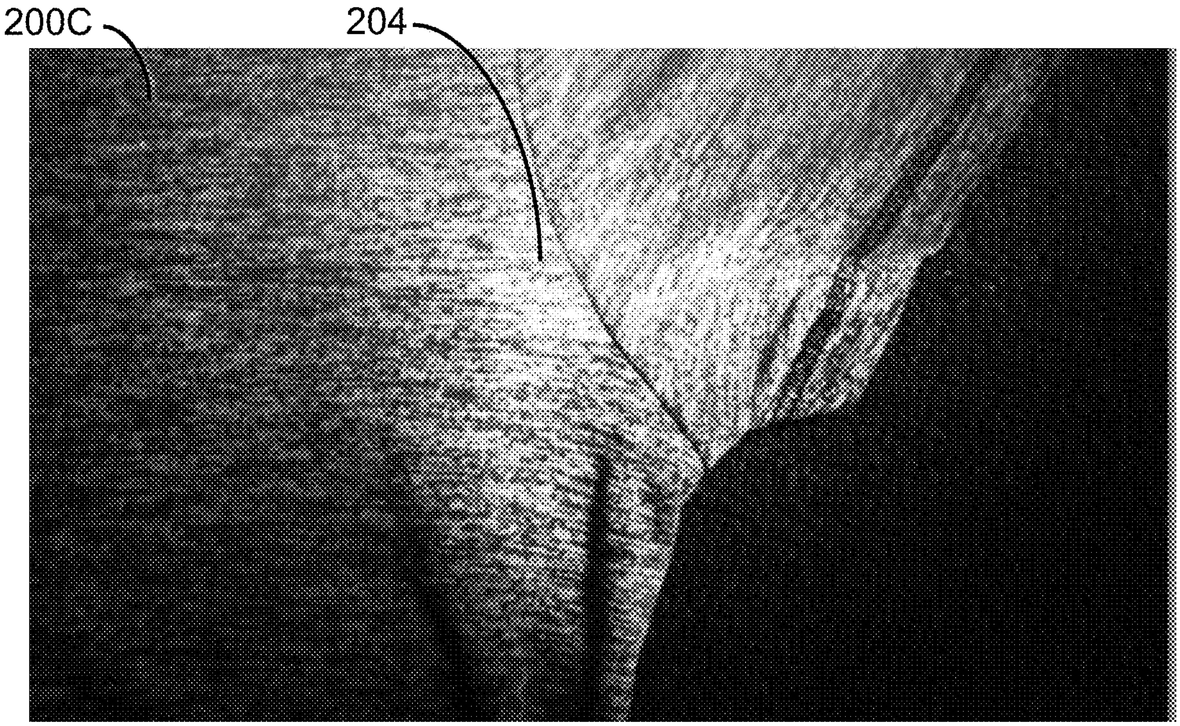

An athletic female who exercises almost daily reported that her polyester sports top showed symptoms of perma-odor following extensive use. This shirt, code named RA1, was a 100% polyester gray Melange Jersey knit shirt from Academy, Ltd. (Katy, Texas), made in Kenya. It exhibited strong fluorescence as is in both pits, with no need to treat with Calcofluor. FIG. 12A shows a photo of the right pit under UV light, and FIG. 12B shows the left pit under UV light. After turning the shirt inside out, FIG. 12C shows a close-up of the right pit under UV light without a UV filter over the camera lens. The result with the filter in place is shown in FIG. 12D for the right pit for comparison, and for the left pit in FIG. 12E. Fluorescence is visible on the inside and outside. A close-up of the left pit, right-side out, is shown in FIG. 12F.

It is believed that biofilm formation in the pits had created regions capable of firmly retaining optical brightening agents from typical laundry detergents. The shape, size, and position of the fluorescent zones were entirely consistent with biofilm regions formed by bacteria interacting with sweat from the armpit of an active exerciser. The fluorescent zones includes cuff regions of the short sleeves near the pits and occupied the center of the pits but centered slightly away from the center of the pit, shifted slightly toward the front of the body, consistent with the a slight forward lean during jogging or many other exercise routines that would allow the sweat to be inclined slight toward the front of the body. The intensity of the fluorescence was relatively high and seemed unaffected by ordinary washing. Several treatments were attempted to find ways to reduce the fluorescent zones.

Figure 12G:
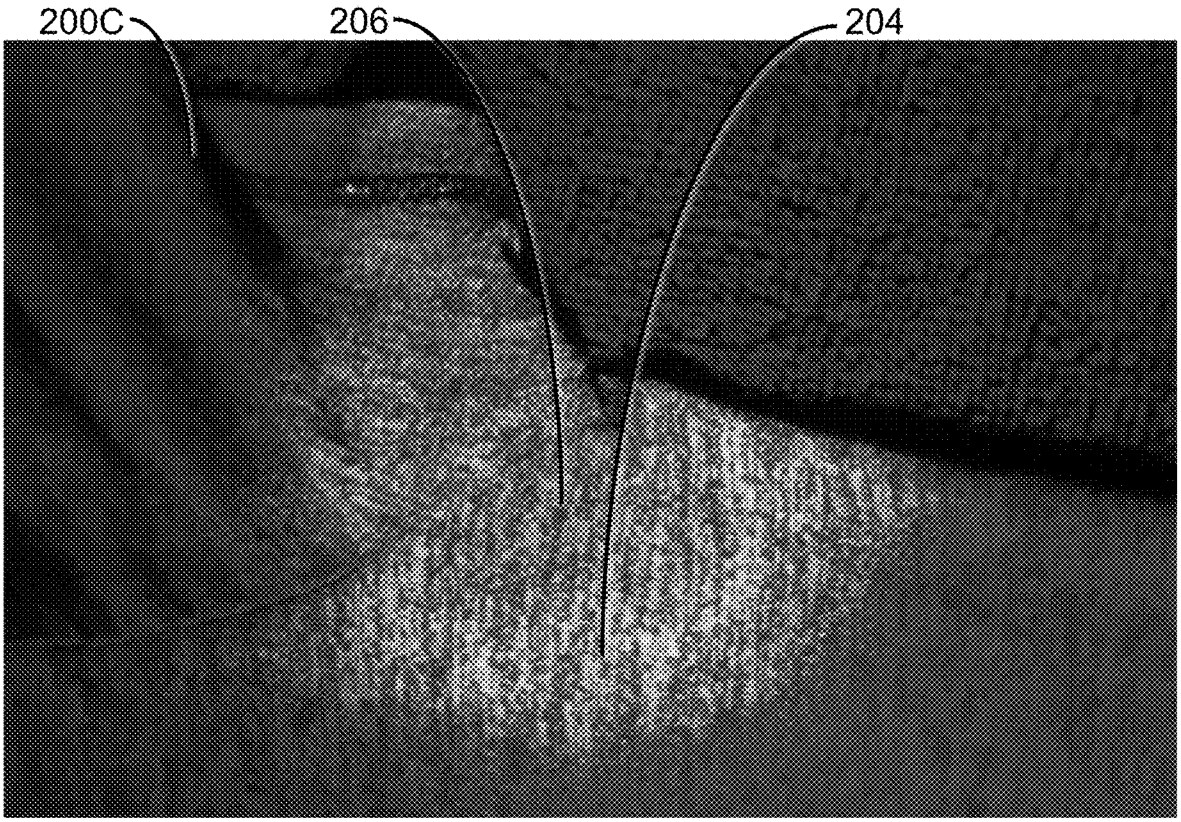

Shirt RA1 was then treated with E3D, 9.2 g in the right pit and the left pit first treated with 2.1% NAC, 4.54 g, then 10.7 g of E3D. The initially dry shirt was then misted with about 40 g of water and placed in a plastic bag and kept at about 33° C. for 2 hours, then washed in a short cycle at 30° C. with Purex® Dirt Lift Action® Free and Clear detergent. After washing, the shirt was examined under UV light it was noted that the central region of the left pit showed significant reduction in fluorescence, giving a donut-shaped ring of fluorescence with a central void about 5 cm in diameter and an outer diameter of about 12 cm in diameter. See FIG. 12G, which was taken without the UV filter in place. The region with diminished fluorescent 208 is adjacent the more highly fluorescent region 204. The diminished fluorescence is clearer in color to the naked eye than in the images converted to black and white. The right pit (not shown) still appeared bright and lacked the visible reduction seen in the left pit, though it may have been slightly reduced in intensity also.

Figure 12H:
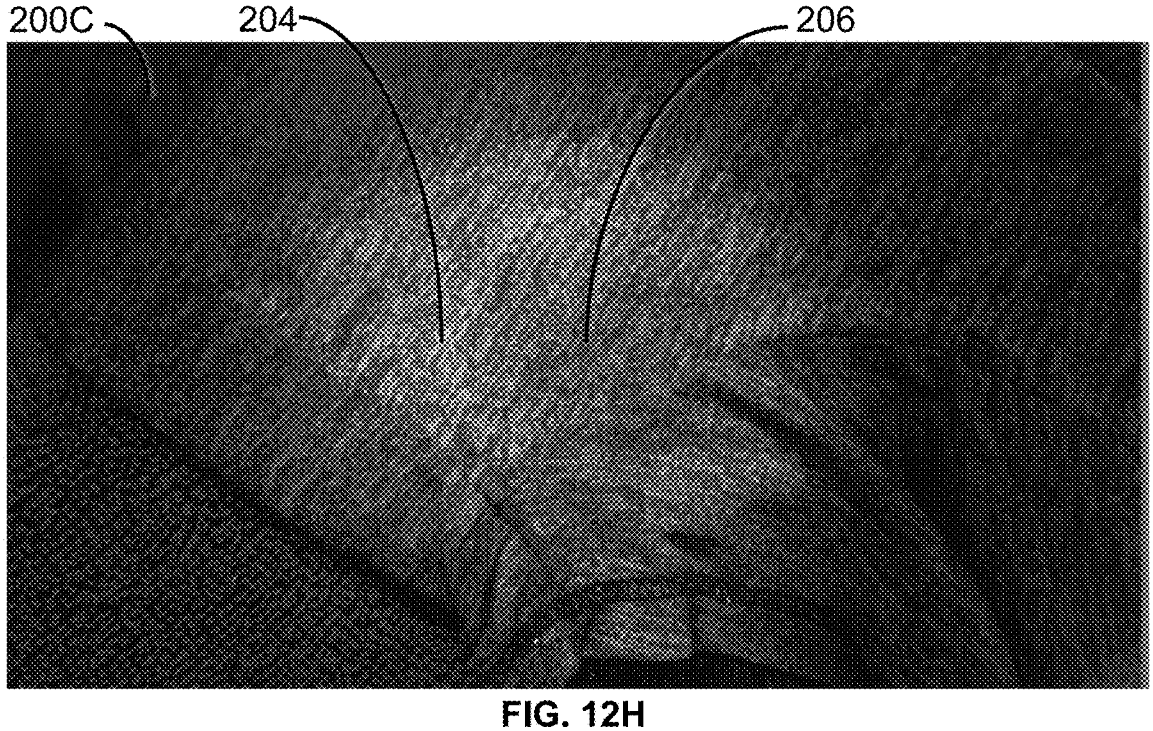
Figure 12I:
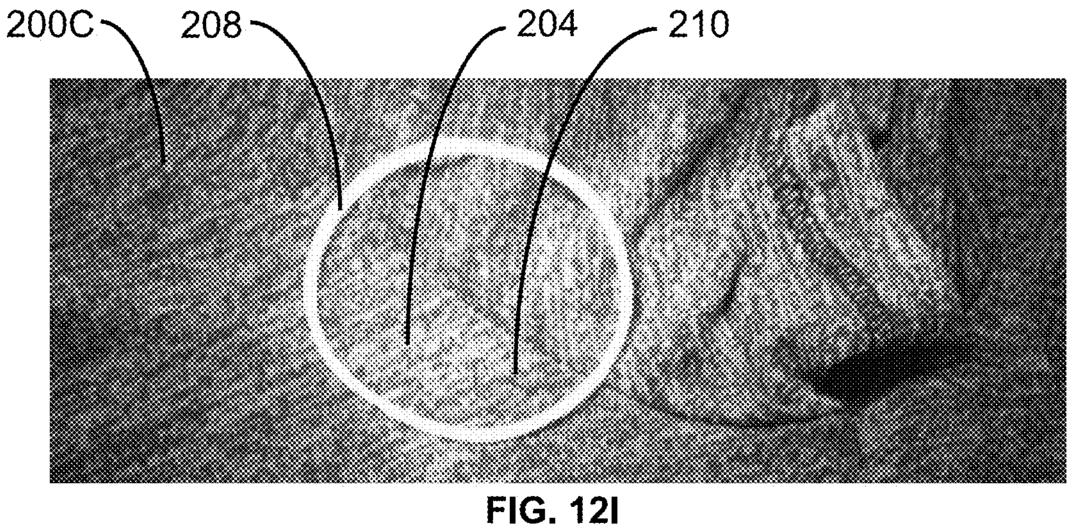
Figure 12J:
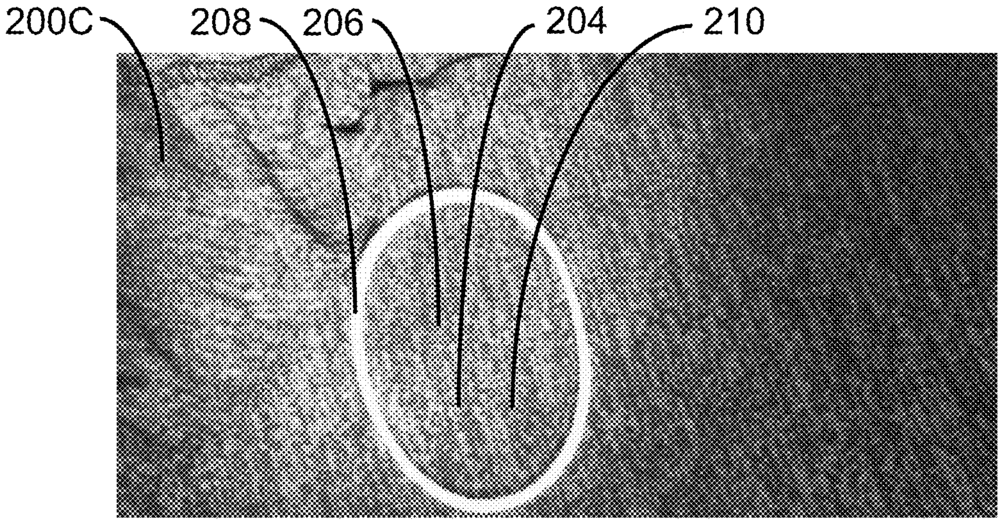
Figure 12K:
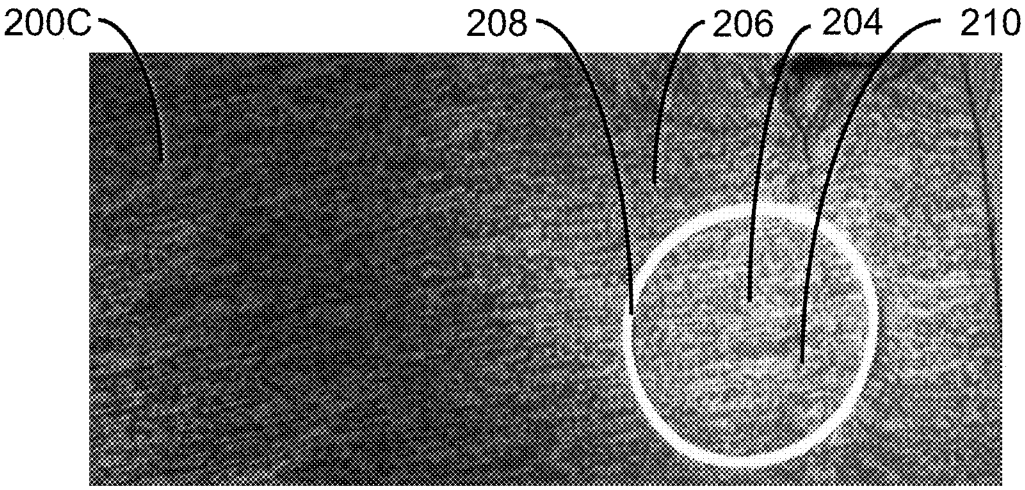

A second treatment was applied to the left pit of RA1 as 14 g of PNAC4 was applied to the pit and surrounding area. The shirt was heated to about 33° C. for 10 minutes. Then E3D was applied to both pits and adjacent areas, 9.6 g for the left and 9.9 g for the right. The shirt was them kept warm for about 10 more minutes then washed again in a short cycle. The washed shirt was exposed to UV light and a slight reduction in intensity was seen in both pits, but the glowing regions persisted with much the same size and shape they had prior to this wash cycle. The left pit under UV light is shown in FIG. 12H, also taken without the UV filter in place The washed and dried shirt was now used to test different treatments applied to three sections of the major fluorescent area of the left pit, as shown under UV light in FIGS. 12I, 12J, and 12K, showing upper, middle, and lower treatment zones 210, each marked by a respective boundary marker 208. The entire left pit and sleeve area was treated with 6.1 g of NAC spray, 2.1% at pH 4.0, followed by individual treatments in the treatment zones.

In the upper treatment zone shown in FIG. 12I, relatively high in the fluorescent area (toward the shoulder region), the treatment zone 210 (roughly a 5-cm diameter circle) was treated with amylase solution, but was first sprayed with 1.76 g of 2% NAC at pH 9.17 to raise the pH to about 7, as confirmed with pH testing paper, followed by dropwise application by pipette of 2.6 g of AmylaseA solution.

The lower treatment zone shown in FIG. 12K, received 2.45 g of PMIX1 dropwise by pipette to apply a mix of pectinases to a roughly 5 cm diameter circle in a lower fluorescent zone in the pit. FIG. 12K shows the boundary marker 208 (here a rubber band) marking the upper treatment zone 210 for pectinase solution. Treatment zone 210 contains portions of the fluorescent zone 204 in the left pit.

In FIG. 12J, the middle treatment zone 210 between the above-mentioned two zones, received treatment with papain and lysozyme. 1.7 ml of LysoPap solution was pipetted onto the oval treatment zone 210 about 5 cm wide and 3 cm tall. Then the right pit was prepared by spraying about 2 g of 2.15% NAC solution at a pH of 6.4 over the lower half of the fluorescent pit zone (not shown), then 2.3 ml of CellulaseA solution was applied by pipette to that region. Then 1.0 g of E3D was sprayed onto the treated area of the right pit and 1.6 g of E3D was sprayed into the treated regions of the left pit. After 10 minutes, the shirt was rinsed in 1 liter of hot water (about 45° C.) containing 1 g of Lemon Brite dish detergent. The shirt was gently agitated by hand for about 1 minute and then rinsed in fresh water for about 1 minute.

Figure 12L:
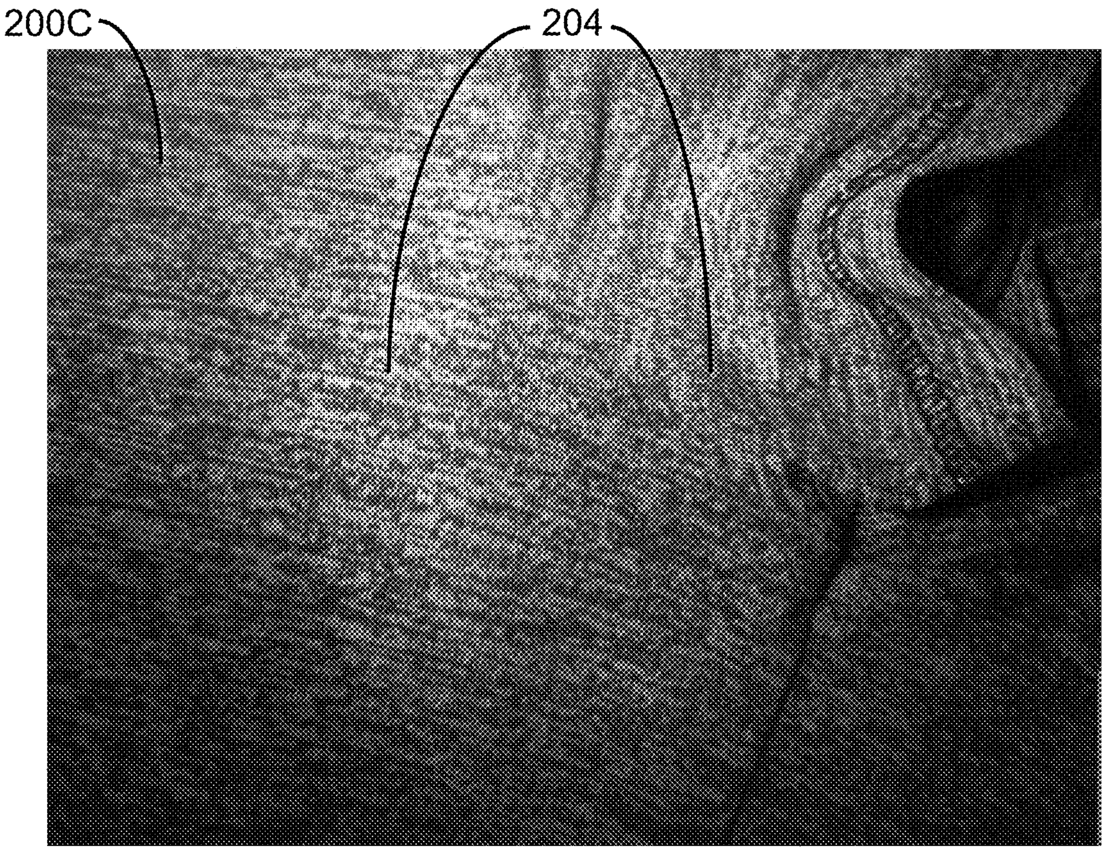
Figure 12M:
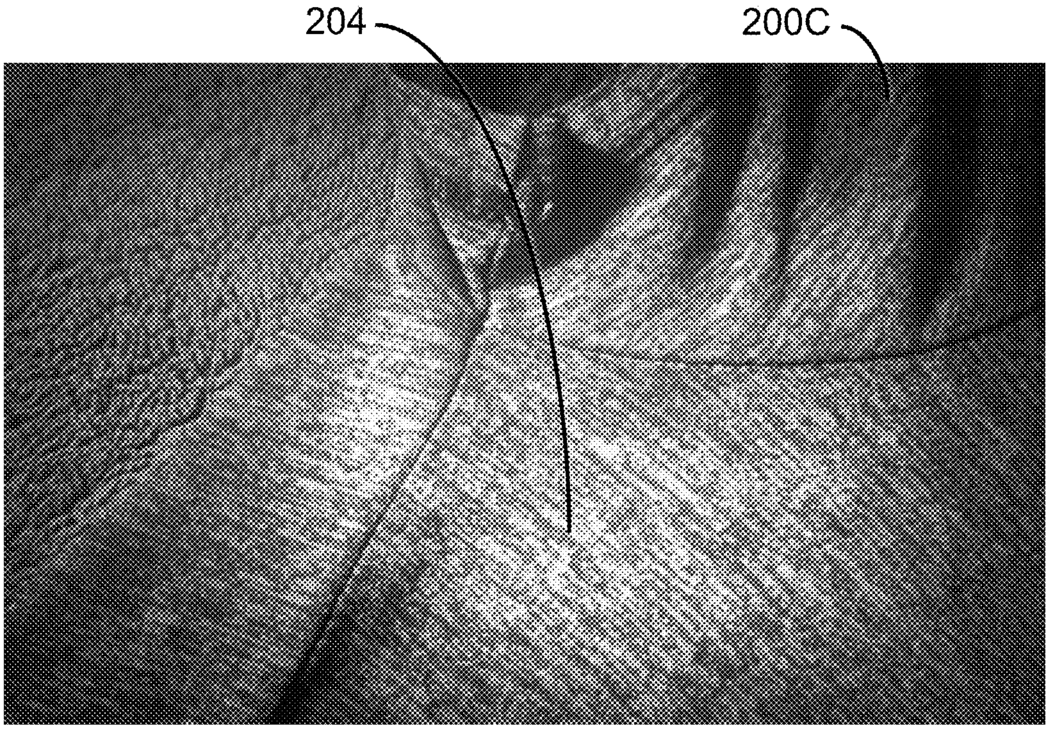

The treated regions were then rinsed in warm water and wrung to partial dryness. It was observed that the region of the left pit that had been treated with LysoPap solution (lysozyme and papain), the middle zone of FIG. 12J, had reduced fluorescence. The other regions looked much the same as before, though may have had slightly reduced intensity. The lower left pit was now treated with 0.76 g of 2.15% NAC solution at pH 6.4, and then 1.1 ml of PAPB solution were applied via pipette, plus 1.0 ml of AmylaseA, all in a 5-cm diameter circles over a fluorescent zone. After 5 minutes, another 0.3 ml of PAPB solution was applied followed by 0.1 g of Lemon Brite dish detergent in the targeted spot, which was then rubbed in. The fluorescence was not dramatically different, though it seemed slightly attenuated in both cases. The pit were examined in UV light and photographed with a UV lens in place, with results for the left pit shown in FIG. 12L and the right pit in FIG. 12M.

Figure 12N:
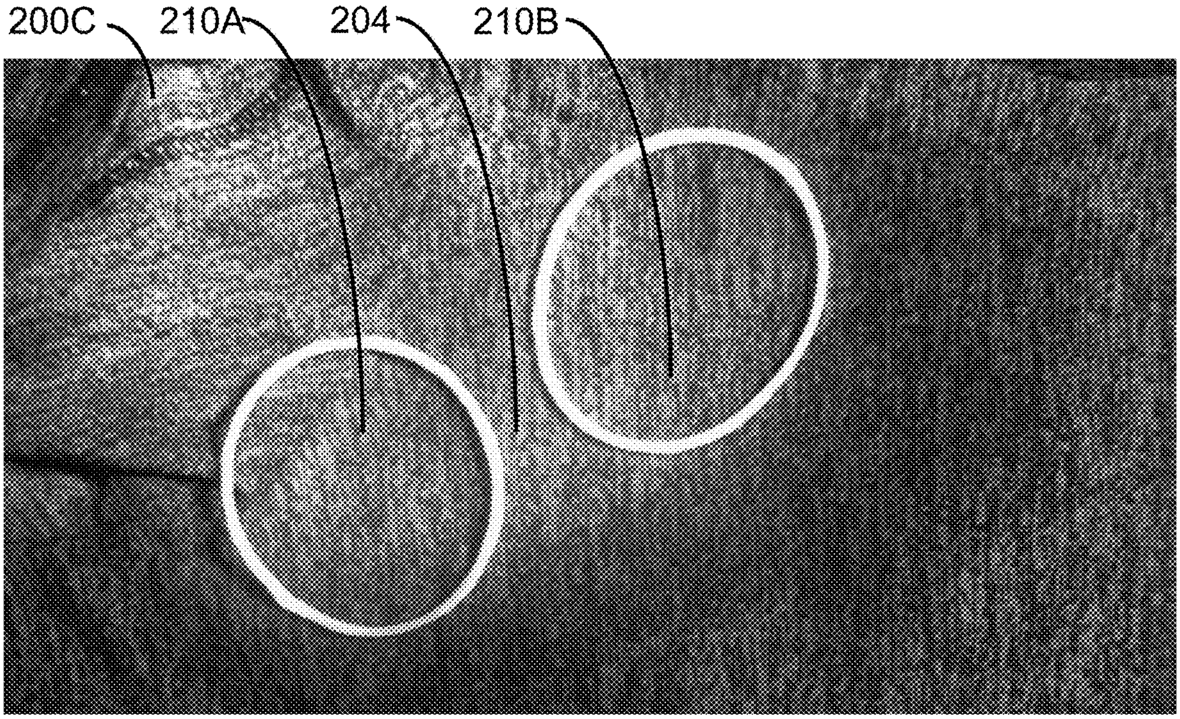
Figure 12O:
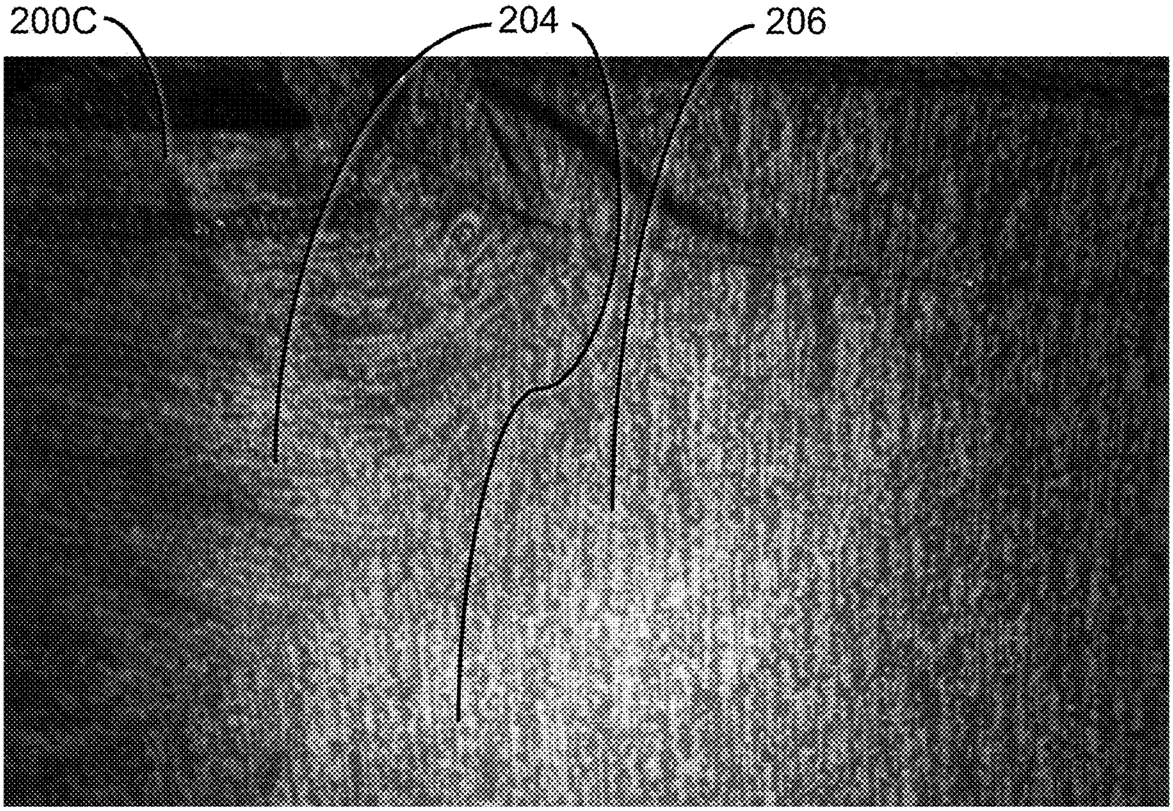
Figure 12P:
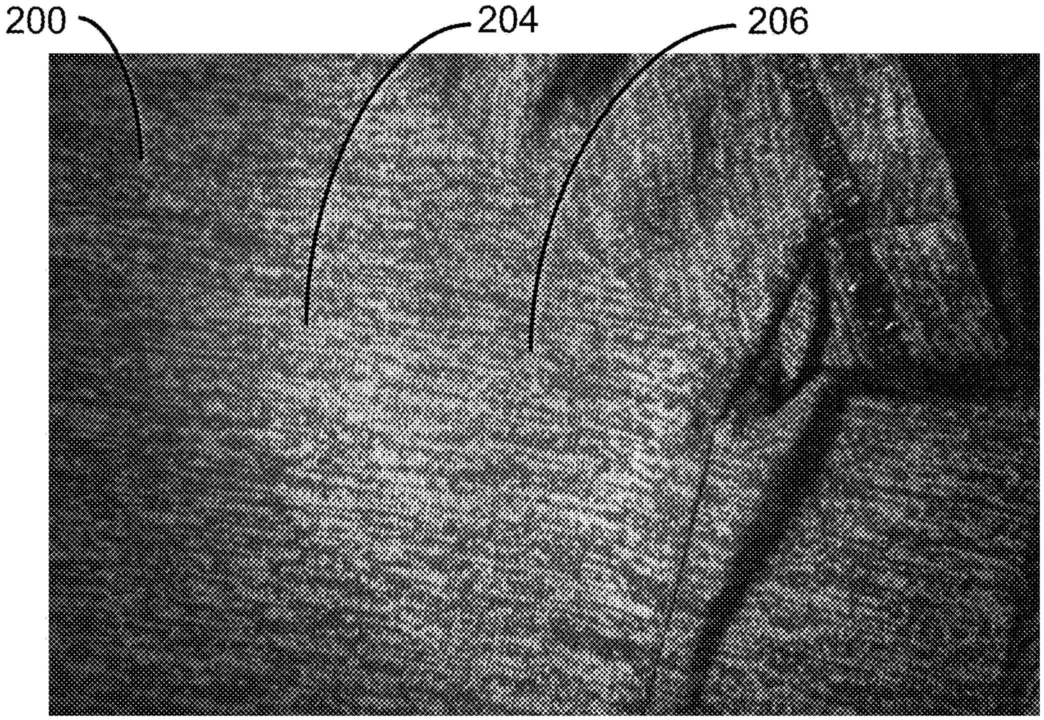

Now two treatment zones in the left pit were considered, both circles about 5 cm in diameters, as shown with UV light in FIG. 12N, showing a first treatment zone 210A and a second treatment zone 210B. The first treatment zone 210A was on the seam between the sleeve and the shirt in the pit area, and the second 210B was centered about 9 cm lower than the seem toward the adjacent side of the garment. In the second treatment zone 210B, 1.6 g of 2.15% NAC (pH 6.4) was applied, then 1.856 g of LysoA solution was applied by pipette uniformly in the section. In the first treatment zone 210A, 1.7 g of LysoA solution and then 0.75 ml of PAPB were applied by pipette, followed by spraying 1.0 g of E3D. The shirt after these applications beut before washing is shown in FIG. 12O, taken with the UV filter About 3 minutes later, 0.4 gm of Lemon Brite dish detergent was applied roughly uniformly to the two sections and rubbed in. The shirt was then rinsed in warm water. Reduced fluorescence was observed in the second treatment zone 210B of the left pit. See FIG. 12P, taken with the UV filter.

Now 2.2 g of 2.15% NAC was applied to the lower half of the fluorescent zone in the left pit, and 1.3 g of LysoA solution was the glowing portions on the cuff of the sleeve, with 1.6 g of 2.1% NAC at pH 6.4 and 0.3 g of Lemon Brite detergent over the sections. In the lower part of the left pit area, 2.3 g of LysoB were applied, with 1.67 g of PAPB and 2.58 g of CellulaseB, using a pipette. The shirt was kept at 32° C. for about 10 minutes in a plastic bag. The bag was then removed and the treated region was further provided with 7.7 g of PNACS (fluorescing regions: the lower left pit area and the cuff region on the left sleeve).

Figure 12Q:
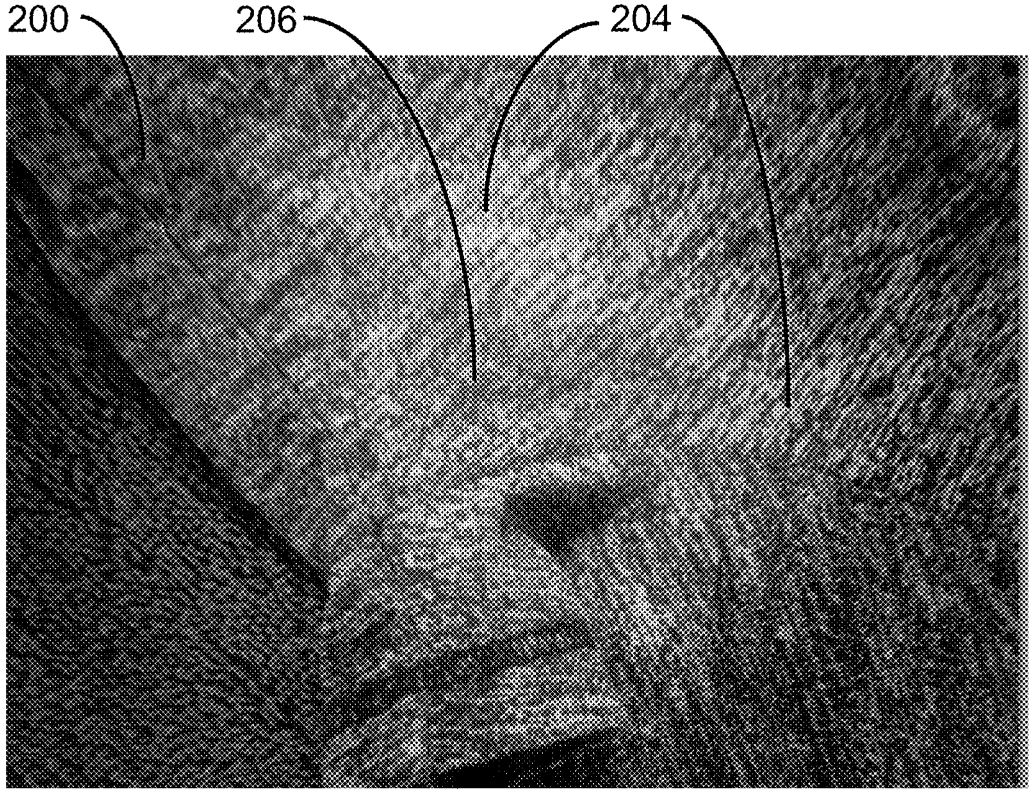

To raise the pH, a solution at pH 9.89 was prepared from 1.56 g sodium carbonate and 1.0 g $NaHCO_3$ in 91 ml of water. 13 g of this alkaline solution were applied to the treated regions of the shirt and it was then returned to the plastic bag and kept at about 32° C. The shirt was then rinsed and examined. The fluorescence was perhaps slightly less but the dimensions of the fluorescing areas were substantially the same. See FIG. 12Q for the left pit.

The left pit was treated again with 3.76 g of 2.15% NAC at pH 6.4 applied to the lower half of the left pit along with 2.16 g of 2.15% NAC at pH 9.17. The upper half of the left pit was sprayed with 5 g of water. Then 5.6 g of CellulaseC solution was applied dropwise to both the upper and lower left pit, along with 1.94 g of AmylaseA. The shirt was kept at about 28° C. for 30 minutes, then rinsed with a roughly 1% solution of Comfort® brand laundry detergent. Residual fluorescence was still visible, but had declined more strongly in the lower half of the pit.

Figure 12R:
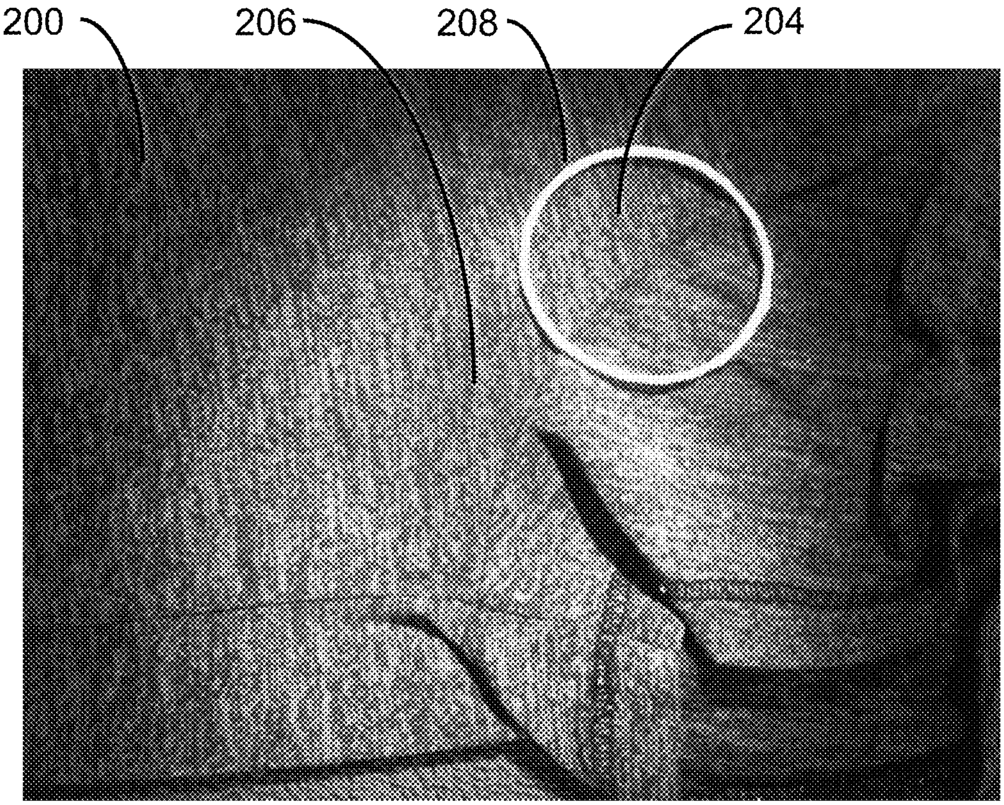

In a further test, 12 g of CellAmylA was applied by pipette to the entire fluorescing area of the lift pit and sleeve. After 5 minutes, 2.5 g of E3D was applied to the fluorescing areas of the left side. Then 1.4 g of 2% NAC at pH 6.4 and 2.25 g of PAPA solution was applied by pipette to the upper portion of the glowing zone, as shown in FIG. 12R under UV light and with the UV filter in place, also showing the state of fluorescence in the left pit with significant decline compared to early states and a prominent central region of diminished fluorescence 206, more plainly visible in color to the naked eye. The shirt was put in a plastic bag and held at about 33° for 1 hour. Slightly reduced fluorescence was again observed.

Figure 12S:
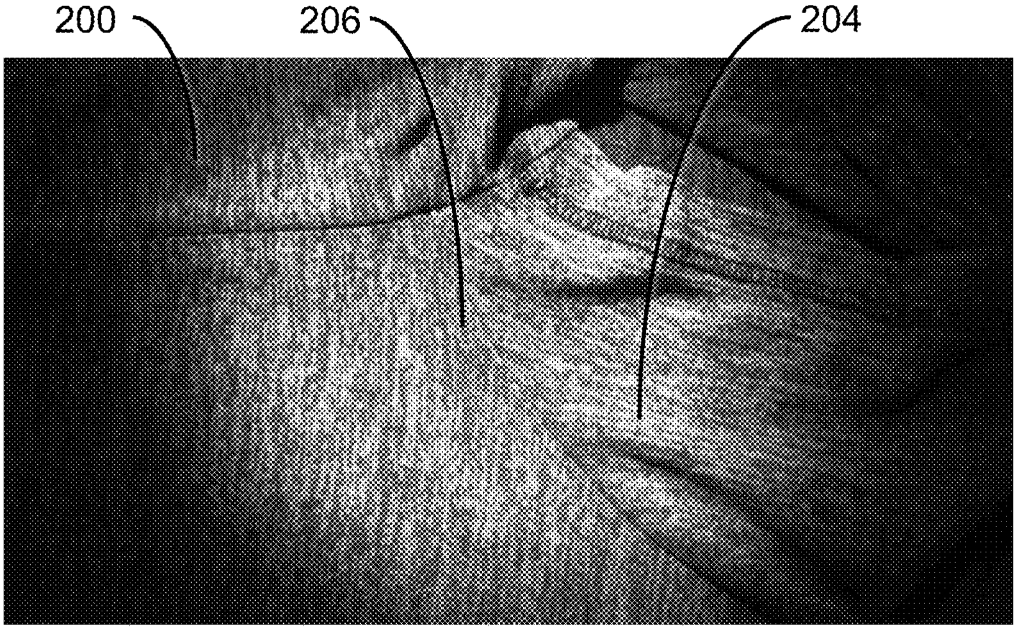

Next the right pit was considered. An upper zone, Section A, in the pit comprising the cuff of the right shirt sleeve having an oval shape about 5 cm wide and 3 cm tall was treated with 3 g of water and then 2.6 g of PAPA. A lower region of similar dimensions was denoted Section B was centered on the seam at the side of the shirt about 8 cm below the seam connecting the sleeve to the shirt. It was treated with 1.1 g of 2% NAC at pH 6.4 and 1.8 g of PAPA. After 20 seconds of mild rubbing, and rinsing, UV light showed further progress in removing the fluorescing material. The same pit was treated again. 3.46 g of 2% NAC solution at pH 9.17 was applied to the upper portion of the pit, while 2.35 g of LysoB was then applied to the upper regions and 2.25 g of LysoB was applied to the lower area. After rinsing, it was observed that fluorescence had been slightly reduced again. See FIG. 12S.

In another series, the effect of high sodium citrate concentration was tested. Based on a speculative hypothesis regarding high ionic strength and citrate ions in particular, a 12% solution of sodium citrate was prepared and 7 g was applied dropwise to the remaining fluorescent zone of the left pit and to a previously untreated fluorescent spot near the center of the shirt several inches below the neckline, followed by spraying 1.72 g of E3D over the treated regions. This was kept at about 30° C. for 3 hours, then rubbed with 0.3 g Lemon Brite detergent and rinsed in warm water. Water was then wrung out by wringing the shirt rolled up in a dry towel, and the treated area was visualized. The previously treated pits showed only very slight improvement at best, but the previously untreated fluorescent spot had been significantly reduced in brightness and appeared to be slightly smaller in extent. A reddish fluorescent zone that was adjacent the more central blue fluorescent zone, possibly from a newly incubated biofilm during a period of illness in which the shirt was worn, also showed significant reduction.

The right pit, whose fluorescence was much brighter than the left pit since the right pit had received relatively fewer biofilm busting treatments, was now treated. Two zones in the right pit were defined, a lower and an upper, both with strong fluorescence and both about 5 cm in diameter. Each received about 2.3 g of the 12% citrate solution. The upper received no further treatment agents, while the lower zone was sprayed with 1.86 g of E3D. The shirt was then incubated at about 40-45° C. for two hours, and then washed and rinsed as described for the left pit above. Examination in UV light showed only little reduction in fluorescence. The benefit of the citrate treatment may be most useful for biofilms that have not been treated multiple times already, though it is also believed to have an impact in disrupting living bacteria to reduce their potential to form further biofilms.

In another test, a strongly fluorescent zone on the cuff of the left arm closest to the left pit was treated with nattokinase and NAC by applying 2 g of the NattoNAC solution, waiting 5 minutes, and then applying 1.0 g of E4D solution. This was kept at 21-22° C. for about 4 hours, with about 0.7 g of moisture added again after 4 hours to keep the cuff moist to best permit bacterial spores to be effective. *

In another test, a fluorescent zone under the right pit, on the front of the shirt about 10 cm below the pit along the seam, was treated with both GASTRO-1 and PANNAC. First 0.79 g of PANNAC was applied to a circular area about 2 cm in diameter, and after about 5 minutes 1.0 g of GASTRO-1 was applied to the same spot. After 15 further minutes, 0.75 g of E4D was applied. This was kept at about 22° C. for about 4 hours.

The Triathlon Shirt, TR1

The triathlon shirt TR1 was examined. Since initial biofilm busting treatments, it had been worn many days without washing and the pits had a cheesy smell. CF1 was applied to both pits, 6.48 g to the left and 4.45 g to the right. In a test spot elsewhere on TR1, it was observed that the Calcofluor White dye persisted after rinsing with water, but could be substantially removed with the aid of a surfactant.

A laundry cycle (short cycle, 38 minutes at 30° C.) was run with shirt TR1 and Dec1. Based on UV visualization, the optical brightener washed out of TR1 except in the pits, suggesting strong attachment, perhaps due to biofilm material.

Figure 13A:
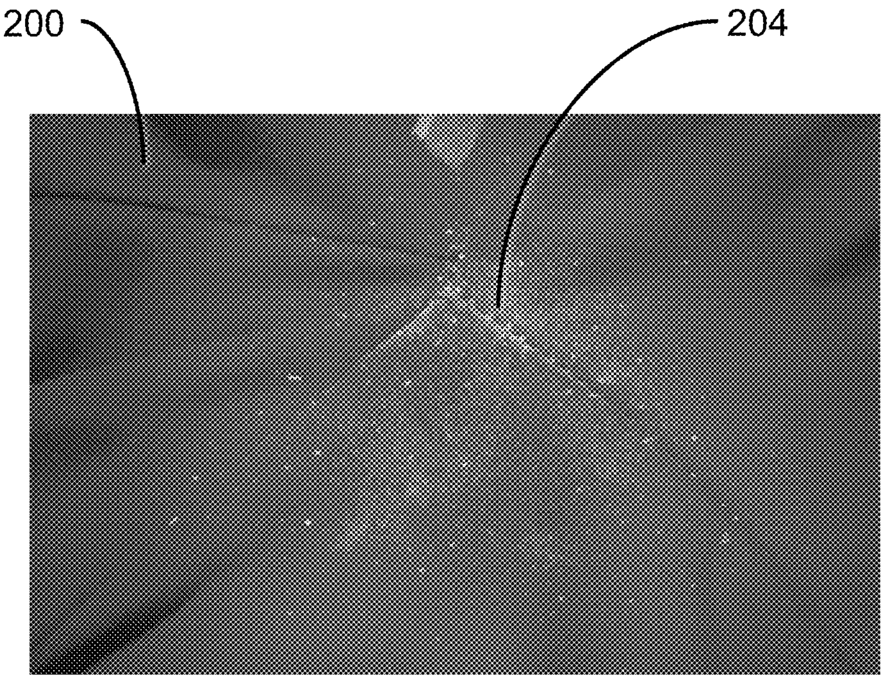
FIGS. 13A and 13B show photos of the right and left pits of a triathlon shirt under UV light.
Figure 13B:
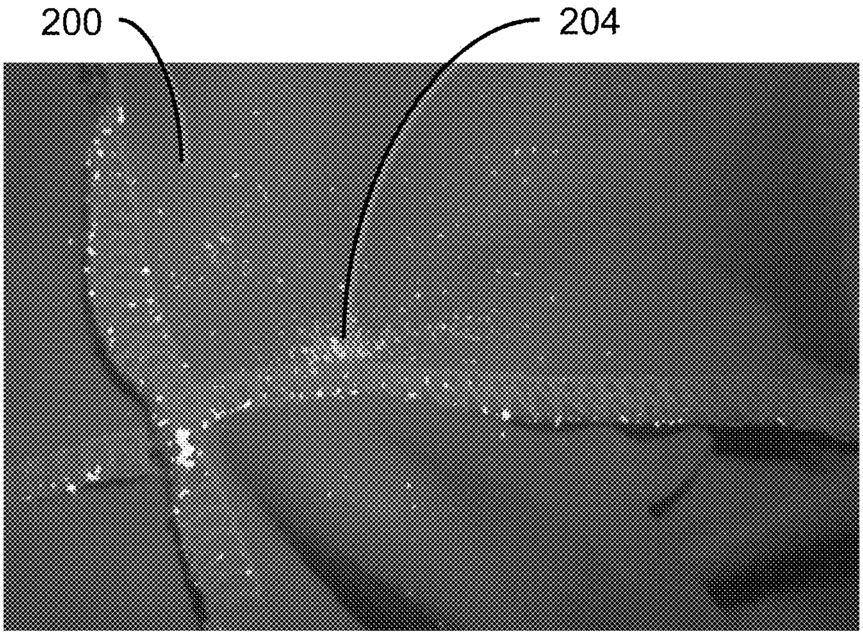

FIGS. 13A and 13B show pits of shirt TR1 under UV light from the Lightfe® mini-UV lamp with the UV filter in place. This image was taken after the initial perma-odor problem had been overcome with biofilm buster treatments previously described. Since that time, it had been worn during roughly a dozen exercise sessions and many hours of wear to try to revive the biofilm problem. UV visualization shows what may be biofilm material.

Artificial Sweat Trials

Several shirts were treated with an artificial sweat composition, bringing together several approaches in past research. Human sweat comprises a variety of lipids such as squalene, urea, cholesterol, and several fatty acids, proteins and amino acids, sugars, salts, and other agents. Initial efforts involved a concentrate with many components 2 or more times more abundant than occurs in sweat, but effort to grow biofilm with the concentrate were poor, perhaps because the sodium level was too high. Then a non-concentrated mixture was prepared, labeled AS-B. A 400-ml batch was prepared. An aqueous phase was first prepared with 1.50 g NaCl, 1.3 g lactic acid, 0.6 g urea, 1.2 g glycerin, 1.2 g of peptone (a source of amino acids), 0.25 g of a Centrum® MultiGummies vitamin pill for adults (a product of Pfizer, New York, NY) to provide some of the vitamin and mineral nutrients in sweat, and 2.0 g of honey (Chinese vetch honey) to provide glucose and other carbohydrates, and the mixture was blended into 30 ml of water and then heated to boiling (in part to denature any enzymes in the honey). Then 1.1 g of squalene was stirred in. The pH was 6.5. An oil phase was then prepared with 0.65 g of liquid lecitihin, 3.5 g of oleic acid, 0.405 g of palmitic acid, 0.006 g of ascorbic acid, 0.438 g of stearic acid, 0.008 g of vitamin E, 0.79 g of jojoba oil, 0. 405 g of cholesterol, which was heated and blended with 8.6 g of the watery extract of soft Japanese tofu (tofu on cloth in a woven reed basket, through which the watery extract drains). This was then blended vigorously with the water-phase solution as water was added to reach a total volume of 400 ml and labeled AS-B. Several shirts were treated with various doses of AS-B. The triathlon shirt (TR1) described above was treated, after the tests already described, with 3.5 g of AS-B in each pit and kept at about 27° C. for 24 hours. Changes in fluorescence were difficult to assess; it is unclear if the trial succeeded.

Figure 14A:
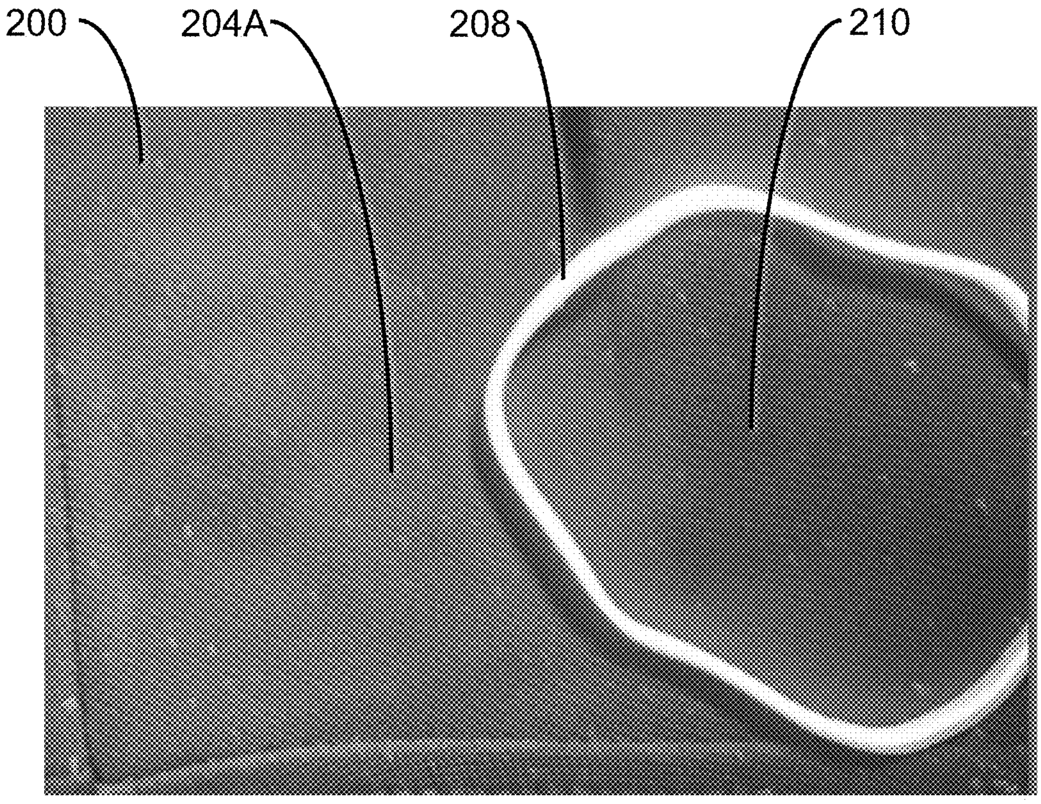
FIGS. 14A and 14B are photos of a pit in a men's polyester golf shirt having apparent biofilm, in which additional biofilm was grown through application of an artificial sweat composition.
Figure 14B:
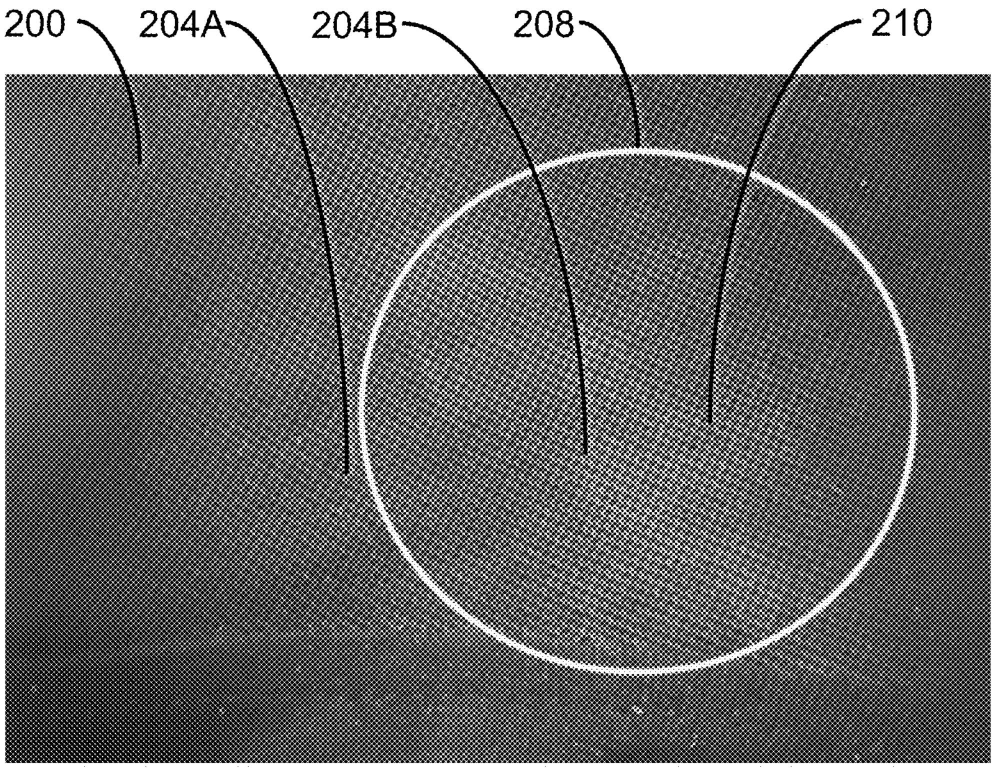

More visible success came after considering the tenacity and heat resistance of some microbes in dry biofilms. It was hypothesized that better visible biofilm growth in a shirt might occur if the biofilm is allowed to dry, be remoistened, and dried again several times before finally being washed and dried. For that experiment, a men's polyester Walter Hagen brand long-sleeved golf shirt, black in color, was purchased at a Goodwill store in Appleton, Wisconsin that showed fluorescence in both pits under UV light, most strongly in the right pit, a shown in FIG. 14A, where a rubber band serves as a boundary marker 208 for the treatment zone 210 about to be sprayed with artificial sweat spray AS-B. The initial fluorescent region 204A is visible in this image taken through a UV filter by an iPhone 11 camera. Before treating with artificial sweat, both pits were treated with about 3.7 g each of E7D spray, wrapped in plastic, and allowed to site overnight before being washed with TIDE® liquid detergent and tumble dried. The fluorescent zone in the right pit appeared slightly weaker at best and was still prominent. Then the AS-B artificial sweat solution was applied to the right pit, at the edge of the existing biofilm area over an approximately 8 cm square area with about 1.5 to 1.8 g of AS-B applied per application, and also applied to a non-fluorescent region at the lower hem directly below the right pits with a dose of about 1.2 to 1.5 g per application over about a 6 cm square area, with applications occurring 5 times spaced apart by 6 to 12 hours over a 3 day period, and generally maintained around 24° C. while wrapped in a plastic bag, with added moisture throughout the shirt (about 40 g of added moisture) to reduce wicking and premature drying of the treated areas in the right pit and lower hem. After the first 4 treatments, the shirt was treated again but allowed to air dry without being wrapped in a plastic bag. This, any biofilm would have experienced repeated cycles of wetness and dryness, with the goal of creating a "hardened" dry biofilm. After the last drying stage, the shirt was hand-washed for about 10 minutes in about 3 liters of warm water with 8 g of added TIDE® Simply Clean laundry detergent, a detergent highly fluorescent in UV light and believed to contain Calcofluor White. After rinsing and tumble drying, the shirt 200 was examined in UV light, as shown in FIG. 14B and in addition to the initial fluorescent region 204A, was seen to have an new fluorescent region 204B that may represent the growth of new biofilm material capable of absorbing the optical brightener in the laundry detergent. Here the approximate treatment area 210 is shown as a circle drawn on the image serving as a boundary marker 208. The new fluorescent region 204B had developed outward and over the rightmost edge of the initial fluorescent region 204A, with the new fluorescent region 204B displaying stronger fluorescence than the original biofilm region 204A. However, the region that had been sprayed with AS-B on the hem, where no biofilm had been established before, did not show visible biofilm growth when observed in UV light. Thus, without wishing to be bound by theory, at least in this case it is believed that rapid biofilm growth with the AS-B artificial sweat mixture and perhaps with real sweat may be most successful when an active biofilm is already present that can rapidly exploit the nutrients provided in the artificial sweat to grow and expand in size.

Confocal and Fluorescent Microscopy

To further examine potential biofilm zones in various clothing items with a history of perma-odor, work was carried out with confocal and fluorescent microscopy at the NanoCenter at the University of Minnesota using a Nikon C2 Confocal microscope operated with Nikon Elements software. The microscope functions as a manual inverted microscope, a fluorescence-enabled microscope, or a confocal microscope system, depending on preference. Further details are provided in K. VanderWaal, "University of Minnesota Nano Center Standard Operating Procedure [for the Nikon C2 Confocal Microscope]," 2016; http://apps.mnc.umn.edu/pub/pdf/equipment/nikon_confocal_sop.pdf. For observing fluorescent regions in shirts, rather than cutting and mounting samples, the shirts were preserved by measuring them in situ while stretched across the measurement space. For confocal microscopy, the UV laser at 405 nm wavelength was used, while for fluorescent microscopy, the UV fluorescence was observed from a widefield white light observed through a DAPI filter cube was used to see the resulting blue fluorescence (this filters the light to an excitation band of 340-380 nm, and then filters the emission band to 435-485 nm). In both cases, no fluorescent dyes were added to the material, but the inherent fluorescence in the clothing, believed to be due to optical brighteners, was relied on.

Figure 15A:
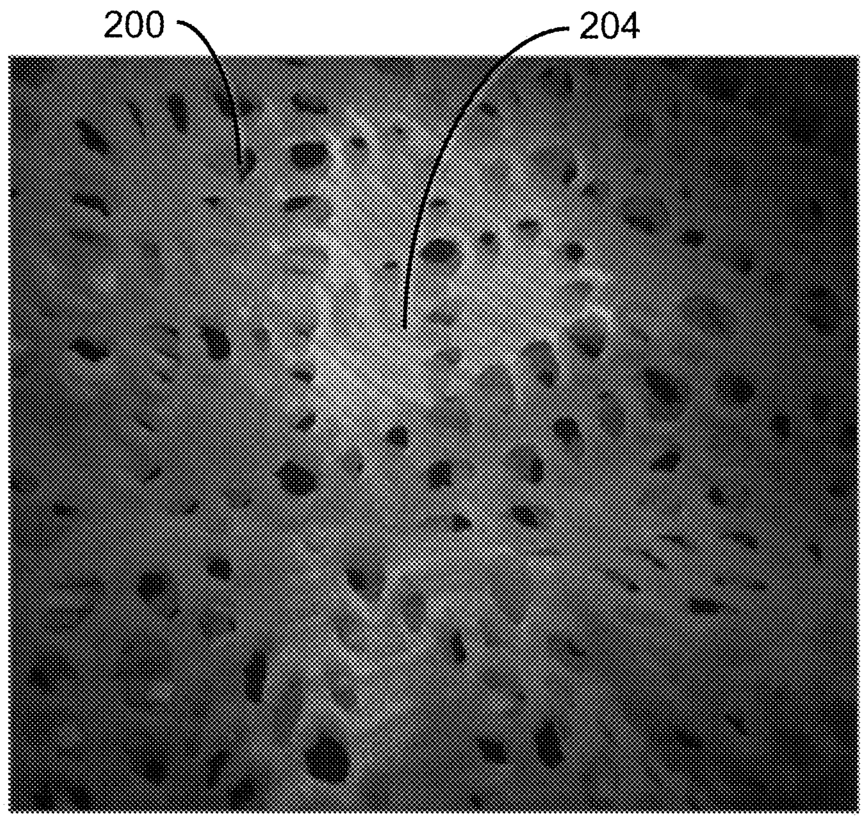
FIGS. 15A and 15B show views in UV light of the left and right pits of a lace dress with a perma-odor problem, displaying strong fluorescence in the pit.
Figure 15B:
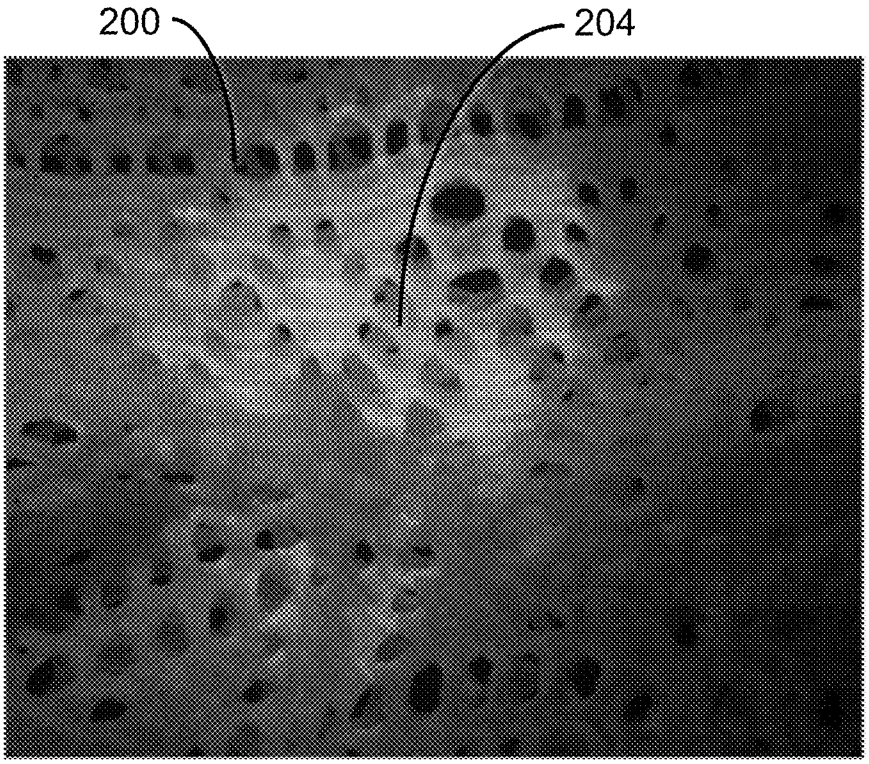
Figure 16A:
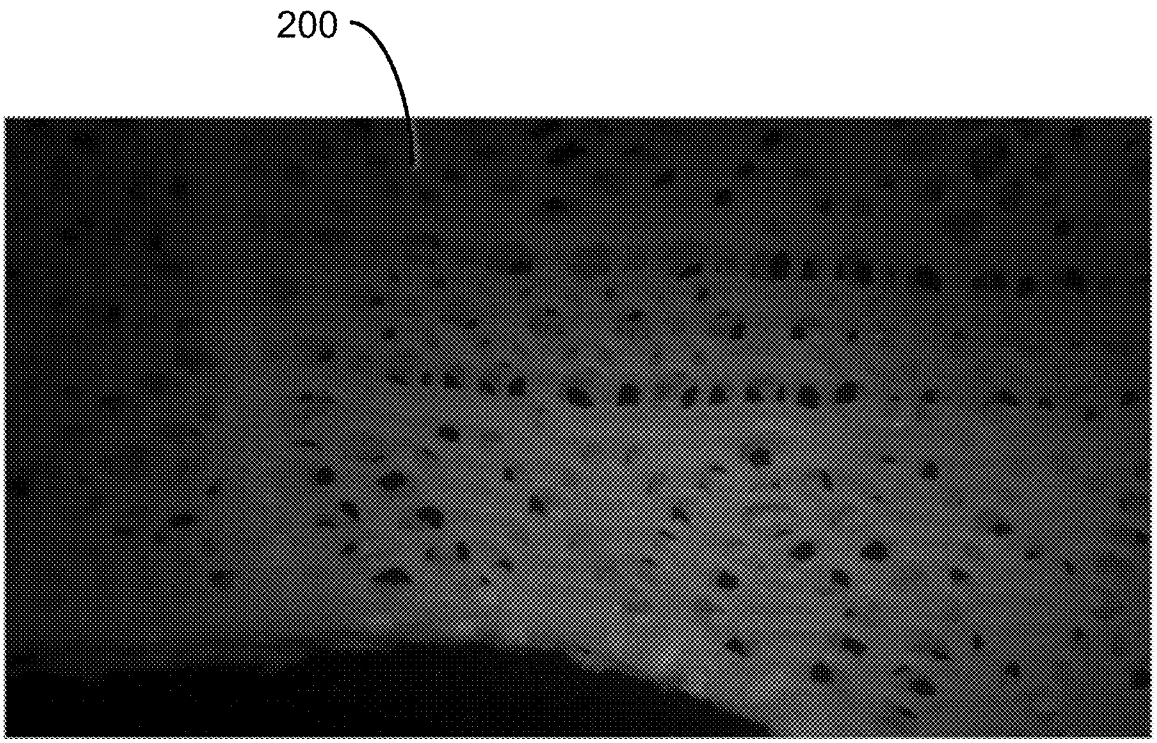
FIGS. 16A and 16B show views of the pits of the lace dress in UV light after treatment with bioenzymatic liquid and a biofilm attack agent.
Figure 16B:
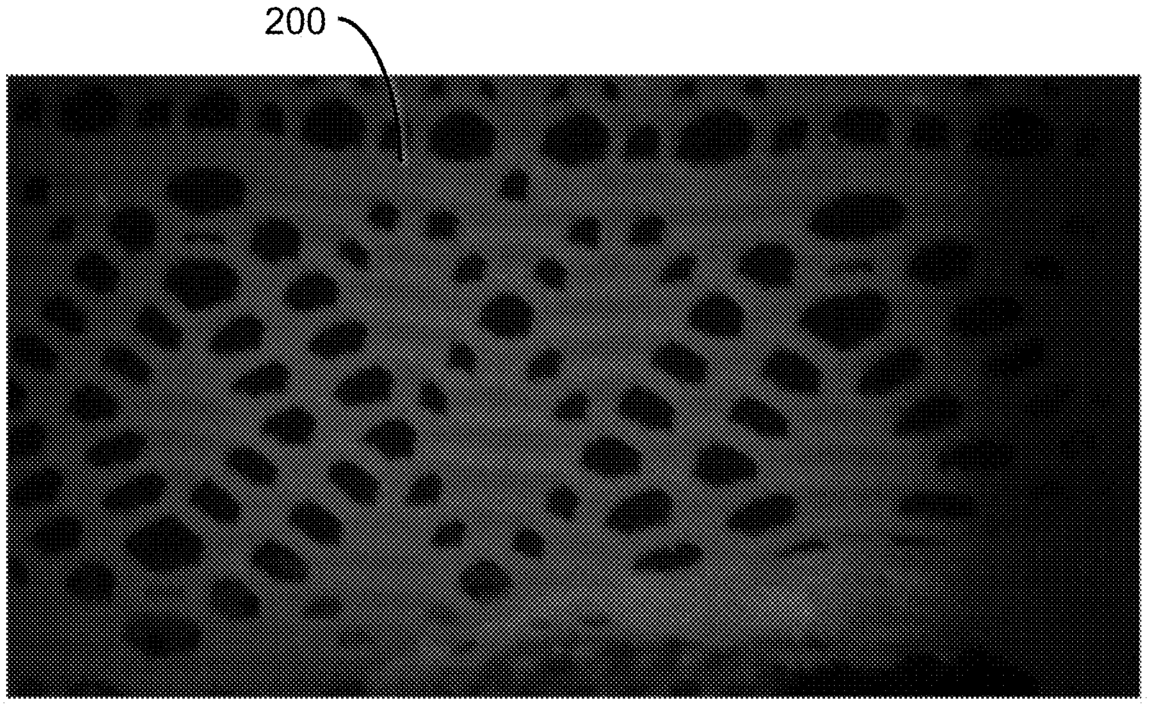

FIGS. 15A and 15B show the left and right pits in UV light, respectively, of a lace dress provided by a subject who complained of persistent odor that would not wash out from the dress. The washed dress 200 was examined under UV light and prominent fluorescent zones 204 in the arm pit areas were observed, with typical characteristics: the were biased toward the front of the body and in the pits, consistent with typical sweat patterns in clothing. The fluorescent zones 204 were examined with both fluorescent and confocal microscopy (discussed below). The pits of the dress were then treated. The right pit was treated with 0.7 g of E6C (a bioenzymatic mix described above), with added moisture present in that portion of the dress resulting in roughly a 2:1 dilution. For the left pit, first a pretreatment was applied by spraying 2 g of a biofilm attack solution, PANNAC, onto the biofilm region and adjacent fabric. After a 5-minute wait, 1.54 g of E6D was applied to the same region. With some moisture present in the dress, it is estimated that the effective dilution of the E6C solution was about 3:1. The dress was wrapped in a plastic bag and kept at about 27° C. for 11 hours, then washed by hand in warm water with GAIN® detergent. Surprisingly, as shown in FIGS. 16A and 16B for the left and right pits, respectively, in UV light after treatment, the fluorescent matter in both pits was almost completely eliminated, with only a small region (about 2% of the original extent) still fluorescing in the left pit, but essentially nothing visible to the eye remaining in the right pit.

Figure 17A:
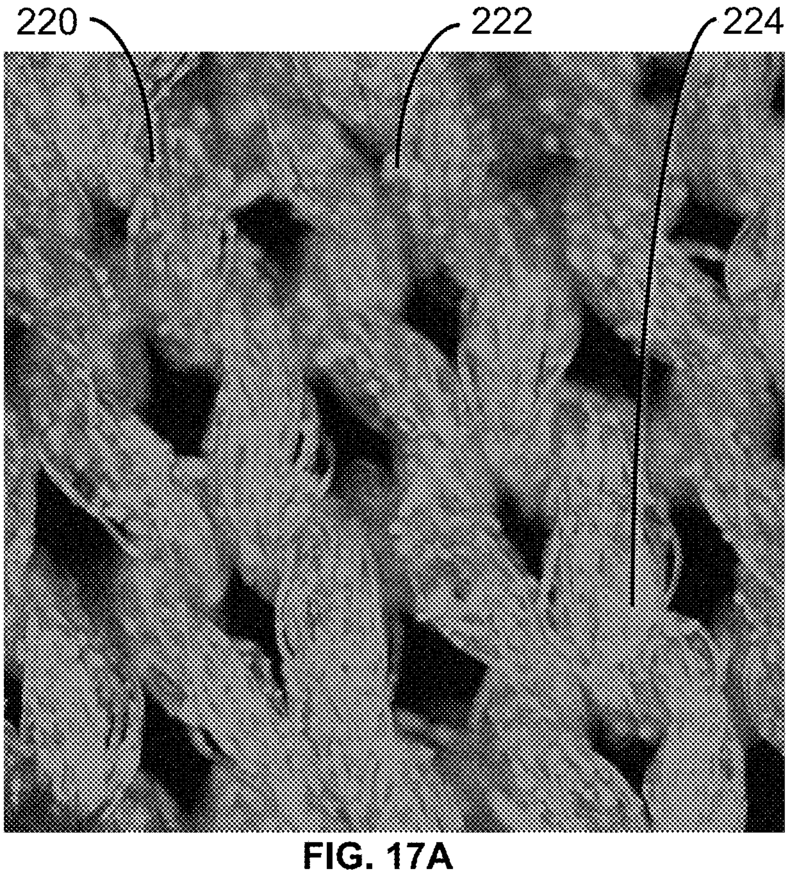
FIGS. 17A and 17B are before-and-after images of a biofilm region in the lace dress taken with confocal microscopy with a UV laser and no added dye.
Figure 17B:
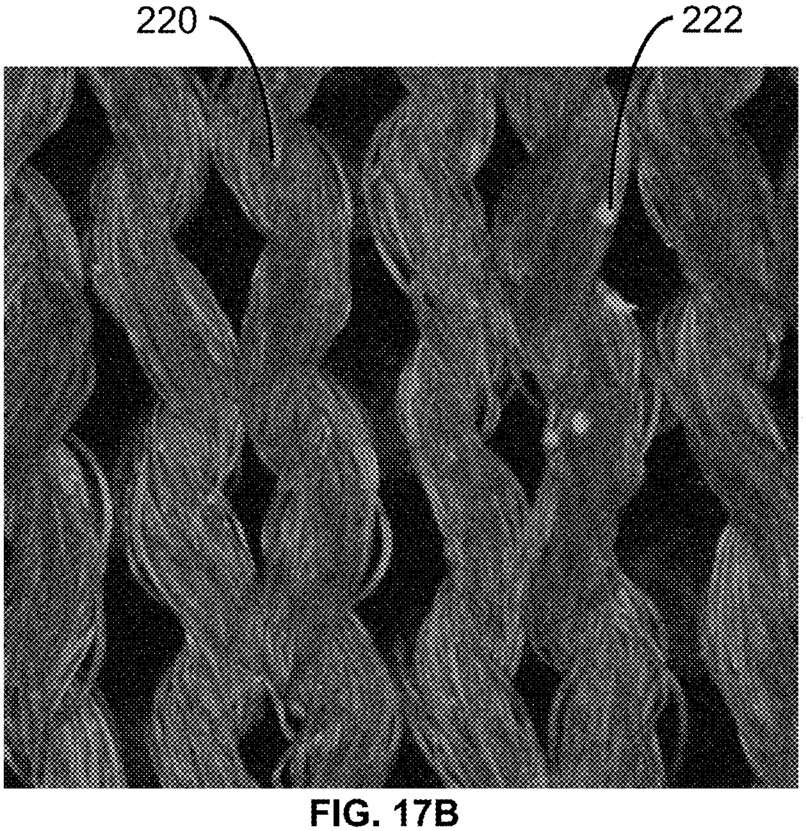

FIGS. 17A and 17B show before and after confocal microscopy views of what was the original fluorescent region in the left pit, using the same settings for laser intensity, dwell time, and other characteristics of the microscope using the UV laser. FIG. 17A shows the fluorescent matter prior to the bioenzymatic treatment, showing the presence of fibrous yarns 220 with numerous fluorescent "islands" 222 on the fibers, and occasionally larger patches 224 where fluorescent matter seems to bridge multiple fibers. What was the fluorescent region is again shown after the bioenzymatic treatment in FIG. 17B, where a few lone islands 222 of fluorescence remain, but overall showing much less presence of apparent biofilm matter. The bioenzymatic spray was effective, but was somewhat more effective when coupled with the NAC plus panthenol mixture, the PANNAC spray.

Remarks

When introducing elements of aspects of the invention or aspects thereof, the articles "a," "an," "the," and "said" are intended to mean that there are one or more of the elements. The terms "comprising," "including," and "having" are inclusive and mean that there may be additional elements other than the listed elements.

All patents and patent publications cited herein may be presumed to be incorporated by reference to the extent it is non-contradictory herewith. When a document is explicitly said to be "incorporated by reference," it is also implied that it is incorporated by reference to the extent it is non-contradictory herewith.

Having described aspects of the invention in detail, it will be apparent that modifications and variations are possible without departing from the scope of aspects of the invention as defined in the appended claims. As various changes could be made in the above compositions, products, and methods without departing from the scope of aspects of the invention, it is intended that all matter contained in the above description shall be interpreted as illustrative and not in a limiting sense.

While the foregoing makes reference to particular illustrative embodiments, these examples should not be construed as limitations. The inventive system, methods, and products can be adapted for other uses or forms not explicitly listed above, and can be modified in numerous ways within the spirit of the present disclosure. Thus, the present invention is not limited to the disclosed embodiments, but is to be accorded the widest scope consistent with the claims below.

Portions of this work were conducted in the Minnesota Nano Center, which is supported by the National Science Foundation through the National Nano Coordinated Infrastructure Network (NNCIN) under Award Number ECCS-1542202.

I claim:

1. A method for treating a textile item to reduce persistent odor, comprising applying an enzymatic composition to the item and then washing the item, wherein the enzymatic composition comprises: (a) water, (b) from 5% to 60% of a surfactant, (c) from 1% to 20% of enzymes selected from the group consisting of lysozyme, proteinase, amylase, mannanase, lipase, pectinase, and cellulase; and (d) from 0.1% to 10% of N-acetyl cysteine.

2. The method of claim 1, wherein the enzymatic composition further comprises from 0.01% to 8% by weight of bacterial spores that become active in response to the presence of contaminants on textiles selected from at least one of proteins, carbohydrates, lipids, and carbohydrates, the spores then producing enzymes that attack a portion of said contaminants, wherein the concentration of the bacterial spores is between $1\times10^5$ and $5\times10^{10}$ CFU/ml.

3. The method of claim 1, wherein the enzymatic composition further comprises at least 0.05% of material selected from the group consisting of panthenol, a derivative of panthenol, and a catechin.

4. The method of claim 1, wherein the enzymatic composition is packaged with indicia instructing a user to wait at least 5 minutes between applying the enzymatic composition and washing the item.

5. The method of claim 1, wherein the water, surfactant, enzymes and N-acetyl cysteine of the enzymatic composition is segregated into at least two portions, a first portion comprising at least one enzyme from the group consisting of lysozyme, proteinase, amylase, mannanase, lipase, pectinase, and cellulase and a second portion comprising N-acetyl cysteine, the method further comprising providing indicia instructing a user to apply the at least two portions to the one or more regions of the textile item associated with persistent odor, such that the first portion and the second portion are combined and the at least two portions are present on the item for a period of time.

6. The method of claim 5, wherein the first portion of the enzymatic composition is provided as a liquid and the second portion is provided as a liquid or as a powder.

7. The method of claim 5, wherein the second portion of the enzymatic composition comprises from 1% to 90% N-acetyl cysteine, from 1% to 10% panthenol, and sufficient alkaline agents such that when the second portion of the enzymatic composition is combined with enough water at pH 7.0 to bring the concentration of the N-acetyl cysteine to 1%, that the pH of the resulting aqueous mixture is at least 6.0.

8. The method of claim 1, wherein the textile item comprises biofilm matter and wherein the method is effective in reducing the amount of the biofilm matter present on the item, without the use of non-enzymatic bleaching agents.

9. The method of claim 1, wherein the textile item comprises biofilm matter that is visualized using UV light.

10. The method of claim 9, wherein the item has malodor and wherein a suitable dye that fluoresces in UV light has been applied to the item, further comprising shining UV light on the item to identify one or more regions on the item that show relatively high fluorescence, wherein the enzymatic composition is then applied to at least one of the one or more regions that show relatively high fluorescence.

11. The method of claim 1 wherein the enzymatic composition further comprises at least 0.1% sophorolipids.

12. The method of claim 1, further comprising treating the item with a sufficient quantity of the enzymatic composition to comprise a mass of at least 0.01 g of N-acetyl cysteine.

13. The method of claim 1, wherein the enzymatic composition further comprises from 1% to 10% of an alkali metal salt selected from chloride salts, carbonate salts, bicarbonate salts, citrate salts, formate sates, sulfate salts, and phosphate salts.

14. The method of claim 1, wherein the enzymatic composition is applied to a target region on the item such that the target region receives a dose of at least 0.01 g of N-acetyl cysteine per 50 $cm^2$.

15. The method of claim 14, further comprising using UV light to identify the target region, wherein the target region fluoresces in the UV light.

16. The method of claim 1, wherein the enzymatic composition comprises from 0.2% to 5% of N-acetyl cysteine, at least 1% of proteinase, and has a pH of at least 6.

* * * * *